United States Patent [19]

Lancaster

[11] 4,140,918

[45] Feb. 20, 1979

[54] ELECTRICAL JACK AND PATCH CORD ASSEMBLIES

[75] Inventor: Jesse F. Lancaster, Great Falls, Va.

[73] Assignee: Dynatech Laboratories, Inc., Alexandria, Va.

[21] Appl. No.: 650,019

[22] Filed: Jan. 19, 1976

Related U.S. Application Data

[63] Continuation-in-part of Ser. No. 420,584, Nov. 30, 1973, abandoned.

[51] Int. Cl.² .................................... H02J 4/00

[52] U.S. Cl. .................................... 307/112; 200/51.07; 179/1 PC; 361/352

[58] Field of Search .................... 307/112; 200/51.07; 339/176 P, 182 R, 183; 179/1 PC, 98, 91 R, 95, 175, 25, 175 R, 181 R; 340/365 R; 361/352; 333/7, 9

[56] References Cited

U.S. PATENT DOCUMENTS

| | | | |
|---|---|---|---|
| 3,360,747 | 12/1967 | Lancaster | 333/9 |
| 3,529,264 | 9/1970 | Lancaster | 333/8 X |
| 3,536,869 | 10/1970 | Renshaw, Jr. | 200/51.1 |
| 3,537,061 | 10/1970 | Haag et al. | 339/31 |
| 3,627,942 | 12/1971 | Bobb | 200/51.07 |
| 3,665,129 | 5/1972 | Lancaster | 339/183 X |
| 3,805,116 | 4/1974 | Nehmann | 339/183 X |

*Primary Examiner*—Robert K. Schaefer
*Assistant Examiner*—Morris Ginsburg
*Attorney, Agent, or Firm*—Strauch, Nolan, Neale, Nies & Kurz

[57] ABSTRACT

An electrical patch cord plug and jack assembly in which the plug is insertable into a selected one of a number of plug-receiving sockets in the jack and has a multiplicity of contact elements arranged in at least one longitudinally extending row for making and breaking various circuit connections in the jack.

39 Claims, 59 Drawing Figures

FIG. 2
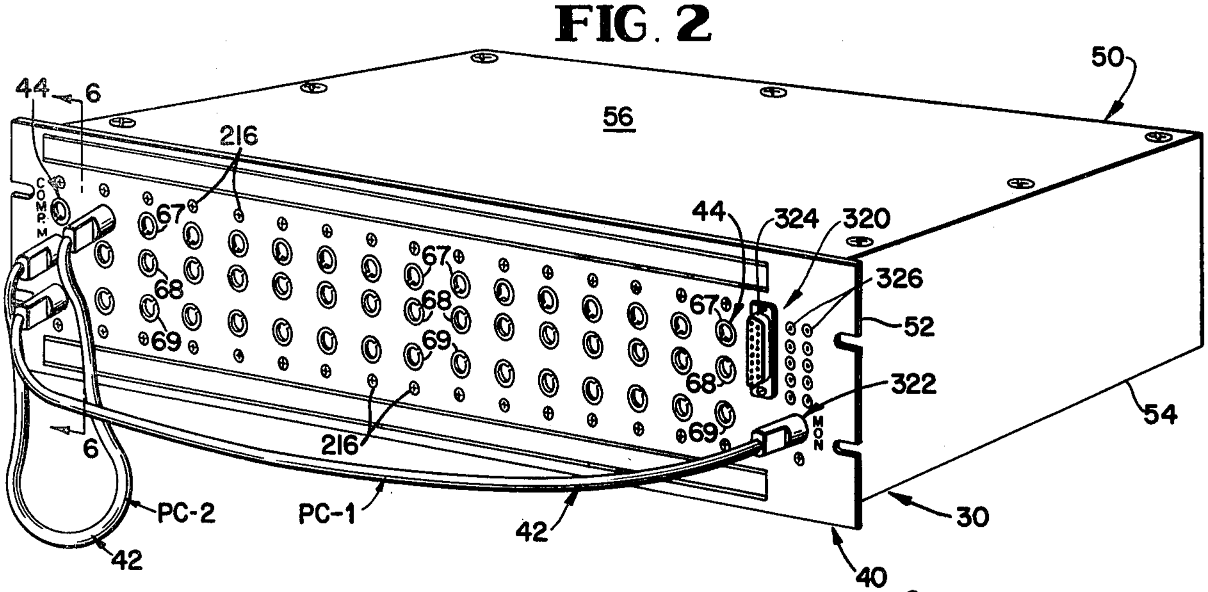
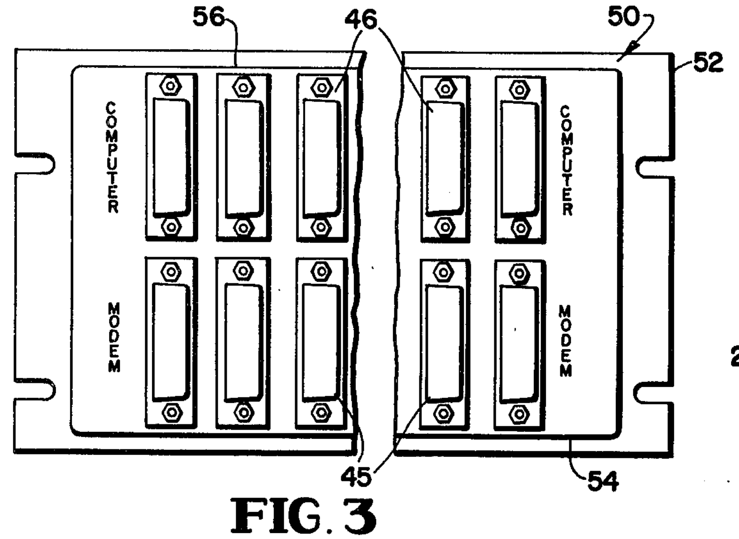
FIG. 3
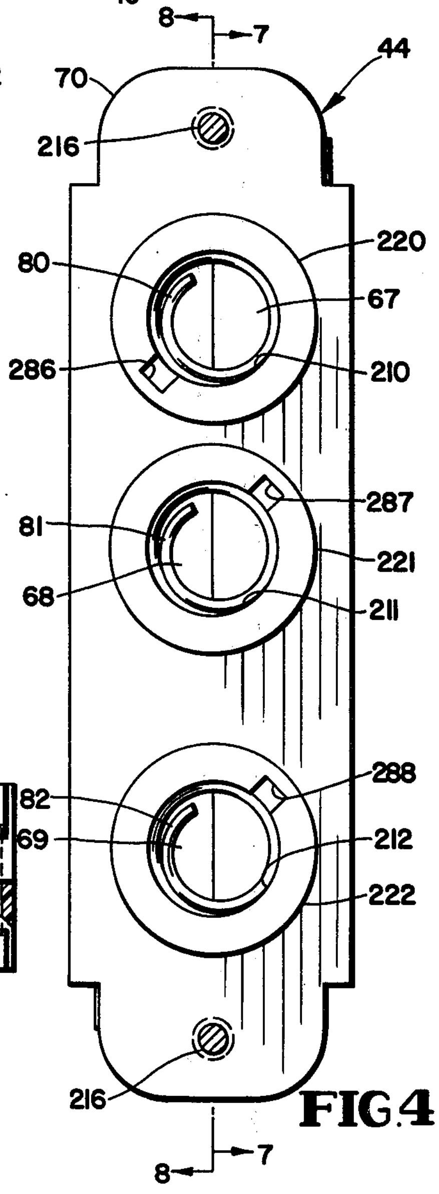
FIG. 4
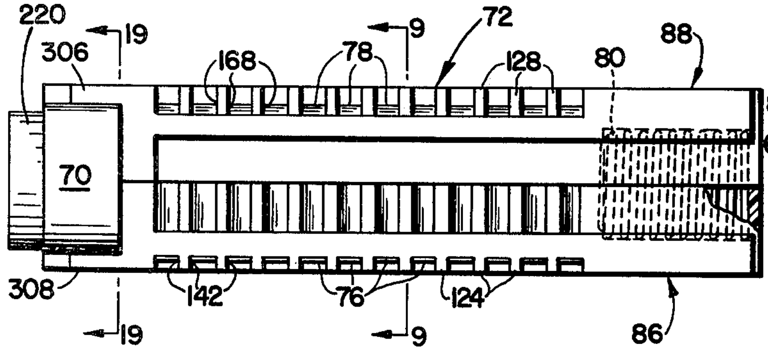
FIG. 5

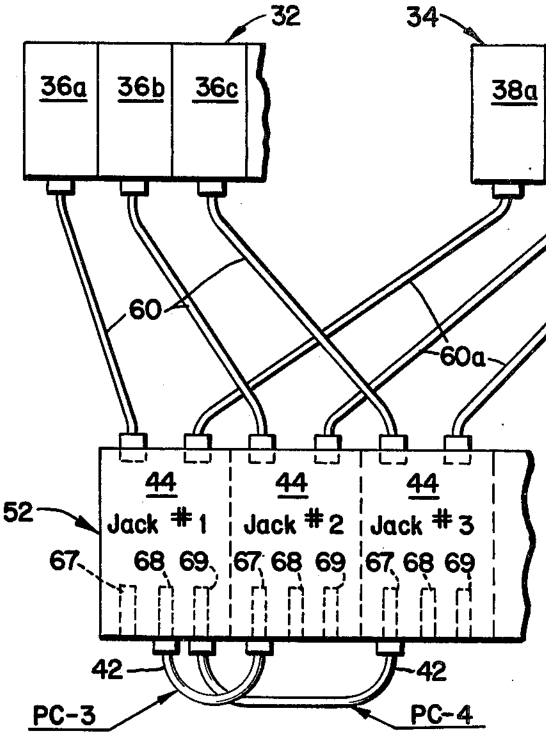
FIG. 25
FIG. 26
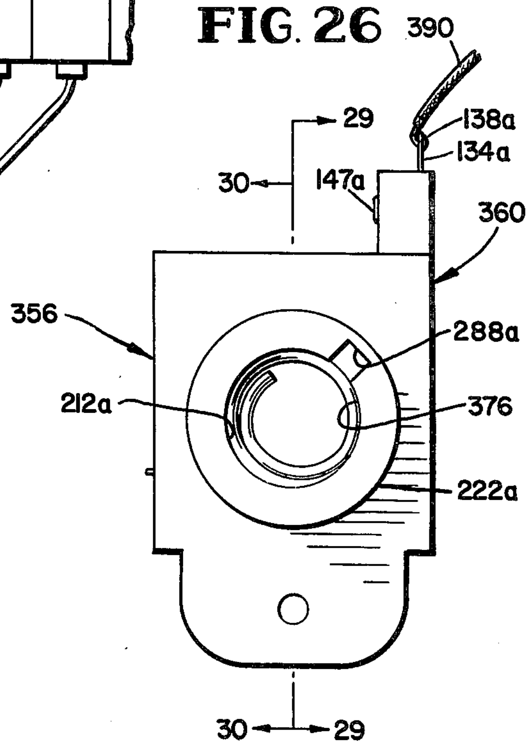
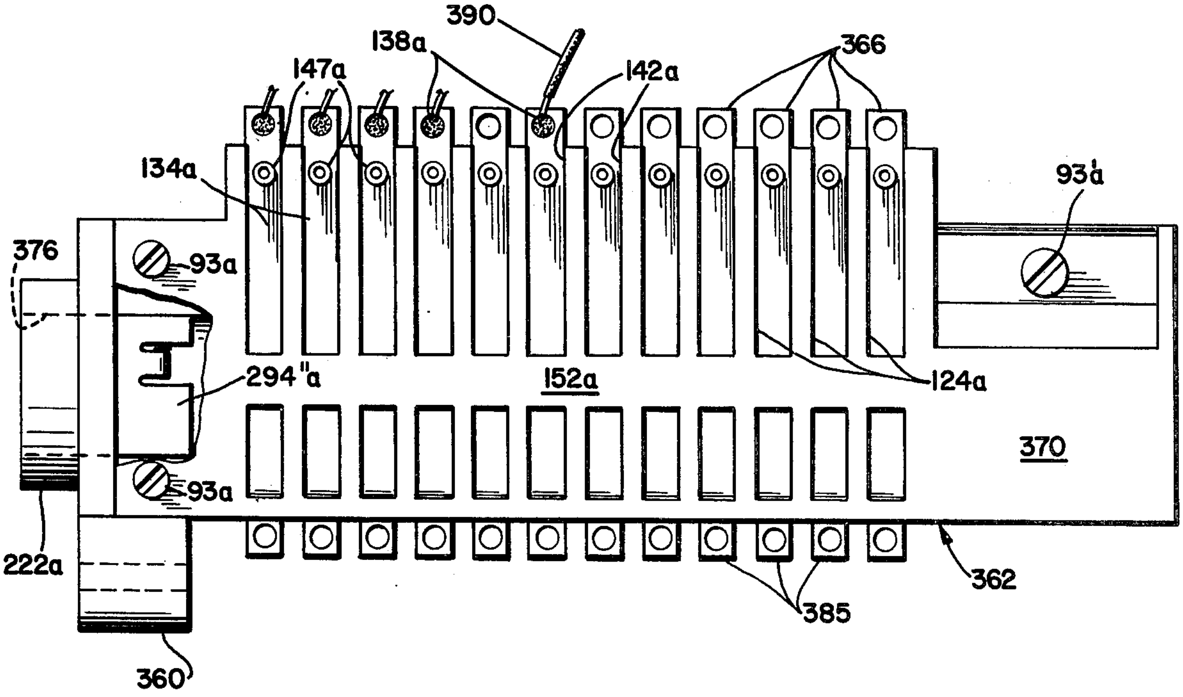
FIG. 27

FIG. 46
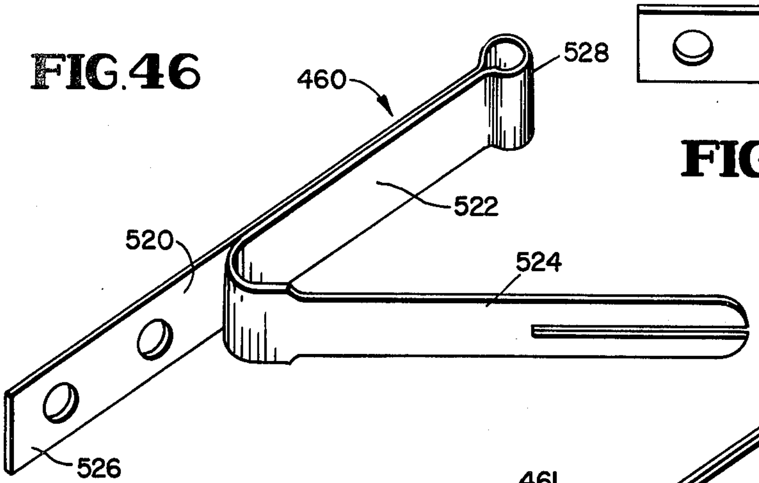
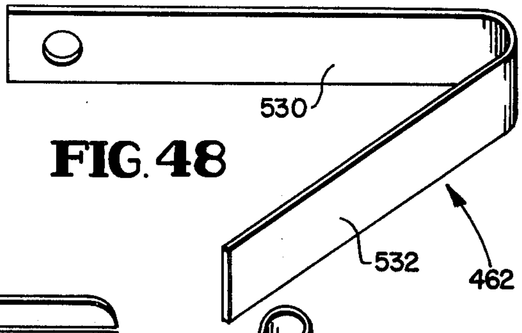
FIG. 48
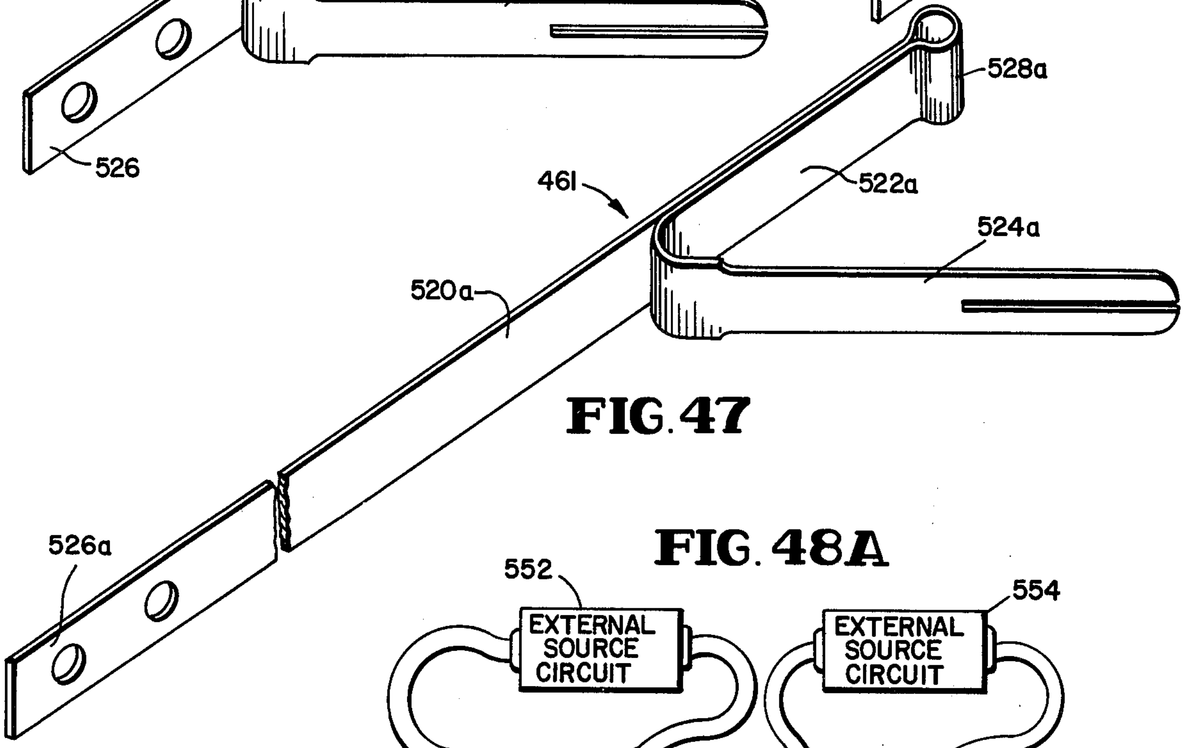
FIG. 47
FIG. 48A
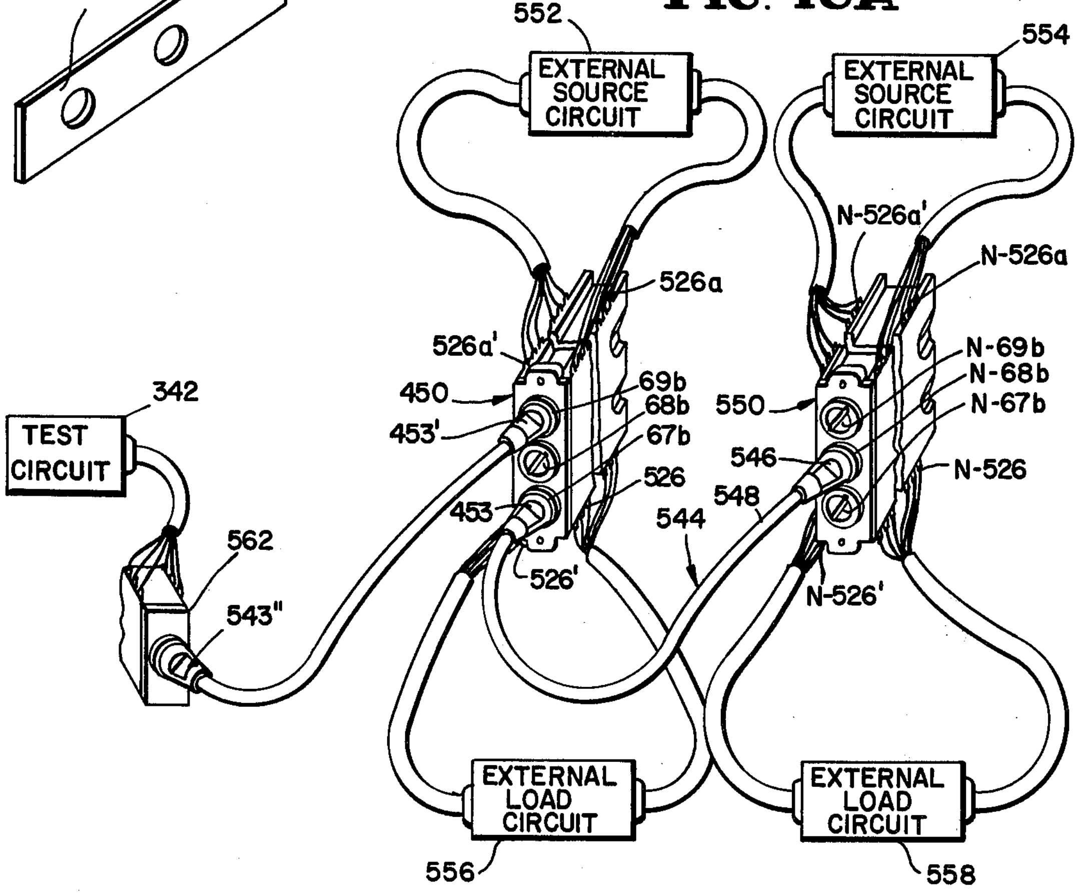

ELECTRICAL JACK AND PATCH CORD ASSEMBLIES

RELATED APPLICATION

This application is a continuation-in-part of my co-pending application Ser. No. 420,584 (now abandoned) filed on Nov. 30, 1973 for Electrical Jack and Patch Cord Plug Assemblies.

FIELD OF INVENTION

This invention relates to electrical patching facilities and to plug and jack type switching assemblies therefor.

BACKGROUND

Electrical patching equipment, which typically includes an array of jacks and patch cords, is widely used in a variety of different applications for selectively connecting and disconnecting electrical circuits. For example, electrical patching equipment is widely utilized to make selected circuit connections between data communications equipment and computers or other signal utilization equipment.

Jack constructions known prior to this invention typically have either one or two patch cord plug-receiving sockets and a number of contact elements which are in one position when no patch cord plug is plugged into an associated plug-receiving socket and which are shifted to a second position by plugging a plug into the plug-receiving socket. Prior patch cords typically comprise a cord or cable with a plug connected to one or both ends of the cable. The plug typically has a number of contacts which are connected to conductors in the cable and which are adapted to make contact with the contact elements in the jack when the plug is inserted into the jack.

Various patch cord plug and jack constructions are currently known such as the constructions described in the following United States Letters Patents: U.S. Pat. No. 3,665,129 which issued on May 13, 1972 to Jesse F. Lancaster U.S. Pat. No. 3,714,385 which issued on January 30, 1973 to C. T. Leverich, U.S. Pat. No. 3,222,471 which issued on Dec. 7, 1965 to R. A. Steinkamp, U.S. Pat. No. 3,627,942 which issued on Dec. 14, 1971 to C. F. Bobb, U.S. Pat. No. 3,158,422 which issued on Nov. 24, 1964 to C. J. Bowden et al, and U.S. Pat. No. 3,154,360 which issued to P. J. Plishner on Oct. 27, 1964.

Although various prior patch cord and jack assemblies, such as the ones described in the above-mentioned U.S. Pat. Nos. 3,665,129 and 3,714,385, operate satisfactorily, they have various drawbacks or shortcomings. For example, while the jacks described in Patent 3,665,129 each have a multiplicity of normally closed contacts which can concomitantly be opened by selective insertion of a single patch cord plug to conveniently and quickly patch multi-terminal circuits into and out of a patch field, they have no provision for monitoring, checking or measuring electrical conditions without breaking the normal through circuit connections which are established by the normally closed jack contacts. In addition, they have limited flexibility in making different circuit connections. Also, the jacks and patch cord plugs described in this patent contain numerous parts to make manufacture relatively expensive.

The plug and jack constructions described in U.S. Pat. No. 3,714,385 lack and advantageous multiple normal through circuit connections which are provided by the jacks in Patent 3,665,129. Instead, they are only capable of providing normal through circuit connections between two terminals of one circuit and two terminals of another circuit. However, the jack and patch cord equipment in Patent 3,714,385 does offer the advantage of permitting signals to be monitored without breaking the normal through circuit connections in the jack, but this can only be done by utilizing a specially constructed test probe plug which differs in construction from the regular patch cord plugs and by plugging the test probe plug into one of the two jack sockets which is normally used for patching equipment into and out of the patch field.

SUMMARY & OBJECTS OF INVENTION

As compared with the prior patching equipment discussed above, the present invention provides for a novel plug and jack type connector which has none of the above-mentioned drawbacks, which retains the above-mentioned advantages of the prior plug and jack equipment, and which offers additional advantages as will be explained shortly. More specifically, the present invention provides for a novel patch module which has a selected number of novel, self-normalling, triple-socket jack assemblies.

The novel triple-socket jack assembly of this invention is provided with first, second and third plug-receiving sockets, and it also has a multiplicity of normal through circuit connections or circuits for interconnecting two multi-terminal circuits.

Plugging a multi-contact patch cord plug into the first plug-receiving socket of the triple-socket jack opens the normal through circuit connections in the jack to electrically disconnect the multi-terminal circuits from each other and completes circuits between the terminals one of the two multi-terminal circuits and the contacts of the patch cord plug. Plugging a multi-contact patch cord into the second plug-receiving socket of the triple-socket jack also opens the normal through circuit connections in the jack to electrically disconnect the multi-terminal circuits from each other and completes circuit connections between the terminals of the other of the two multi-terminal circuits and the contacts of the patch cord plug. Thus, the normally interconnected multi-terminal circuits may selectively be electrically disconnected from each other and each of the disconnected circuits may selectively be patched into a selected alternate circuit.

Plugging a multi-contact patch cord plug into the third plug-receiving socket of the triple-socket jack completes circuits between the terminals of a pre-selected one of the two multi-terminal circuits and the contacts of the plugged-in plug without opening the normal through circuits in the jack and also without interfering with any patch field connections that may be established by plugging patch cord plugs into either or both of the first and second plug-receiving sockets. Thus, electrical signals passing between the pre-selected multi-terminal circuit and any other circuit which the pre-selected multi-terminal circuit may be connected to in the patch field may be checked or monitored by patching electrical instruments or a signal monitoring circuit inot the third socket of the triple-socket jack. Furthermore, by utilizing the third plug-receiving socket, any selected circuit may be trunked or electrically connected to the pre-selected multi-terminal circuit concomitantly along with any other circuit that the pre-selected multi-terminal circuit may be connected to in the patch field.

From the foregoing it will be appreciated that the third plug-receiving socket and associated circuitry in triple socket jack not only affords easy and convenient monitoring or checking of electrical signal conditions without interfering with existing patch field connections, but also affords a relatively wide flexibility in the circuit connections that can be made with the patching equipment of this invention.

Furthermore, unlike the prior patching equipment discussed above, plugs which are insertable into the third plug-receiving socket of the triple-socket jack and which are operative to establish the previously described circuit connections, may be and preferably are of the same construction as the patch cord plugs that are used in conjunction with the other two plug-receiving sockets in the jack. The same patch cords may therefore be utilized in conjunction with all three of the plug-receiving sockets of the triple-socket jack.

In addition to the triple-socket jacks, the patch module of this invention advantageously includes a terminal or monitoring station which has a jack and electrical connections for connecting the terminals of the jack to an output connector and/or output terminals for selectively patching signal monitoring circuits and/or electrical measuring instruments into the patch field. To monitor or check conditions of signals being fed to or supplied from one of the previously mentioned multi-terminal circuits, the plugs of a patch cord are respectively plugged into the third plug-receiving socket of the associated triple-socket jack of this invention and into the jack at the monitoring station, and the monitoring circuit and/or instruments are connected to the connector or the output terminals at the monitoring station to thereby complete a patch field circuit which connects the monitoring circuit or instruments to the desired multi-terminal circuit.

Thus, the patch module of this invention not only provides for wide flexibility in circuit arrangements, but also presents an uncluttered patch field which is easy and unconfusing to manipulate.

In addition to the triple-socket jack mentioned above, this invention provides for novel single-socket and dual-socket jacks as well as a novelly constructed impedance terminating jack. Several features of this invention are equally applicable to all of the jack constructions of this invention. Furthermore, novel jack features of this invention may, if desired, be incorporated into jack constructions in which the number of normal through circuits is less than three.

In its preferred embodiment, the basic construction of the jacks of this invention mainly comprises a longitudinally split, insulating jack body which mounts the various electrical components of the jack, and a set of contact springs for each plug-receiving socket in the jack.

In accordance with this invention, at least one of the portions of the longitudinally split jack body is exteriorly formed with a row of spaced apart parallel spacer ribs which extend transversely of the plug-receiving socket or sockets in the jack and which define outwardly opening grooves. The contact springs, which are positioned on the exterior of the jack body, are seated in these grooves and are separated and electrically insulated from each other by the spacer ribs. Deflectable portions of the contact springs bridge an aperture which is formed in the jack body and which opens into the associated plug-receiving socket in the jack. When a patch cord plug is inserted into the properly positioned in the plug-receiving socket, the contacts of the plug extend through the above-mentioned aperture in the plug body to engage and deflect the above-mentioned deflectable portions of the contact springs, thereby establishing separate circuit connections between the contact springs and the contacts of the plug which, in turn, are connected to conductors in the cable of the patch cord.

In its preferred embodiment, the triple-socket jack of this invention has three sets of contact springs, one for each of the plug-receiving sockets. The contact springs associated with the previously mentioned first plug-receiving socket are connected to the terminals of one external circuit (such as a signal utilization circuit), and the contact springs associated with the previously mentioned second plug-receiving socket are electrically connected to another external circuit (such as a signal supply circuit). Contact elements in the jack body are normally engaged by the deflectable portions of the two sets of contact springs which are respectively associated with the previously mentioned first and second plug-receiving sockets to establish the previously described normal through circuits in the jack.

These contact elements are trapped between the mating portions of the split jack body and are confined in place only by seating engagement with interior surfaces of the mating portions of the split jack body. With this construction, no fasteners of any kind are required to mount the contact elements in place of the jack body.

The set of contact springs associated with the previously mentioned third plug-receiving socket in the triple-socket jack are in contact with or even may form a part of the contact springs of one of the other two sets of contact springs so as to form extensions of the circuits which are completed up to one of the other two sets of contact springs. Thus, when a patch cord plug is plugged into the previously mentioned third plug-receiving socket of the triple-socket jack, the contacts on the plug will be electrically connected through the contact springs which are associated with the third plug-receiving socket to the contact springs which are associated with one of the other two plug-receiving sockets.

According to a further feature of this invention, the contact springs and the jack body are constructed in such a manner for the triple-socket jack that no fasteners of any kind are required for mounting the contact springs which are associated with the previously mentioned third plug-receiving socket, and each of the remaining contact springs are mounted in place by using a single simplified fastening element.

These and other novel jack features of this invention provide a jack construction which is economical to manufacture and which has relatively few parts. Furthermore, the various jacks of this invention are easily assembled and disassembled, are of rugged, simplified construction, and are reliable in operation, as well as being compact, efficiently organized, and convenient and easy to use. In addition, the jacks of this invention are easily programmable for adaption to different circuit requirements.

According to still another feature of this invention, the jack and plug assemblies are provided with a novel, simplified positioning and releasable locking structure which is effective to position and releasably lock a plugged-in plug in a pre-selected angularly oriented position where the contacts on the plug engage deflectable portions of associated contact springs in the jack. This locking structure mainly consists of a locking pin on the plug, an interior inwardly opening groove in the jack, and a locking plate of simplified construction which cooperates with the groove to define a positioning and locking socket. The plug is axially inserted into the plug-receiving socket to compress a spring in the jack and is then turned to a position where its locking pin aligns with the above-mentioned positioning and locking socket so that when the plug is released, the spring biases the plug outwardly to cause the locking pin to seat in the positioning and locking groove. With the locking pin seated in the positioning and locking socket, the plug is releasably locked against rotation and is in a position where its contacts engage the deflectable portions of the contact springs.

The novel impedance terminating jack of this invention is capable of providing for a multiplicity of normal through impedance terminating circuits which are established by a set of contact springs, a selected number of impedances or resistors, and a selected number of contact elements which complete a normal through circuit connections between the contact springs and pre-selected terminating impedances or resistors. The contact springs are advantageously mounted on one of the mating portions of the longitudinally split jack body, and the terminating impedances or resistors are advantageously mounted on the other mating portion of the longitudinally split jack body. When a multi-contact plug is properly positioned in the plug-receiving socket of the terminating jack, the contacts on the plug engage and deflect the deflectable portions of the contact springs to open the impedance-terminating circuits and to establish circuit connections between the contact springs and the conductors in the patch cord plug.

As compared with the multi-contact plugs described in the previously mentioned U.S. Pat. No. 3,655,129, this invention provides for a novel plug which has fewer parts, is less complicated, is simplified, and is less costly to manufacture. The plug of this invention basically comprises a one-piece body having an outwardly opening conductor-receiving cavity and an insert member which mounts the contact pins of the plug and which is pressed into the mouth of the plug body cavity. Coacting ridges and grooves on the insert member and the plug body interlock to fix the insert member in position on the plug body without the use of fasteners of any kind.

The plug construction described above may be used as a patch cord plug or as an impedance terminating plug. In the case of an impedance terminating plug, impedances or resistors are housed in the plug body cavity. If the plug is used as part of a patch cord, the patch cord cable is readily anchored to one end of the plug body by a simplified crimping tube arrangement.

In one embodiment of this invention, the patch cord plug contact pins are arranged in only one single row on the periphery of the plug. This arrangement limits the number of circuits or circuit paths which can be furnished for a given length of the patch cord plug and the jack. In another embodiment, this limitation is overcome by providing two circumferentially spaced apart rows of contact pins on the plug and by providing a novel arrangement of contact springs in the jack to effectively double the circuit path capacity without increasing the length of either the plug or the jack.

With the foregoing in mind, a major object of this invention resides in the provision of a novel patch facility which is simplified in construction, which provides a relatively uncluttered patch field, and which enables the user to make a wide variety of different combinations or circuit connections.

Another important object of this invention resides in the provision of novel patching equipment which conveniently and easily enables patch field connections to be set up to monitor or check electrical signals without opening any normal through circuit connections in the jacks and without interfering with other patch field connections.

A further object of this invention is to provide a novel triple socket jack which has a multiplicity of normal through circuit connections for interconnecting external circuits and which enables electrical connections to be set up to monitor or check electrical signals being fed to or supplied from one of the external circuits without opening the normal through circuit connections.

Still another object of this invention is to provide a novel jack assembly which is simplified in construction, which is relatively inexpensive to manufacture, and which is easily and quickly assembled and disassembled.

Still another object of this invention is to provide a novel impedance terminating jack.

Another object of this invention is to provide a novel plug which is simplified in construction and relatively inexpensive to manufacture.

Another important object of this invention is to provide a novel jack which is employed with a patch cord plug having two circumferentially spaced apart rows of contact elements to provide a large number of circuit connections.

Still another important object of this invention resides in the provision of a novel patch cord plug which has a plurality of circumferentially spaced apart, longitudinally extending rows of contact elements on its periphery and which is of simplified, sturdy construction and economical to manufacture.

Further objects of this invention will appear as the description proceeds in connection with the appended claims and below-described drawings.

DESCRIPTION OF DRAWINGS

FIG. 2 is a perspective view of the patch module shown in FIG. 1;

FIG. 3 is a rear elevation of the patch module shown in FIG. 2;

FIG. 4 is a front elevation of one of the triple-socket jack assemblies shown in FIGS. 1 and 2;

FIG. 5 is a top plan view of the jack assembly shown in FIG. 4;

FIG. 25 is a fragmentary schematic view of the patch facility shown in FIG. 1, but illustrating a different patch cord arrangement for concomitantly connecting one selected circuit to two other selected circuits;

FIG. 26 is a front elevation of one of the single socket impedance terminating jack assemblies shown in FIG. 1;

FIG. 27 is a left-hand side elevation of the jack assemblies shown in FIG. 26;

FIG. 37A is a perspective view of one of the triple socket jacks with input and output connectors mounted on the jack body.

FIGS. 46, 47, and 48 are perspective views of the contact springs shown in FIGS. 39–45;

FIG. 48A is a partially schematic perspective view of a patch field employing two of the jacks shown in FIG. 38;

DETAILED DESCRIPTION

Figure 1:
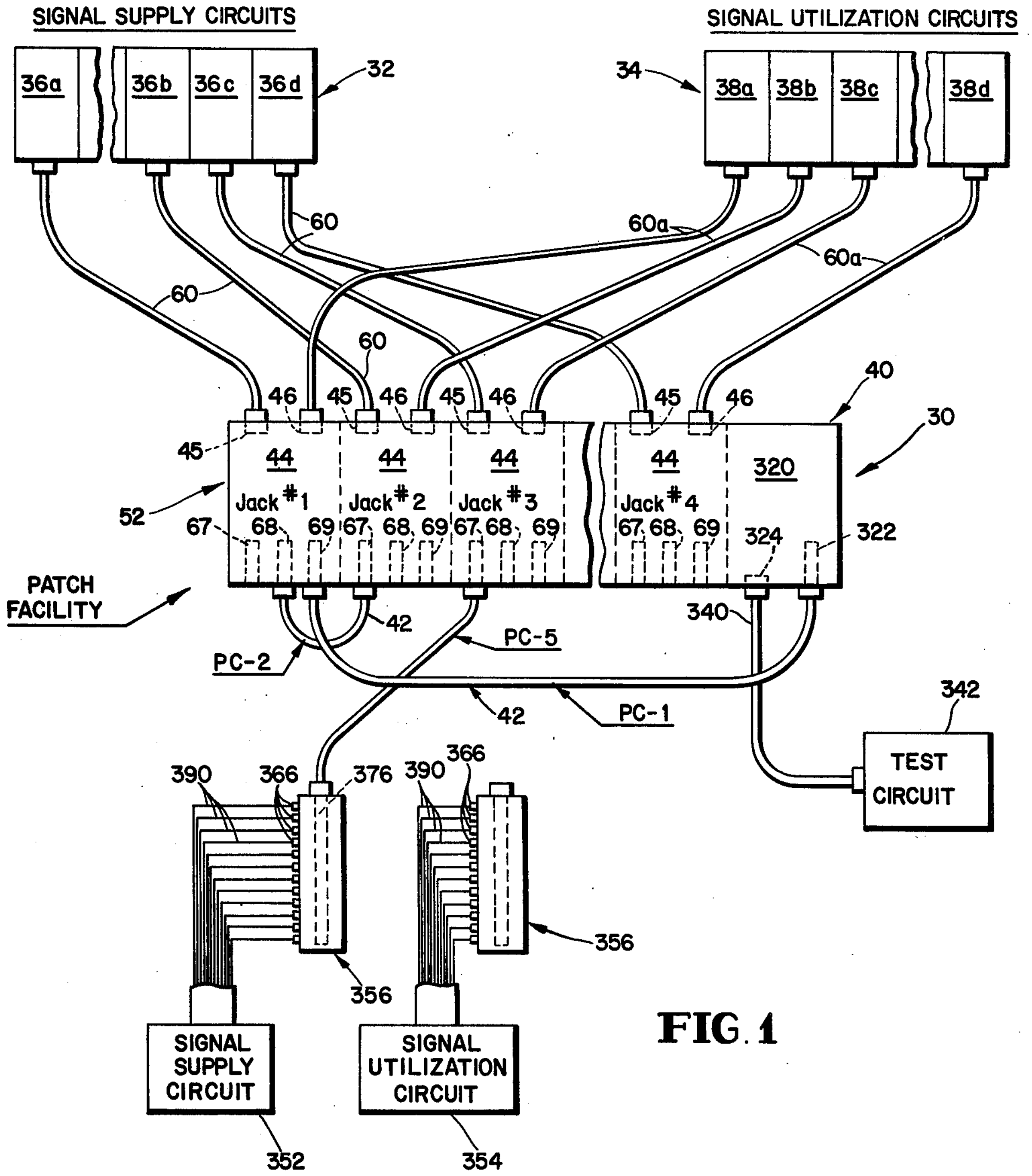
FIG. 1 is a generally schematic diagram of a patch facility incorporating the principles of the invention.

Referring to FIGS. 1 and 2, the multi-circuit patch facility, which incorporates the principles of this invention, is generally indicated at 30 and provides an interface between electrical circuits. Patch facility 30 is typically utilized to connect input, line or supply equipment 32 to terminal or load equipment 34. The supply equipment 32 may include a multiplicity of electrical signal sources or signal supply circuits.

Four signal supply circuits are shown for the purpose of illustration and are indicated at 36*a*, 36*b*, 36*c* and 36*d*. Likewise, the load equipment 34 may include a multiplicity of loads or signal utilization circuits. Four signal utilization circuits are shown for the purpose of illustration and are indicated at 38*a*, 38*b*, 38*c* and 38*d*.

By way of example, the interfacing circuit connections which the patch facility provides may be used to connect selected modem output ports to selected computer input ports to feed electrical signals to one or more computers. In general, patch facility 30 provides the necessary connections for connecting one or more multi-terminal circuits to one or more different multi-terminal circuits and is customarily utilized to feed electrical signals from one or more signal supply circuits to one or more signal utilization circuits.

As shown in FIGS. 2 and 3, patch facilty 30 comprises a patch module 40 and a number of patch cord assemblies 42. Module 40 comprises a selected number of triple socket jack assemblies 44 which embody novel features of this invention, a conventional input connector 45 for each jack assembly 44, and a conventional output connector 46 for each jack assembly. Module 40 is usually constructed with a multiplicity of jack assemblies as shown. Jack assemblies 44 preferably are of the same construction. Connectors 45 and 46 advantageously may be a standard E.I.A. (Electronics Industries Association) type.

As will be described in detail later on, each jack assembly 44 provides a pre-selected number of normal through circuits. Each of the normal through circuits is adapted to electrically connect one electrical circuit terminal to another electrical circuit terminal. In this embodiment each jack assembly provides for as many as twelve normal through circuits, but the number of normal through circuits may be varied as desired.

Figure 6:
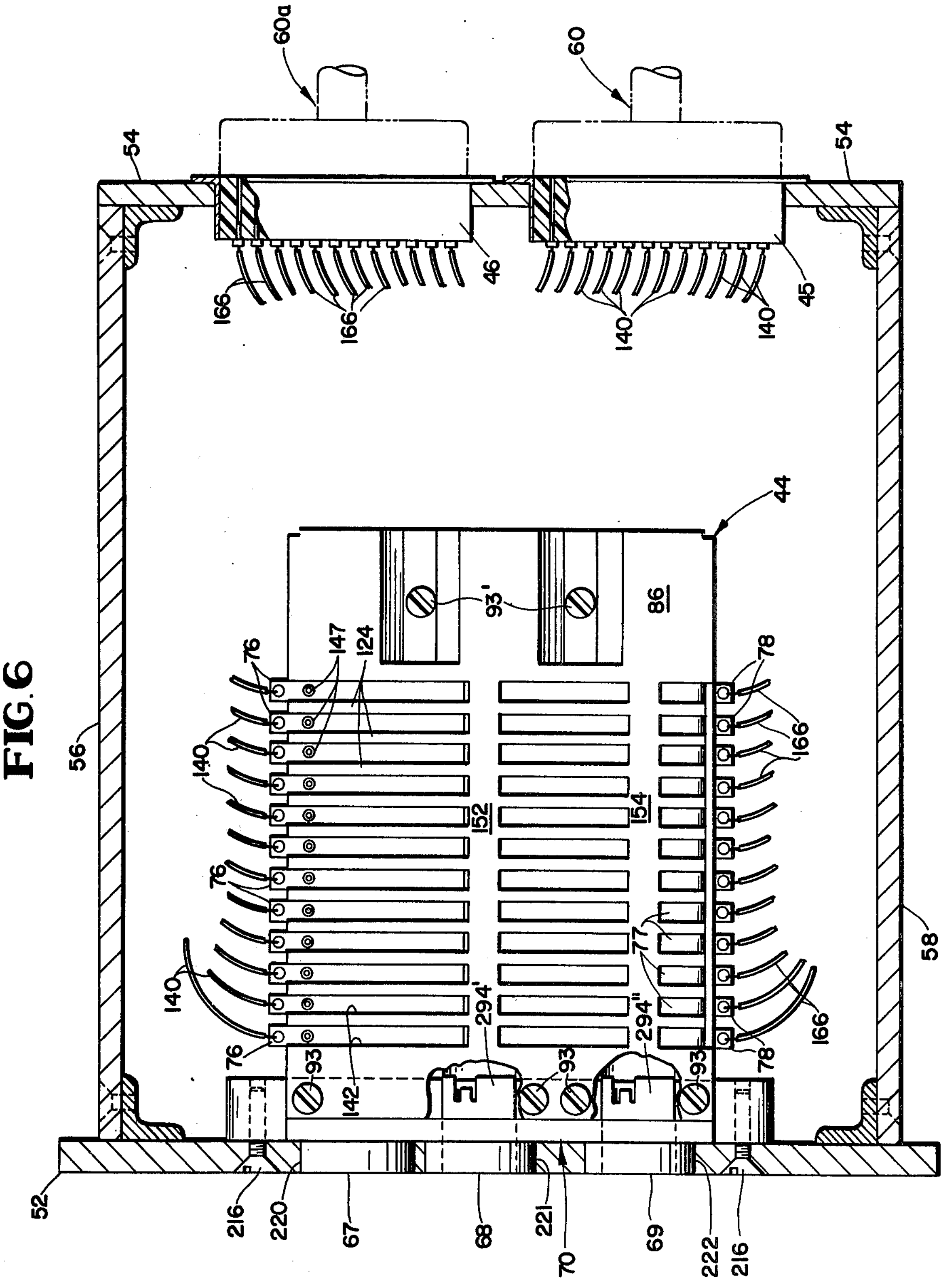
FIG. 6 is a section taken substantially along lines 6—6 of FIG. 2 and illustrating a left hand side elevation of the triple-socket jack assembly shown in FIGS. 4 and 5.

As shown in FIGS. 2, 3 and 6, jack assemblies 44, connectors 45 and 46 and other components of module 40 are advantageously housed in a suitably constructed enclosure 50 which comprises a front jack-mounting panel 52, a chassis 54, a removable top cover 56 and a removable bottom cover 58 (see FIG. 6). Chassis 54 defines the two side walls and the rear wall of enclosure 50 as shown. Panel 52 defines the front wall of enclosure 50 and is suitably mounted on chassis 54. Covers 56 and 58 are detachably fixed to chassis 54 by screws 60 or other suitable means and are each removable to provide access to the interior of enclosure 50.

Jack assemblies 44 are accessed from the front of panel 52, and connectors 45 and 46 are accessed from the rear of chassis 54. As shown in FIG. 2, the side edges of panel 52 are notched for receiving screws or other fasteners to mount enclosure 50 on unshown support racks or brackets.

Figure 16:
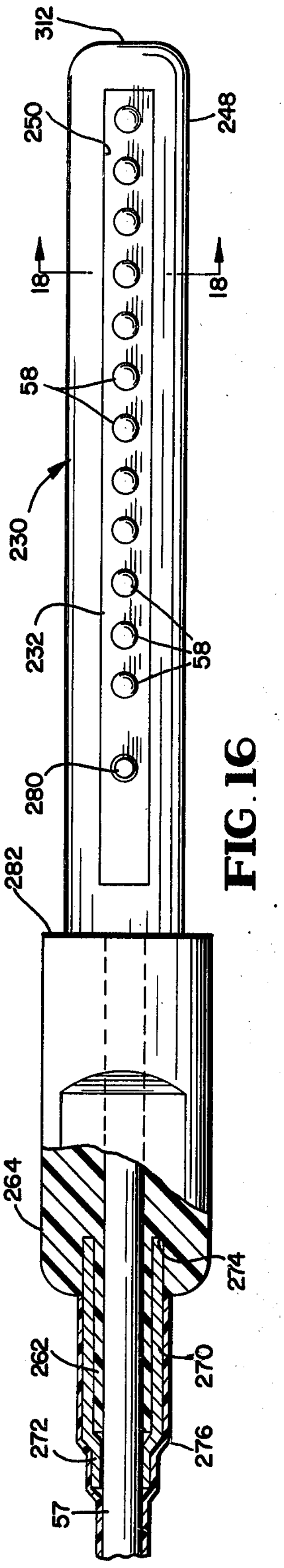
FIG. 16 is a top plan view of one of the patch cord plugs shown in FIGS. 1 and 2.

As shown in FIGS. 2 and 16, each patch cord assembly 42 comprises a pair of patch plugs 55 and a flexible, multi-conductor cable 57. Patch plugs 55, which are preferably of the same construction, each has a series of contact pins 58.

To make circuit connections to the normal through circuits in a selected one of the jack assemblies 44, the input connector 45 for the selected jack assembly is connected by any suitable means (such as a cable and connector assembly 60 as shown in FIG. 1) to the input of the selected signal supply circuit, and the output connector 46 for the selected jack assembly is connected by any suitable means (such as another cable and connector assembly 60*a*) to the input of the selected signal utilization circuit. In FIG. 1, cable and connector assemblies 60 and 60*a* are shown to connect circuit 36*a* through the normal through circuits of the left-hand jack assembly to circuit 38*a*.

In accordance with one feature of this invention each of the jack assemblies 44 has three patch plug-receiving sockets 67, 68 and 69 and, hence, three patching positions as shown in FIGS. 1 and 2. As will become apparent from the following description of jack assemblies 44, patching into socket 67 breaks or opens the normal through circuits in the jack assembly and picks up the input of the signal utilization circuit which is connected to the associated output connector 46. Patching into socket 68 breaks or opens the normal through circuits in the jack assembly and picks up the signal supply circuit which is connected to the associated input connector 45. Patching into socket 69 provides monitoring or trunking connections to the input side of the jack assembly without opening the normal through circuits in the jack assembly and without altering any patch field circuits that may have been established by patching into either or both sockets 67 and 68.

Referring to FIGS. 4–9, each jack assembly 44 comprises a one-piece front mounting block 70, an insulator body or housing 72, a series of cylindrical contact pins 74, a first series of contact springs 76, a second series of contact springs 77, a third series of contact springs 78, and three coiled compression springs 80, 81 and 82. Housing 72 has top, bottom, rear and side walls and is longitudinally divided into a pair of separately formed halves or shells 86 and 88. Shells 86 and 88 are advantageously separately molded from a suitable, electrically non-conductive plastics material.

Shells 86 and 88 define generally complementary halves of the top, bottom, and rear walls of housing 72 as shown. Shells 86 and 88 also define generally complementary halves of each of three parallel, spaced apart interior cavities or sockets 90, 91 and 92 which respectively define the major portions of sockets 67, 68 and 69.

Figure 9:
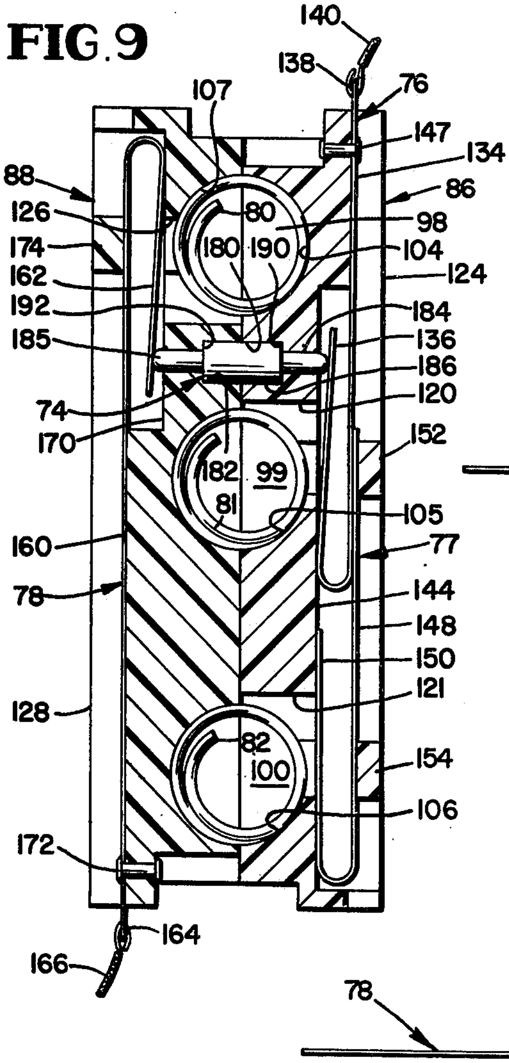
FIG. 9 is a section taken substantially along lines 9—9 of FIG. 5.
Figure 10:
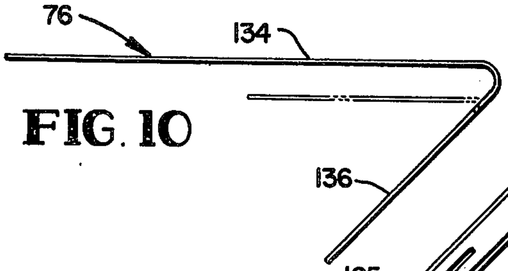
FIG. 10 is a side elevation of one of the contact springs shown in FIG. 9.
Figure 7:
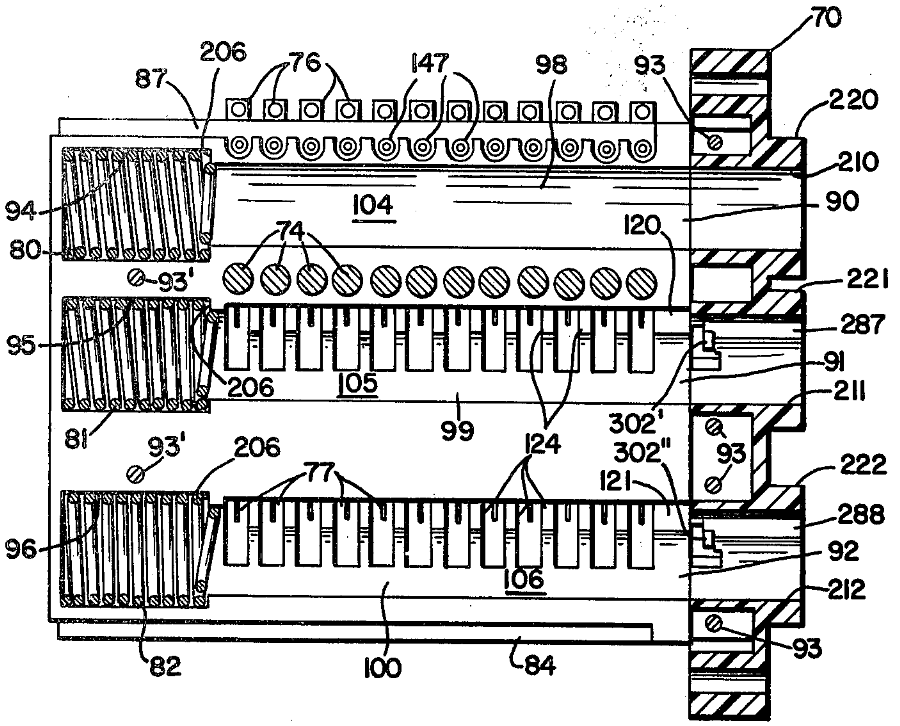
FIGS. 7 and 8 are sections taken respectively along lines 7—7 and 8—8 of FIG. 4.
Figure 8:
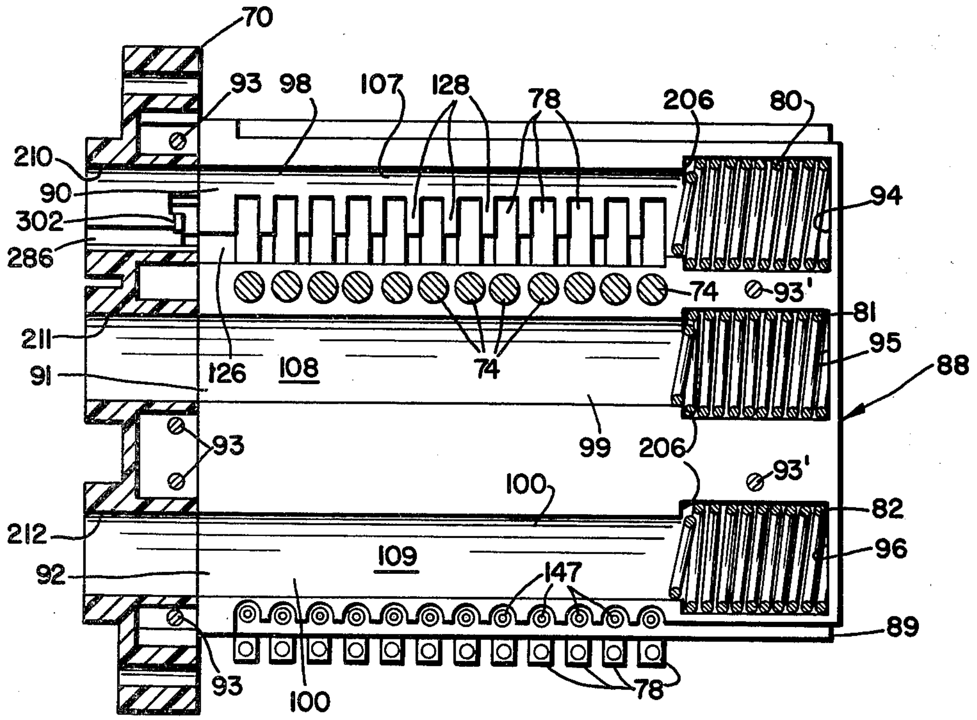

Cavities 90–92, which are elongated and substantially coextensive, are disposed in a vertical row as shown in FIGS. 7–9 and are delimited by interior cylindrical surfaces of shells 86 and 88. The longitudinal axes of cavities 90–92 are parallel and are contained in a common plane. The rear ends of cavities 90–92 are closed by the rear wall of housing 72, and the opposite ends of cavities open outwardly as shown.

Shells 86 and 88 have flat opposing surfaces 87 (FIG. 7) and 89 (FIG. 8) which interfittingly seat against each other in assembled relation. The interface between shells 86 and 88 lies in a plane that contains the longitudinal axes of cavities 90–92.

Shells 86 and 88 are rigidly, but detachably fixed by screws 93 to mounting block 70. Near the rear wall of housing 72, shells 86 and 88 are rigidly, detachably secured together by nut and bolt assemblies 93′.

Near the rear wall of housing 72, shells 86 and 88 are interiorly stepped to provide each of the cavities 90–92 with a short diametrically enlarged spring-receiving socket section and with a significantly longer patch plug-receiving barrel section of somewhat smaller diameter. The spring-receiving cavity sections of cavities 90, 91 and 92 are respectively indicated at 94, 95 and 96 in FIGS. 8 and 9, and the plug-receiving barrel sections of cavities 90, 91 and 92 are respectively indicated at 98, 99 and 100 in FIGS. 8 and 9. The longitudinal axes of barrel sections 98, 99 and 100 axially aligned respectively with the longitudinal axes of cavity sections 94, 95 and 96.

Still referring to FIGS. 7–9, shell 86 is interiorly formed with smooth uniformly diametered cylindrical surfaces 104, 105 and 106, and shell 88 is interiorly formed with smooth, uniformily diametered cylindrical surfaces 107, 108 and 109. Barrel section 98 is delimited by cylindrical surfaces 104 and 107, barrel section 99 is delimited by surfaces 105 and 108, and barrel section 100 is delimited by surfaces 106 and 109. This construction for barrel sections 98–100 eliminates the need for separate tubular inserts which are used as jack barrels as in the previously mentioned U.S. Pat. No. 3,665,129.

Referring to FIGS. 6, 7 and 9, surfaces 105 and 106 respectively terminate at elongated generally rectangular apertures 120 and 121 which are formed through the side wall of shell 86. Apertures 120 and 121 respectively open into barrel sections 99 and 100. Shell 86 is integrally formed with a series of exterior, straight, parallel spaced apart spacer ribs 124 which bridge apertures 120 and 121 and which extend between the top and bottom walls of shell 86. As will be described in detail shortly, contact springs 76 and 77 are spaced apart and electrically insulated from each other by ribs 124.

Figure 6A:
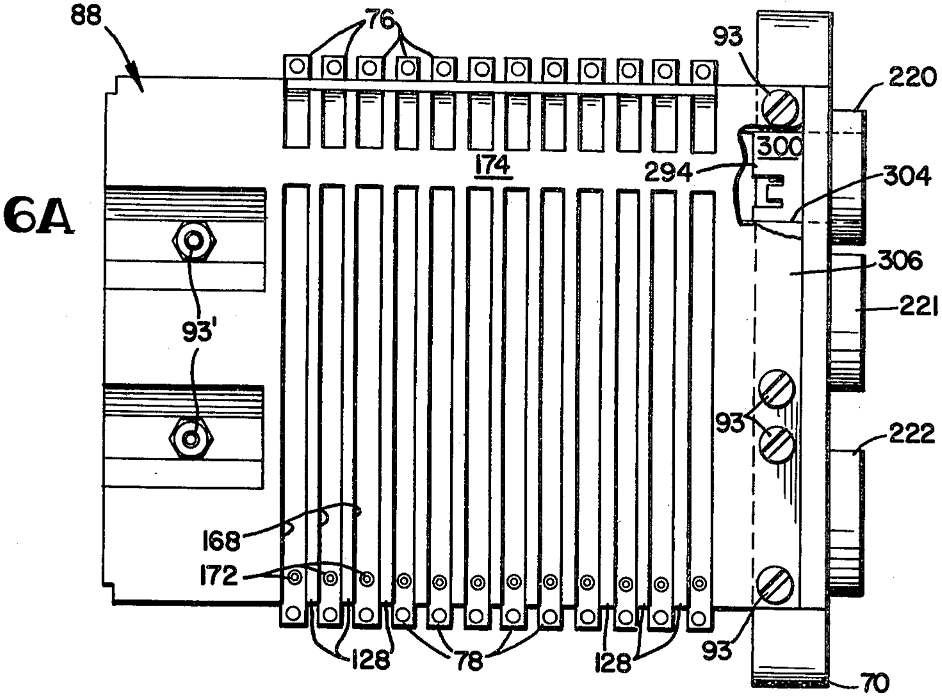
FIG. 6A is a right-hand side elevation of the triple-socket jack assembly shown in FIG. 4.

Referring to FIGS. 6A, 8 and 9, surface 107 terminates at a generally rectangular aperture 126 which is formed through the side wall of shell 88 and which opens into barrel section 98. Shell 88 is integrally formed with a series exterior, straight, parallel, spaced apart spacer ribs 128 which bridge aperture 126 and which extend between the top and bottom walls of shell 88. As will be described in detail shortly, contact springs 78 are spaced apart and electrically insulated from each other by ribs 128.

Each of the contact springs 76–78 is formed from thin, flexible, flat-sided bus wire (see FIGS. 10–15). In FIGS. 10–15, springs 76–78 are shown in their relaxed, undeflected or unflexed conditions. For this embodiment, there are twelve springs 76, twelve springs 77, and twelve springs 78. It will be appreciated, however, that the number of springs 77–78 may be varied as desired to make selected circuit connections.

As shown in FIGS. 6, 9, 10 and 11, each spring 76 has a straight portion 134 and a bifurcated tail or end portion 136 which is bent backwardly toward portion 134 to overlie, but not contact portion 134 in its undeflected condition. Portion 134 terminates at its free end in a terminal 138 which is connected by an insulated conductor 140 to a selected terminal in connector 46.

As best shown in FIG. 6, ribs 124 define a series of straight, parallel, outwardly opening, spaced apart grooves 142. Spring portions 134 are seated one in each of the grooves 142.

As shown in FIG. 9, tail portions 136, which are disposed inwardly of their associated portions 134 in the jack assembly, are positioned in an outwardly opening recessed region in the side wall of shell 86 and seat against a recessed, flat side wall surface 144 of shell 86. Apertures 120 and 121 are formed through side wall surface 144 as shown.

Each tail portion 136 is disposed and confined between adjacent ribs 124 and crosses aperture 120 so that it is engageable by one of the patch plug contact pins 58 when one of the patch plugs is plugged into and properly positioned in barrel section 99. Each of the springs 76 is secured to shell 86 only by a single suitable fastening element such as a rivet 147 which extends through portion 134 adjacent to terminal 138.

Referring to FIGS. 6, 9, 12 and 13, each spring 77 has a straight portion 148 and a tail portion 150 which is bent backwardly toward portion 148 to overlie, but not contact portion 148 in its undeflected condition. The configuration of spring 77 corresponds to that of spring 76 except that tail portion 150 is not bifurcated.

As best shown in FIG. 6, the straight portions 148 of springs 77 are seated in separate ones of grooves 142. Tail portions 150, as shown in FIG. 9, are disposed inwardly of their associated straight portions 148, are positioned in the previously mentioned recessed side wall region which receives tail portions 138, and seat against side wall surface 144. Each tail portion 150 is disposed between adjacent ribs 124 below springs 76 and crosses aperture 121 so that it is engageable by one of the patch plug contact pins 58 when one of the patch plugs is plugged into and properly positioned in barrel section 100.

Springs 76 and 77 are arranged in pairs in such a manner that the free end of the spring portion 148 of each pair overlaps and seats against an associated spring portion 134 in the region that is adjacent to the bend in the associated spring 76. In this manner, electrical contact is established between the two overlapping springs of each pair. Each pair of overlapping springs 76 and 77, which electrically contact each other, are seated in the same groove 142 in the side wall of shell 86. Each pair of overlapping springs 76 and 77 is spaced from and electrically insulated from the remaining pairs of overlapping springs by ribs 124.

As shown in FIGS. 6 and 9, shell 86 is integrally formed on the exterior of its side wall with two spaced apart, coextensive spring retainer rib portions 152 and 154 which extend parallel to the longitudinal axes of cavities 90–92 and which perpendicularly intersect ribs 124. Rib portions 152 and 154 bridge the recessed region of shell 86 and are spaced outwardly from side wall surface 144 by a pre-selected distance. Regions of springs 76 and 77 lie between surface 144 and rib portion 152, and regions of springs 77 lie between surface 144 and rib portion 154 for purposes that will now be explained.

As shown in FIG. 9, rib portion 152, which extends perpendicularly of springs 77 and 78, lies against the straight contact spring portions 148 in the regions where they overlap spring portions 134. In this region of each spring 76, the relaxed, undeflected spacing between spring portions 134 and 136 is greater than the spacing between rib 152 and side wall surface 144 so that in assembled relation with shell 86, each tail portion 136 is flexed or deflected toward its associated straight spring portion 134.

Each tail portion 136 thus reacts against side wall surface 144 to yieldably bias its associated straight portion 134 snugly against the overlapping region of the associated straight spring portion 148 which lies against rib portion 152. From this construction it will be appreciated that rib portion 152 and wall surface 144 cooperate to confine the lower ends of springs 76 and the upper ends of springs 77 from deflecting or flexing out of grooves 142.

Rib portion 154, which is spaced vertically below rib portion 152 and which extends perpendicularly of springs 77, lies against regions of the straight spring portions 148 which are near the bends in springs 77. In these regions the relaxed, undeflected spacing between portions 148 and 150 is greater than the spacing between wall surface 144 and rib portion 154 so that in assembled relation with shell 86, tail portions 150 are yieldably deflected or flexed toward their associated straight portions 148. As a result, tail portions 150, like tail portions 136, snugly seat against surface 144, and regions of straight portions 148 snugly seat against rib portion 154. The lower portions of springs 77 are thus yieldably confined between surface 144 and rib 154, while the upper portions of springs 77 are confined between rib 152 and the lower portions of springs 76.

With the foregoing construction no separate fasteners of any kind are required for confining springs 77 in their proper, operative positions on shell 86. Thus, by virtue of the novel construction of springs 76 and 77 and of shell 86, only one separate fastening element, such as rivet 147, is required to retain each pair of overlapping springs 76 and 77 in their proper operative positions on shell 86.

It will be appreciated that springs 76 and 77 are carried only by shell 86. Springs 78, on the other hand, are carried by shell 88 as will be apparent from the following description.

Referring to FIGS. 6A, 9, 14 and 15 each spring 78 has a straight portion 160 and a bifurcated tail portion 162 which is bent backwardly toward portion 160 to overlie, but not contact portion 160 in its relaxed, undeflected condition. Portion 160 terminates at its free end in a terminal 164 which is connected by an insulated conductor 166 to a selected terminal in connector 45. The configuration of springs 78 are the same as that of springs 76. The bends in springs 76–78 are such that they retain the shapes shown in FIGS. 10–15 in their relaxed conditions.

As best shown in FIG. 6A, ribs 128 define a series of straight, parallel, outwardly opening, spaced apart grooves 168. Spring portions 160 are seated, one in each of the grooves 168.

As shown in FIG. 9, tail portions 162, which are disposed inwardly of their associated straight portions in the jack assembly, are positioned in a recessed region in the side wall of shell 88 and seat against a recessed, flat side wall surface 170 of shell 88. Aperture 126 is formed through side wall surface 170 as shown.

Each tail portion 162 is disposed and confined between adjacent ribs 128 and crosses aperture 126 so that it is engageable by one of the patch plug contact pins 58 when one of the patch plugs is plugged into and properly positioned in barrel section 98. Each of the springs 78 is anchored to shell 88 only by a single suitable fastening element such as a rivet 172 which extends through portion 160 adjacent to terminal 164.

Still referring to FIGS. 6A and 9, shell 88 is integrally formed on the exterior of its side wall with a straight spring retainer rib portion 174 which extends parallel to the longitudinal axes of cavities 90–92 and which perpendicularly intersects ribs 128. Rib portion 174 bridges the recessed side wall region of shell 88 and is spaced outwardly from side wall surface 170 by a pre-selected distance. Regions of springs 78 lie between rib portion 174 and surface 170 as shown. Springs 78 are spaced from and electrically insulated from each other by ribs 128.

With reference to FIG. 9, rib portion 174, which extends perpendicularly of springs 78, lies against the straight contact spring portions 160 in a region which is near the bend in each spring 78. In this region of each spring 78, the relaxed, undeflected spacing between spring portions 160 and 162 is greater than the spacing between rib portion 174 and side wall surface 170 so that in assembled relation with shell 88, each tail portion 162 is flexed or deflected towards its associated straight spring portion 160. As a result, tail portions 162 snugly seat against surface 170, and regions of the straight portions 160 snugly seat against rib portion 174.

With reference to FIGS. 7–9, shell 86 is formed with a straight row of stepped, through bores 180, and shell 88 is formed with a corresponding straight row of similarly stepped, through bores 182. Bores 180 and 182, which receive contact pins 74, are arranged in pairs, with the two bores of each pair being in axial alignment with each other. The axes of bores 180 and 182 are parallel with each other and are contained in a common plane which is parallel to the longitudinal axes of barrel sections 98–100 and which normally intersects surfaces 144 and 170.

Bores 180 are uniformly spaced apart, and their parallel axes are normal to the common plane which contains the axes of cavities 90–92. Bores 180 extend from surface 144 to the inwardly facing shell surface 87 which seats against the opposing inner flat face of shell 88.

Similarly, bores 182 are uniformly spaced apart and extend from surface 170 to the inwardly facing shell surface which seats against the opposing inner face of shell 86. Bores 180 and 182 extend between barrel sections 98 and 99. The bifurcated end of each tail portion 136 overlies an associated one of the bores 180, and the bifurcated end of each tail portion 162 similarly overlies an associated one of the bores 182.

The arrangement of bores 180 and 182 and of springs 77 and 78 is such that the common axis of each pair of aligned bores 180 and 182 intersects the bifurcated end of one associated tail portion 136 and the bifurcated end of one associated tail portion 162. Furthermore, this arrangement is such that parallel planes which contain the common axes of the several pairs of aligned bores 180 and 182 and which normally intersect the longitudinal axes of cavities 90–92, medially and normally intersect separate pairs of the tail portions 136 and 162.

As shown in FIGS. 7–9, one contact pin 74 is coaxially received in each pair of aligned bores 180 and 182. Each contact pin 74 has end sections 184 and 185 of the same relatively small diameter and an enlarged diametered center section 186 which extends axially between end sections 184 and 185. Center section 186 is coaxially received in the diametrically enlarged sections of the two associated bores 180 and 182, end section 184 coaxially extends through the smaller diametered section of the associated bores 180, and end section 185 coaxially extends through the smaller diametered section of the associated bore 182.

As shown in FIG. 9, bore 180 is formed with an annular inwardly facing shoulder 190 at the junction between its large diametered bore section and its small diametered bore section. Similarly, bore 182 is formed with an annular inwardly facing annular shoulder 192 which is at the junction between its diametrically enlarged bore section and its smaller bore section.

The oppositely facing, axially directed end faces of pin section 186 are abuttable with the associated shoulders 190 and 192 so that each pin 74 is confined against axial displacement relative to shells 86 and 88. Thus, each of the contact pins 74 is trapped between shells 86 and 88 and is confined against axial displacement in its associated pair of bores 180 and 182 only by seating surface engagement with the associated annular shoulders 190 and 129. From this construction it will be appreciated that no separate fasteners of any kind are required to mount contact pins 74 in place in the housing shells 86 and 88. The interface between shells 86 and 88 lies in a plane which substantially perpendicularly and medially intersects contact pins 74.

The end section 184 of each contact pin is sufficiently long to extend by a short distance axially beyond its associated bore 180 to positively contact the bifurcated end of its associated tail portion 136 and to flex or deflect its associated tail portion 136 outwardly as shown in FIG. 9. Similarly, the end section 185 of each contact pin is sufficiently long to extend by a short distance axially beyond its associated bore 182 to positively contact the bifurcated end of its associated tail portion 162 and to flex or deflect its associated tail portion 162 outwardly as shown in FIG. 9. Thus, from the position of parts shown in FIG. 9, it will be appreciated that contact pins 74 establish electrical continuity between the associated pairs of contact springs 76 and 78.

The purpose of bifurcating the ends of each of the contact spring tail portions 136 and 162 is to provide a two point contact rather than a one point contact with its associated contact pin 74. As compared with a single point contact arrangement, the two point contact, which is established by the bifurcated tail portions 136 and 162, significantly reduces the changes of having open circuits occur by the presence of dirt or other foreign particles.

Figure 11:
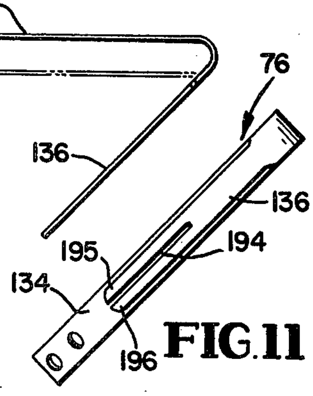
FIG. 11 is a front view of the contact spring shown in FIG. 10.
Figure 12:
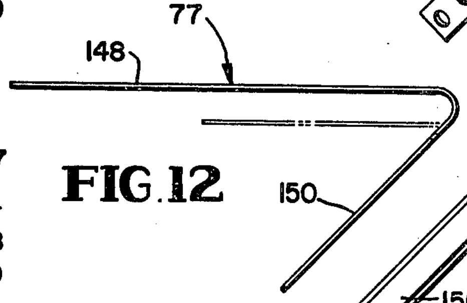
FIG. 12 is a side elevation of another one of the contact springs shown in FIG. 9.
Figure 13:
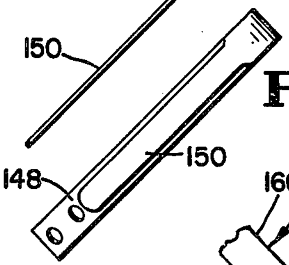
FIG. 13 is a front view of the contact spring shown in FIG. 12.
Figure 15:
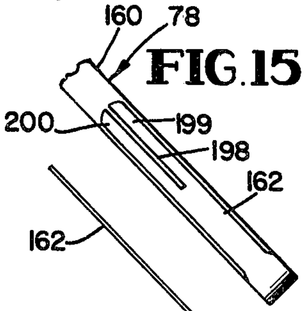
FIG. 15 is a front view of the contact spring shown in FIG. 14.
Figure 14:
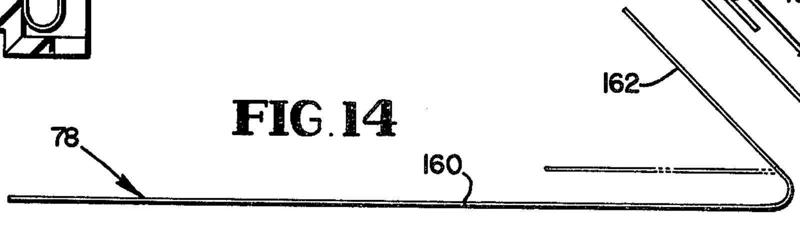
FIG. 14 is a side elevation of still another one of the contact springs shown in FIG. 9.

As shown in FIG. 11, each tail portion 136 is bifurcated by a narrow slot 194 which extends along the longitudinal axis of the contact spring and which opens at the free end of the tail portion 136. Slot 194 provides a pair of parallel contact spring arms 195 and 196 which are both engaged by the end section 184 of the associated contact pin 74 to provide the two point contact mentioned above.

Similarly, the bifurcated end of each tail portion 162 is formed by a narrow slot 198 which extends along the longitudinal axis of the contact spring and which opens at the free end of the tail portion 162. Slot 198 provides a pair of parallel spring contact arms 199 and 200 which are engaged by the end section 185 of the associated contact pins 74 to provide the two point contact mentioned above.

From the foregoing description it will be appreciated that when no patch plugs are plugged into barrel sections 98 and 99 each contact pin 74 and its associated pair of contact springs 76 and 78 provide a normal through circuit which has two sets of normally closed contacts in series and which, in conjunction with conductors 140 and 166, completes a circuit between selected terminals in connectors 45 and 46. In this embodiment 12 such normal through circuits are provided for, each of which is electrically insulated from the others. Again, it will be appreciated that the number of through circuits may be varied as desired.

The terminals in each connector 45 are customarily electrically insulated from each other. Similarly, the terminals in each connector 46 are customarily electrically insulated from each other. Each of the connector and cable assemblies 60 and 60*a*, which may be of any suitable conventional construction, are constructed to provide separate circuits which are electrically insulated from each other. Connector and cable assembly 60 thus connects selected terminals of connector 45 to selected terminals of one of the signal supply circuits as shown in FIG. 1. Cable and connector assembly 60*a* similarly connects selected terminals of its associated connector 46 to selected terminals of one of the signal utilization circuits as also shown in FIG. 1.

Thus, with this construction, each jack assembly 44 of this invention and each associated pair of cable assemblies 60 and 60*a* provide a multiplicity of normal through electrical circuits which are electrically insulated from each other and which each connect a selected terminal of one circuit to a selected terminal of another circuit when no patch plugs are plugged into either socket 67 or socket 68.

As shown in FIGS. 7 and 8, compression springs 80, 81 and 82 are respectively coaxially seated in the cavity sections 94, 95 and 96. Each of the cavities 90–92 is formed with a split annular shoulder 206 at the junction between its associated barrel section and its associated spring-receiving section. Complementary halves of each shoulder 206 are respectively formed by shells 86 and 88. With this construction it will be appreciated that each of the compression springs 80–82 is axially compressed between the rear wall of housing 72 and its associated shoulder 206 and is trapped between the opposing, interior, cylindrically contoured surfaces of shells 86 and 88. Thus, springs 80–82 are confined in place without the use of fasteners of any kind.

As will be described in detail later on, the purpose of compression springs 80–82 is to apply an axial bias to patch plugs when they are plugged into barrel sections 98–100.

It will be appreciated that each of the shells 86 and 88 may be made up from more than one separately formed piece. However, the one piece construction of each of the shells 86 and 88 as previously described is more economical and simplifies the manufacture of the jack assembly.

Referring to FIGS. 4, 7 and 8, the front mounting block 70 is formed from a suitable electrically non-conductive material. Preferably, block 70 is molded as one piece from a suitable electrically non-conductive material. Block 70 is formed with a series of three spaced apart axial through bores 210, 211 and 212. Bores 210, 211 and 212 axially align with barrel sections 98, 99 and 100 respectively. The diameters of bores 210–212 are uniform and are substantially equal to the uniform diameters of barrel sections 98–100. Thus, bores 210–212 provide smooth, substantially uninterrupted continuations of barrel sections 98–100 respectively.

Mounting block 70 has a flat back face which interfittingly seats against opposing front faces of shells 86 and 88. The interface between shells 86 and 88 lies in a plane which substantially medially intersects mounting block 70 and which contains the parallel spaced apart longitudinal axes of bores 210, 211 and 212. Socket 67 is defined by bore 210 and barrel section 98, socket 68 is defined by bore 211 and barrel section 99, and socket 69 is defined by bore 212 and barrel section 100.

As shown in FIG. 6, each jack assembly 44 is fixed to front panel 52 by screws 216. Mounting block 70 is integrally formed with collar portions 220, 221 and 222 which respectively define the forward regions of bores 210, 211 and 212 and which interfittingly and coaxially extend through apertures in panel 52.

Figure 17:
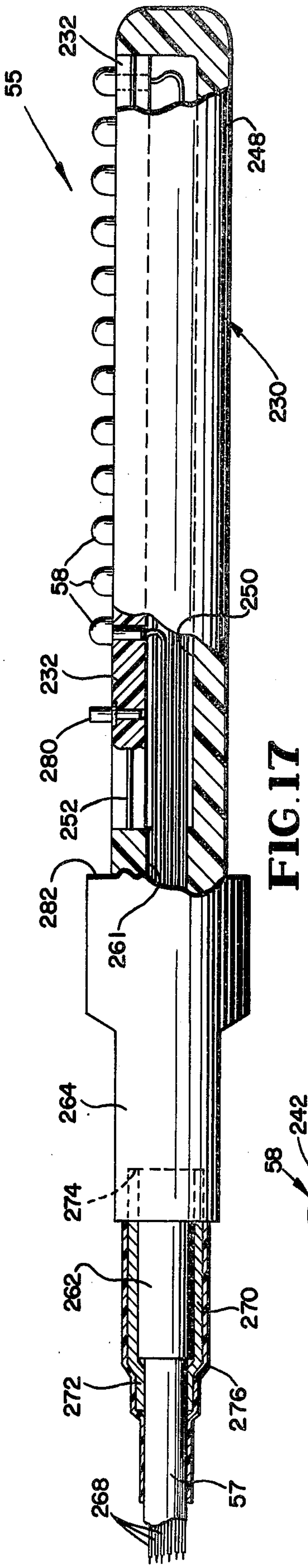
FIG. 17 is a side elevation of the patch plug shown in FIG. 16, with portions of the patch plug body broken away to illustrate interior details.
Figure 22:
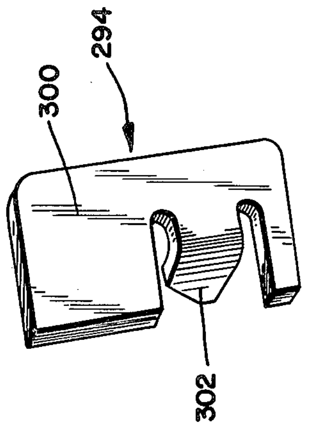
FIG. 22 is a perspective view of one of the patch cord plug locking plates shown in FIG. 19.
Figure 18:
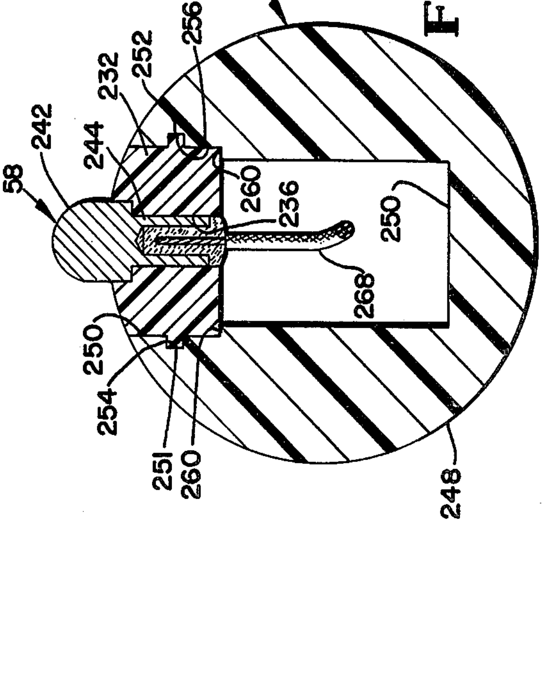
FIG. 18 is a section taken substantially along lines 18—18 of FIG. 16.

Referring to FIGS. 16–18, each patch cord plug 55 comprises a body 230, a contact mounting strip or insert 232, and the previously mentioned contact pins 58. Insert 232 mounts contact pins 58 and electrically insulates the contact pins 58 from each other. Insert 232 is advantageously molded as one piece from a suitable electrically non-conducting plastics material.

Referring to FIGS. 16 and 18, insert 232 has an elongated rectangular configuration and is formed with a series of pin-mounting stepped through bores 236 (See FIG. 18) which are arranged in a straight row. The axes of bores 236 are parallel, are uniformly spaced apart, and are contained in a radial plane which medially intersects insert 232 and body 230.

Contact pins 58, which are coaxially received with a tight fit one in each of the bores 236, are each formed with an enlarged head 242 is seated in the enlarged section of bore 236. As shown, the enlarged head 242 seats against the step in the bore to limit the extent to which the contact pin can be inserted into bore 236. The enlarged contact head 242 protrudes beyond strip 232 by a pre-selected distance. With this construction pins 58 project radially from the plug periphery and are disposed in longitudinally spaced relation in a straight row along the plug periphery. The parallel longitudinal axes of pins 58 lie in a common plane and extend normally of the longitudinal plug axis.

In this example twelve bores 236 and twelve contact pins 58 are shown, although it will be appreciated that the number of contact pins 58 and the number of bores 236 may be varied as needed to make desired electrical connections.

As shown in FIGS. 16 and 18, body 230, which is advantageously molded as one piece from a suitable electrically non-conductive plastics material, has a cylindrically contoured, uniformly diametered elongated barrel portion 248 which is formed with an elongated, radially outwardly opening cavity 250. Cavity 250 is elongated in the direction of the longitudinal axis of barrel portion 248 and is medially intersected by a plane containing the longitudinal axis of the plug. Insert 232 is tightly and interfittingly seated in the mouth of cavity 250 and is integrally formed with a pair of lips or ridges 251 and 252 which are respectively interfitting seated in inwardly opening grooves 254 and 256. Ridges 251 and 252 are parallel, project from the oppositely facing, otherwise flat sides of insert 232, and may extend substantially the entire length of insert 232. Grooves 254 and 256 are formed in barrel portion 248 and open into cavity 250 as shown. Ridges 251 and 252 and grooves 254 and 256 extend parallel to the longitudinal axis of the plug.

The plastics material from which insert 232 is formed is sufficiently deformable such that, for the uniform thicknesses or ridges 251 and 252, ridges 251 and 252 are capable of being flexed along with deformation of insert 232 to enable ridges 251 and 252 to be forced radially through the mouth of cavity 250 to enter and seat in grooves 254 and 256. With this construction it will be appreciated that no fasteners of any kind are required to mount insert 232 on barrel portion 248.

With continued reference to FIG. 18, the side walls of cavity 250 are formed with flat, outwardly facing shoulders or ledges 260 between the bottom wall of cavity 50 and grooves 252 and 254. Shoulders 260 may extend the length of cavity 250 in parallel relation with the longitudinal axis of barrel portion 248. The flat bottom of insert 232 seats against shoulders 260 to limit the extent to which insert 232 can be inserted into cavity 250. The outer periphery of insert 232 is curved so that it forms a uniform continuation of the uniformly diametered cylindrical outer periphery of barrel portion 248.

As shown in FIGS. 16 and 17, body 230 is formed with a bore 261 which is coaxial with the longitudinal axis of barrel portion 248. Bore 261 opens at its inner end into cavity 250 in the cavity space between the bottom wall of cavity 250 and the bottom of insert 232. The other end of bore 261 opens at the cable connecting end of body 230 and is partially formed by a tubular extension 262. Extension 262 is integral with body 248 and projects axially from a rear end portion 264 by body 230.

Figure 19:
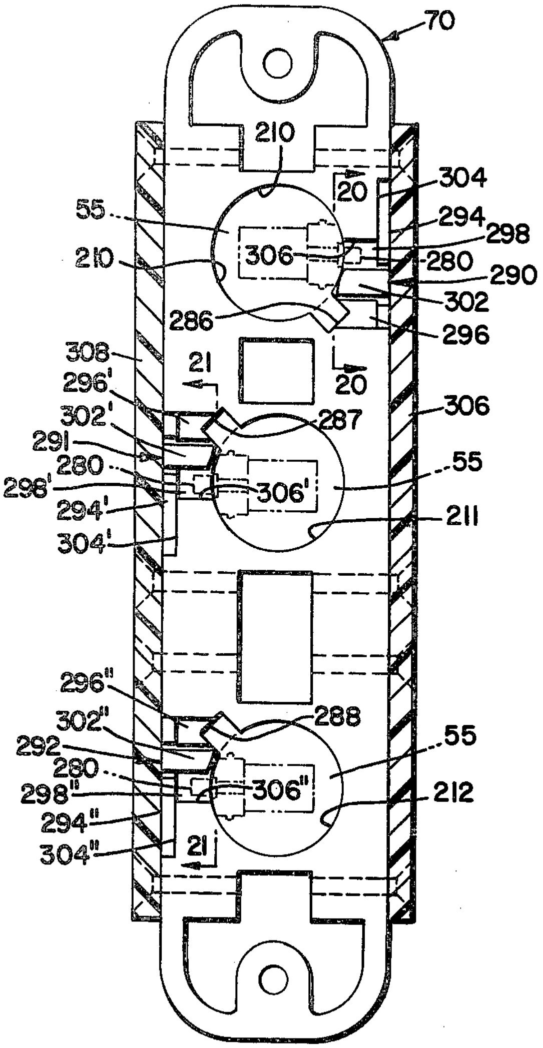
FIG. 19 is a section taken substantially along lines 19—19 of FIG. 5.

The electrically insulated conductors of cable 57 are indicated at 268 in FIGS. 16 and 17, extend into the cavity space between the bottom wall of cavity 250 and insert 232 and are suitably soldered one to each of the contact pins 58 as best shown in FIG. 19. Conductors 268 are soldered to pins 58 before insert 232 is inserted into the mouth of cavity 250. Cable 57 extends through bore 261 as shown.

As shown in FIGS. 16 and 17, a tubular, crimping ferrule 270 coaxially and interfittingly receives tubular extension 262. One end portion of ferrule 270 extends axially beyond tubular extension 262 and peripherally surrounds cable 57 in the region adjacent to extension 262. This end portion of ferrule 270 is crimped as indicated at 272 to firmly secure or anchor cable 57 to plug body 230. The other end portion of ferrule 270 is seated with a snug, tight fit in a deep, annular, axially opening groove 274 which is formed in end portion 264 coaxially around the adjacent end of tubular extension 262. As shown, the outer periphery of extension 262 defines the inner peripheral wall surface of groove 274. A plastic sheath 276 may be applied to cover ferrule 270 as shown.

From the foregoing description of plug 55, it will be appreciated that the patch cord plug is relatively economical to manufacture and is easily and quickly assembled because there are relatively few parts and because the parts are mounted together in assembled relation without the use of separate fasteners of any kind.

In addition to contact pins 58, insert 232 mounts a locking pin 280 which is adapted to cooperate with structure which will be described later on to lock plug 55 in a preselected angular position upon plugging it into a selected one of the sockets 67-69. As shown in FIG. 17, pin 280 is tightly coaxially seated in a bore which is formed through insert 232 at a region which is near end portion 264 and which is spaced from the row of contact pins 58. The axis of locking pin 280 is parallel with the axes of contact pins 58, and a plane containing the axes of contact pins 58 and the longitudinal axis of plug body 230 also contains the axis of locking pin 280.

As shown in FIGS. 16 and 17, the region of end portion 264 which is adjacent to and joins barrel portion 248 has a cylindrical periphery which is of larger diameter than the diameter of barrel portion 248 and the diameters of bores 210-212. A flat annular shoulder 282, which acts as a stop face, is formed at the juncture between end portion 264 and barrel portion 248. When plug 55 is inserted into any of the sockets 67-69, shoulder 282 seats against the flat end face of the associated collar portion 220-222 to limit the extent to which plug can extend axially into the plug-receiving socket in the jack assembly.

As shown in FIGS. 4 and 19, mounting block 70 is formed with three longitudinally extending, open ended grooves 286, 287 and 288 which are in the form of keyways and which respectively open radially inwardly into bores 210, 211 and 212. Grooves 268-288 provide a passage for contact pins 58 and locking pin 280 when plug 55 is inserted into one of the bores 210-212.

The radius of each of the bores 210-212 is only slightly larger than the radius of the plug's of barrel portion 248 and significantly smaller than the uniform radial distance between the longitudinal axis of barrel portion 248 and the outer ends of pins 58 and 280. Thus, barrel portion 248 can only be inserted into each of the bores 210-212 in a single angularly oriented position in which the row of pins 58 and 280 axially alignswith the selected one of grooves 286-288.

When plug 55 is inserted into the cavity barrel section 98 in a position in which the straight row of pins 58 and 280 aligns with groove 256, contact pins 58 will be angularly spaced from the regions of tail portions 162 which are exposed to the cavity barrel 98 through aperture 126. Thus, in this angularly oriented position of plug 55, contact pins 58 will be out of contact with tail portions 162. Tail portions 162 will therefore be still in contact with the normal through contact pins 74.

Similarly, when plug 55 is inserted into the cavity barrel section 99 in a position in which pins 58 and 280 axailly align with grooves 287, contact pins 58 will be angularly spaced from and out of contact with the regions of tail portions 136 which are exposed to cavity barrel section 99 through aperture 120. Thus, when plug 55 is in this angularly oriented position in cavity barrel section 99, contact pins 74 will still be in contact with tail portions 136.

When plug 55 is inserted into the cavity barrel section 100 in a position in which the row of pins 58 and 280 aligns with groove 288, contact pins 58 will be angularly spaced from and out of contact with the regions of tail portions 150 which are exposed to the cavity barrel section 100 through aperture 121.

Figure 20:
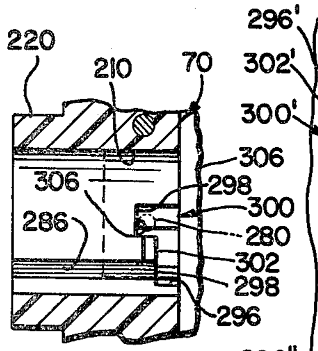
FIG. 20 is a section taken substantially along lines 20—20 of FIG. 19.
Figure 21:
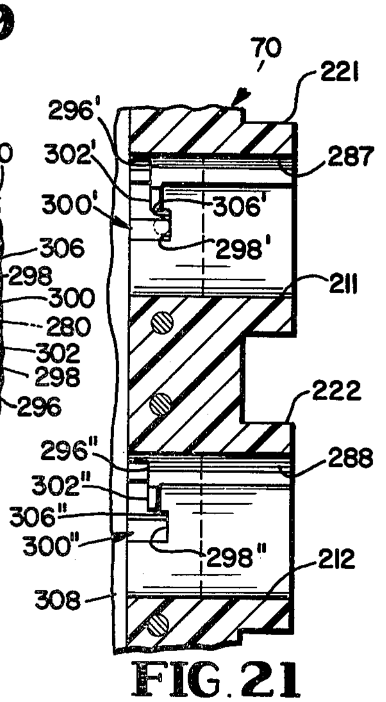
FIG. 21 is a section taken substantially along lines 21—21 of FIG. 19.

Referring to FIGS. 19-21, plug-positioning and releasable locking structures 290, 291 and 292 are respectively associated with the plug-receiving sockets 67, 68 and 69. Locking structure 290 comprises a locking plate 294 (see FIGS. 6A, 19, 20 and 22) and a generally circumferentially extending groove 296 which opens inwardly into the forward region of cavity barrel section 98 and which is defined by a front wall region of shell 88 and a stepped recess 298. Recess 298 is formed in the rear wall of mounting block 70.

Plate 294 is formed from flat-sided metal stock and has a body portion 300 which is slit to form an ear 302. Ear 302 is bent inwardly at right angles to body portion 300. Body portion 300 interfittingly seats in a flat-bottomed recess 304 which is formed in the side wall of block 70. The outer flat surface of body portion 300 is substantially flush with the flat side wall surface of mounting block 70. Body portion 300 is separably clamped between and in seating surface engagement with the flat bottom of recess 304 and the opposing flat face of a lip extension 306. Extension 306 is integral with shell 88 and overlaps and seats against the flat side wall surface of mounting plate 70.

Upward and downward movement of locking plate 294 is prevented by the abutment of the locking plate edges with the opposed edges of recess 304. Locking plate 294 is confined against displacement longitudinally of bore 210 by virtue of being clamped or trapped between an edge of recess 304 and opposing front surface of shell 88.

Locking plate 294 is thus trapped in place between opposing surfaces on mounting block 70 and shell 88 and confined against displacement without the use of separate fasteners of any kind.

As best shown in FIG. 20, the stepped recess 298 intersects groove 286 so that groove 296 consequently opens into groove 286 to enable passage of locking pin 280 from groove 286 into groove 296. Recess 298 is formed with three steps, the most shallow of which is immediately adjacent to groove 286. Ear 302 seats against the intermediate step and is flush with and adjacent to the most shallow step. One edge of ear 302 cooperates with the deepest step of recess 298 to form a socket 306 for receiving locking pin 280. Ear 302 is disposed circumferentially between socket 306 and the shallowest step in recess 298 which, as mentioned above, is immediately adjacent to groove 286.

The construction of the positioning and locking structures 291 and 292 (see FIGS. 6, 19 and 21) are the same as that just described for locking structure 290. Accordingly, the elements of structure 291 are identified by the same, but primed reference numerals, and the elements of structure 292 are identified by the same, but double primed reference numerals in the drawings. The construction of locking plates 294' and 294" are identical to that of locking plate 294. Locking plates 294, 294' and 294" are interchangeable. The formation of recesses 304 and 304' are the same as that of recess 304. Also, the formation of configuration of recesses 298' and 298" are identical to that of recess 298. Thus, the configuration of grooves 296' and 296" are the same as that just described for grooves 296.

As viewed from FIG. 19, recesses 304' and 304" are formed in the left-hand side wall surface of mounting block 70 whereas recess 304 is formed in the right-hand side wall surface of mounting block 70. The locking plate body portions 300' and 300" are trapped or clamped in place between the associated flat bottoms of recesses 304' and 304" and an opposing inwardly directed flat face of a lip extension 308. Extension 308 is integral with shell 86 and overlies and interfittingly seats against the flat side wall surface of mounting block 70 on the side thereof opposite from lip extension 306. Movement of locking plates 294' and 294" longitudinally of the axes of the cavity barrel portions 99 and 100 is prevented by virtue of body portions 300' and 300" being clamped or trapped between edges of their respective recesses 304' and 304" and an opposing front surface on shell 86.

As shown in FIG. 21, recesses 298' and 298" respectively intersect with grooves 287 and 288 and respectively are disposed adjacent to and open into bores 211 and 212. Thus grooves 296' and 296" respectively open into grooves 287 and 288.

If it is desired to open the through circuit connections which are established by the engagement of contact pins 74 with contact springs 78, one of the plugs 55 is plugged into and properly positioned in socket 67. This is accomplished by first aligning plug 55 in such an angularly oriented position with bore 210 that the row of pins 58 and 280 aligns with groove 286. The plug barrel portion 248 is then coaxially and slidably inserted through bore 210, with pins 58 and 280 passing through groove 286.

Insertion of the plug barrel portion 248 is continued until the annular shoulder 282 on the plug seats against the end face of collar portion 220. With plug 55 in this position barrel portion 248 extends completely axially through the cavity barrel section 98.

With shoulder 282 seated against the end face of collar portion 220 the nose of the plug barrel portion 248 seats against and axially compress spring 80. The end face of the nose of the plug barrel portion 248 is flattened as indicated at 312 in FIGS. 16 and 17 and seats against the endmost coil of spring 80. The endmost coil of spring 80 has a smaller diameter than the remaining coils which make up spring 80 so that spring 80 does not catch or grip the nose of the plug barrel portion 248 when it is inserted into cavity section 94 to compress the spring. Springs 81 and 82 are of the same construction as spring 80 as best shown in FIGS. 7 and 8.

When shoulder 282 is seated against the end face of collar portion 220, locking pin 280 will be at the end of groove 286 which opens into the stepped recess 298. Thus, with shoulder 282 still seated against the end face of collar portion 220, plug 55 may now be rotated in a counterclockwise direction as viewed from FIG. 19 to move locking pin 280 into recess 298. Continued rotation of plug 55 in this direction causes locking pin 280 to pass over ear 302 to the locking socket 306. The axial pressure applied to hold plug 55 against the bias of spring 80 is now released with the result that spring 80 will bias plug 55 axially outwardly by a short distance to cause locking pin 280 to seat in the bottom of socket 306. When pin 280 is seated in the bottom of socket 306 rotation of plug 55 in receptacle 67 is prevented by abutment of locking pin 280 with the opposed side wall surfaces of socket 306.

With pin 280 thus disposed in its locking position in socket 306, plug 55 is consequently releasably locked against rotation in either direction. The angular spacing between groove 286 and socket 306 is such that when pin 280 is seated in its locking position in the bottom of socket 306, contact pins 58 will respectively align with and engage their associated tail portions 162 of contact springs 78 to flex or deflect tail portion 162 outwardly and out of contact with contact pins 74 in the manner shown in FIG. 23. As a result, all of the normal through circuits established by springs 76 and 78 and pins 74 will be opened.

Angular displacement of plug 55 in a counterclockwise direction (as viewed from FIG. 19) beyond socket 306 is limited by abutment of locking pin 280 with the upper side wall surface of socket 306. In a clockwise direction (as viewed from FIG. 19) rotation of plug 55 is limited by abutment of locking pin 280 with the lower circumferentially facing edge of recess 298. At this latter rotational limit of plug 55, locking pin 280 and contact pins 58 axially align with groove 286.

From the foregoing it will be appreciated that by inserting plug 55 into socket 67 and then by rotating plug 55 to a position where locking pin 280 seats in socket 306, plug 55 is not only releasably locked against rotation in opposite directions, but is also in a position where contact pins 58 engage and flex the tail portions 162 of springs 78 out of contact with pins 74.

To withdraw plug 55 from socket 67, plug 55 is first pushed axially inwardly against the bias of spring 80 to displace locking pin 280 out of socket 306. Plug 55 is then rotated clockwise (as viewed from FIG. 19) to its closkwise limit where pins 58 and 280 axially align with groove 286. With plug 55 in this position it then may be axially withdrawn from socket 67. Upon rotation of plug 55 to its clockwise limit (as viewed from FIG. 19), contact pins 58 are displaced out of engagement with the tail portions 162 of contact springs 78. As a result, tail portions 162 deflect back to their original positions where they re-engage and thereby re-establish contact with contact pins 74.

Figure 23:
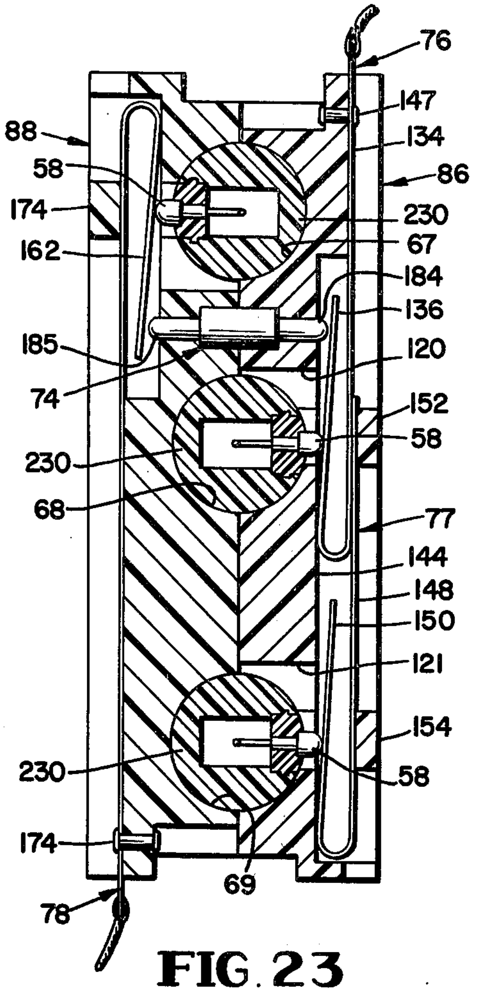
FIG. 23 is a section similar to FIG. 9, but showing patch plugs inserted into each of the three sockets of the jack assembly and rotated to their positions where the contact pins of the plugs contact and deflect the contact springs in the jack assembly.

If it is desired to open the normal through circuit connections which are established by engagement of contact pins 74 with contact springs 76, one of the plugs 55 is plugged into and properly positioned in socket 68 as shown in FIG. 23. This is accomplished in the same manner which was described for plugging in and properly positioning the patch cord plug in socket 67. In brief, plug 55 is aligned with bore 211 in an angularly oriented position in which the row of pins 58 and 280 aligns with groove 287. The plug barrel portion is then coaxially and slidably inserted through bore 211 with pins 58 and 280 passing through groove 287. Insertion of the patch cord plug is continued until its shoulder 282 seats against the end face of collar portion 221. With plug 55 in this position, the nose of the plug seats against and axially compresses spring 81, and locking pin 280 will be in the end of groove 287 which opens into the stepped recess 298'.

Thus, plug 55 may now be rotated in a counterclockwise direction (as viewed from FIG. 19) to displace locking pin 280 into the locking socket 306'. The axial pressure applied to hold plug 55 against the bias of spring 81 is now released with the result that spring 81 will bias plug 55 axially outwardly to cause locking pin 280 to seat in the bottom of socket 306'. With pin 280 seated in the bottom of socket 306', rotation of plug 55 in socket 68 is prevented in both directions in the same manner as just described for the positioning of the patch cord plug in socket 67.

The angular spacing between grooves 287 and socket 306' is such that when pin 280 is seated in its locking position in socket 306', contact pins 58 respectively align with and engage their associated tail portions 136 of contact springs 76 to flex or deflect tail portions 136 outwardly and out of contact with contact pins 74 in the manner shown in FIG. 23. As a result, all of the normal through circuits established by springs 76 and 78 and pins 74 will be opened.

The clockwise and counterclockwise limits of rotation of plug 55 in socket 68 correspond to that just described for the limits of rotation of the patch cord plug in receptacle 67.

From the foregoing it will be appreciated that by inserting plug 55 into socket 68 and by then rotating the patch cord plug to a position where locking pin 280 seats in socket 306', plug 55 is not only releasably locked against rotation in opposite directions, but is also properly positioned where contact pins 58 engage and flex tail portions 136 out of contact with pins 74.

Plug 55 is removed from socket 68 in a manner corresponding to that just described for the removal of the patch cord plug from receptacle 67. In brief, plug 55 is first pushed axially inwardly against the bias of spring 81 to displace locking pin 280 out of 306'. Plug 55 is then rotated clockwise as viewed from FIG. 19, and upon alignment of pins 58 and 280 with groove 287, the patch cord plug then may be axially withdrawn from socket 68.

Plug 55 is insertable into and removable from socket 69 in the same manner as that just described for inserting and removing the patch cord plugs into and from each of the sockets 67 and 68. In brief, plug 55 is first positioned so that pins 58 and 280 axially align with groove 288. It is then axially inserted through bore 212 and into cavity 92 to compress spring 82.

With shoulder 282 seated against the end face of collar 222, plug 55 is then rotated counterclockwise as viewed from FIG. 19 to displace locking pin 280 into locking socket 306". The axial pressure applied to hold plug 55 against the bias of spring 82 is then released with the result that spring 82 will bias plug 55 axially outwardly by a short distance to cause locking pin 280 to seat in the bottom of socket 306". As a result, plug 55 will be releasably locked against rotation in opposite directions, and contact pins 58 will have been moved into engagement with the tail portions 150 of contact springs 77 to cause tail portions 150 to flex outwardly in the manner shown in FIG. 23. By engaging contact pins 58 with tail portions 150 in this manner it will be observed that the normal through circuits which are established by contact pins 74 and contact springs 76 and 78 remain closed in the absence of any patch cord plug in either of the sockets 67 or 68. However, a circuit now will be completed from contact springs 76 to the contacts 58 of the plug in socket 69 for a purpose that will be described in detail shortly.

As shown in FIG. 2, patch module 40 is provided with a terminal station 320 which may be utilized in conjunction with the sockets 69 in jack assemblies 44. Station 320 comprises a jack 322 and one or more of the sets of output terminals, one of which may be in the form of a conventional multi-terminal electrical connector. In this example, station 320 is provided with one multi-terminal connector 324 and a multiplicity of tip type test point terminals 326 which are adapted to receive test probes or leads of a measuring instrument.

Figure 24:
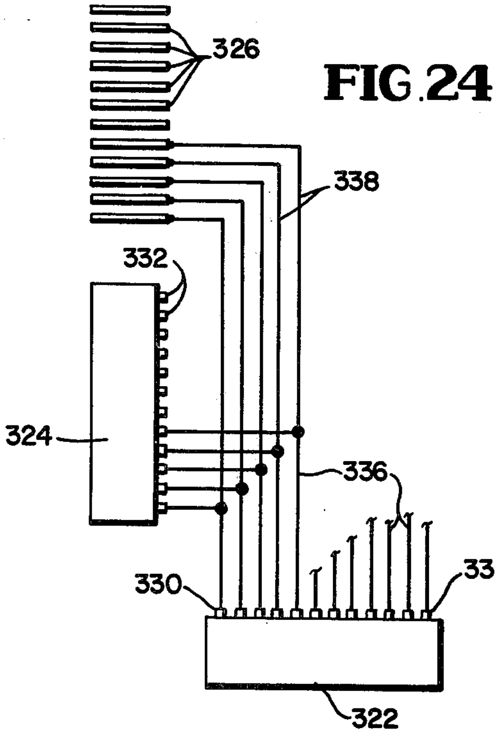
FIG. 24 is a schematic circuit diagram of the electrical terminal and monitoring station shown in FIGS. 1 and 2.

Referring to FIG. 24, the terminals in jack 322 are indicated at 330, and the terminals in connector 324 are indicated at 332. The number of terminals 330, 332 and 326 obviously may be varied as desired for making desired circuit connections. Jack terminals 330 are connected by insulated conductors 336 to selected terminals 332 and by electrically insulated conductors 338 to selected terminals 326. Jack 322 is so constructed that when one of the plugs 55 is plugged into the jack, separate electrical circuits will be completed from pins 58 to terminals 330.

Connector 324 is selectively connectable by a suitable, conventional multi-conductor cable and connector assembly 340 (see FIG. 1) to a selected circuit for completing desired circuit connections between terminals of the selected circuit and contact pins 58 when one of the plugs 55 is plugged into jack 322. The selected circuit may be, for example, an E.I.A. data test set circuit 342 of conventional construction.

Typically, the terminal pins in E.I.A. connectors are assigned for connection to designated points in data terminal and data communication equipment circuits. One terminal pin or terminal in each E.I.A. connector is usually assigned to provide a connection for signal ground or a common return.

For simplifying examples of the various circuit connections that may be made with the patch facility of this invention, four of the jack assemblies 44, which are illustrated in FIG. 1, are respectively designated as jack #1, jack #2, jack #3, and jack #4. The connectors 45 of jacks #1, #2, #3, and #4 may be respectively connected by separate assemblies 60 to circuits *36a*, *36b*, *36c*, and *36d*. The connectors 46 of jacks #1, #2, #3, and #4, may be connected by separate connector assemblies *60a* respectively to circuits *38a*, *38b*, *38c*, and *38d*. With these circuit connections, it will be appreciated that circuits *36a–d* are respectively connected to circuits *38a–d* through the normal through circuits in their associated jacks #1–#4. Tracing one of these normal through circuits, which is established, for example, by jack #1, it will be appreciated that a selected terminal of circuit *36a* is connected serially through one of the conductors in the multi-conductor cable assembly 60, through an assigned pin or terminal in connector 45, through one of the conductors 140, through one of the contact springs 76, through one of the contact pins 74, through one of the contact springs 78, through one of the conductors 166, through an assigned pin or terminal in connector 46, and through one of the conductors in the multi-conductor cable assembly *60a* to a selected terminal of circuit *38a*. It furthermore will be appreciated that one of the normal through circuits provided by each of the jack assemblies 44 may be for the purpose of completing an electrical connection to a common ground or return for feeding signals between the signal supply and signal utilization circuits.

If it is desired to monitor or check the signals being fed through the contact springs 76 in a selected one of the jack assemblies 44, the plugs 55 of one of the patch cord assemblies 42 are respectively plugged into the desired jack socket 69 and into jack 322, and the test set circuit 342 is patched to connector 324 by the cable assembly 340. Assume, for example, that it is desired to check or monitor characteristics or conditions of signals, current or voltage applied through jack #1. To accomplish this, the plugs 55 of one of the patch cord assemblies 42 (which is designated as PC-1 in FIG. 1) are respectively plugged into the socket 69 of jack #1 and into jack 322. The patch cord PC-1 thus completes a multiplicity of separate circuits from the contact springs 77 of jack #1 to the terminals 330 of jack 322.

Thus, by patching the test set-up circuit 342 into connector 324 the terminals of circuit 342 will be connected by separate circuits to separate contact springs 77 in jack #1. Each of these patch field circuits may be traced from one contact spring 77, through one contact 58 in one of the plugs 55, through one of the conductors in the multi-conductor cable 57, through one contact pin 58 in the other plug 55, through one jack terminal 330, through one conductor 336, through one of the assigned contact pins or terminals 332 in connector 324 and through one of the conductors in the multi-conductor cable assembly 340 to a pre-selected terminal in circuit 342. Since the contact springs 76 in jack assembly 44 are in contact with contact springs 77, it will be appreciated that the circuits for feeding signals from the circuit *36a* to contact springs 76 in jack #1 are now extended to feed the signals supplied by circuit *36a* to circuit 342.

Thus, signals from circuit *36a* will be fed to circuit 342 and also to any other circuit that contact springs 76 in jack #1 are connected to at the time. In this respect it will be appreciated that according to one of the important feature of this invention, plug 55 is not effective to open any circuits when it is plugged into any of the sockets 69. Thus, when no plugs are plugged into the sockets 67 and 68 for jack #1, signals from circuit *36a* will be fed through the normal through circuits in jack #1 for application to circuit *38a* and also through patch cord PC-1 for application to circuit 342. The signals fed between circuits *36a* and *38a* may therefore be checked or monitored without opening the normal through circuits in the jack assembly. Therefore, the transmitted signals may be checked or monitored with interfering with the operation of the signal utilization circuit or circuits.

Assume now that it is desired to disconnect circuits *38b* and *38a* from circuits *36b* and *36a* and to patch circuit *36a* into circuit *38b*. To accomplish this, one of the patch cord assemblies 42, which is indicated at PC-2 in FIG. 1, is utilized. One of the plugs 55 of patch cord PC-2 is plugged into the socket 68 of jack #1, and the other plug 55 of the patch cord PC-2 is plugged into the socket 67 of jack #2.

By patching plug 55 into the socket 68 of jack #1, the normal through circuits for interconnecting circuits *36a* and *38a* will be opened because plug 55, when positioned in socket 68, deflects the tail portions of contact springs 78 out of engagement with contact pins 74. Circuit *36a* will therefore be disconnected from circuit *38a*.

By plugging the other plug of patch cord PC-2 into the socket 67 of jack #2 the normal through circuits which interconnect circuits *36b* and *38b* in jack #2 will be opened, and circuits will be extended by patch cord PC-2 to electrically connect the contact springs 76 of jack #1 to the contact springs 78 of jack #2.

From the previous description it will be appreciated that when one of the plugs 55 is plugged into the socket 67 of jack #2 it deflects the tail portions of the contact springs 78 in jack #2 out of contact with the contact pins 74 in jack #2 to thereby electrically disconnect circuit **36*b* from circuit 38*b***.

With patch cord PC-2 patched in this manner and with patch cord PC-1 patched in the manner previously described it will be appreciated that the circuits between the contact springs 76 of jack #1 and the terminals of the circuit **36*a* have not been opened. Therefore, the patch field connections are such that circuit 342 will still be monitoring or checking the signals which are now being fed between circuits 36*a* and 38*b*** for the patch field connections which are provided by patch cords PC-1 and PC-2.

The monitoring jack sockets 69 in jack assemblies 44 may also be used for trunking and other purposes. For example, it may be desired to connect one of the signal supply circuits **36*a–d* concomitantly to two other circuits. Assume, for instance, that it is desired to connect circuit 36*a* to both of the signal utilization circuits 38*b* and 38*c*. To accomplish this, two patch cord assemblies 42 are utilized as indicated at PC-3 and PC-4 in FIG. 25**.

As shown in FIG. 25, the plugs 55 of patch cord PC-3 are respectively plugged into the socket 68 of jack #1 and into the socket 67 of jack #2. As a result, circuit **36*a* will be disconnected from circuit 38*a* and will be patched in (i.e. connected to) to circuit 38*b*. In addition, circuit 36*b* will be disconnected from circuit 38*b***.

The plugs 55 of patch cord PC-4 are respectively plugged into the socket 69 of jack #1 and into the socket 67 of jack #3. As a result, circuit **36*a* will also be connected by patch cord PC-4 to circuit 38*c***.

If patch cord PC-3 is removed while leaving patch cord PC-4 in the position shown in FIG. 25, then circuit **36*a* will be connected concomitantly to circuits 38*a* and 38*c***.

When one circuit is disconnected from another circuit it sometimes is desirable to terminate the disconnected circuit in an impedance that it would normally see if it were still connected to the other circuit. With the ptach module of this invention an impedance terminating plug 350 (see FIG. 37), which as will be described in detail later on, has terminating impedances and can selectively be plugged into any of the sockets 67 and 68 of jack assemblies 44 to selectively terminate any of the circuits **36*a–d* and 38*a–d*** in pre-selected impedances.

Sometimes, it is desirable to have spare, stand-by or optional circuits which are capable of connection through the patch field to other circuits. For example, a stand-by signal supply circuit 352 and a stand-by signal utilization circuit 354 may be provided for as shown in FIG. 1. With such an arrangement, it is sometimes desirable to terminate the stand-by circuits in the impedances that they would normally see if they were connected to intended circuits in the patch field. This is accomplished, according to another feature of this invention, by specially constructed, single socket impedance terminating jack assemblies which are indicated at 356 in FIG. 1.

Each jack assembly 356, as shown in FIGS. 26–32, is in certain respects structurally similar to jack assembly 44, and to the extent that jack assembly 356 corresponds structurally to jack assembly 44, like reference numerals suffixed by the letter "a" have been applied to designate like structure of jack assembly 356.

Referring to FIGS. 26–28 and 31, each jack assembly 356 comprises a one-piece front mounting block 360, an insulator body or housing 362, a series of cylindrical contact pins 364 (see FIG. 32), a selected number of contact springs 366, a selected number of impedances or resistors 368, and a coiled compression spring **80*a* which is of the same construction as spring 80**.

Similar to housing 72, housing 362 has top, bottom, side and rear walls and is longitudinally divided into a pair of mating, separately formed halves or shells 370 and 372. Shells 370 and 372 are advantageously separately molded from a suitable, electrically non-conductive plastic material. Shells 370 and 372 define portions of the top, bottom, and rear walls of housing 362, and they furthermore define portions of an interior cavity or socket 374 which corresponds to cavity 90 and which defines the major portion of a socket 376 for receiving one of the patch cord plugs 55.

Cavity 374 is delimited by interior cylindrical surfaces of shells 370 and 372. Cavity 374 opens at the forward end of jack assembly 356 and is closed at the rear end by the rear wall of housing 362. Shells 370 and 372 have flat opposing surfaces which interfittingly seat against each other in assembled relation. The interface between shells 370 and 372 lies in a plane which contains the longitudinal axis of cavity 374. Shells 370 and 372 are rigidly, but detachably fixed to mounting block 360 by screws **93*a*. Near the rear wall of housing 362, shells 370 and 372 are rigidly, detachably secured together by a nut and bolt assembly 93'*a***.

Similar to cavity 90, cavity 374 is interiorly stepped to provide a short diametrically enlarged spring-receiving socket section 380 and a long patch plug-receiving barrel section 382 of somewhat smaller diameter which axially aligns with cavity section 380.

Figure 29:
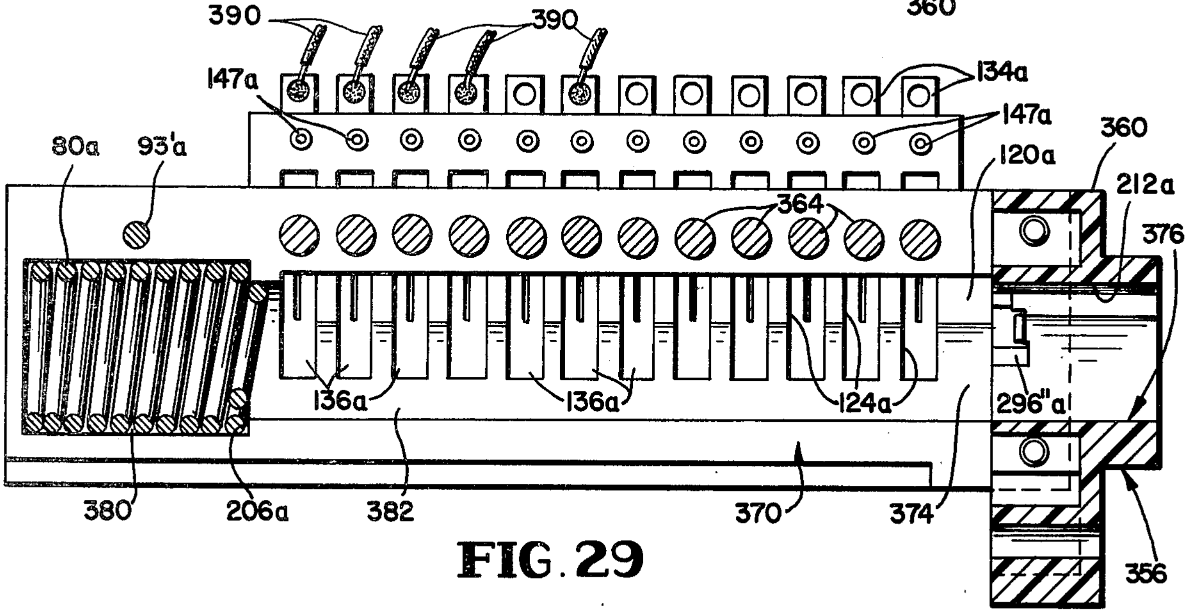
FIGS. 29 and 30 are sections taken respectively along lines 29—29 and 30—30 of FIG. 26.
Figure 32:
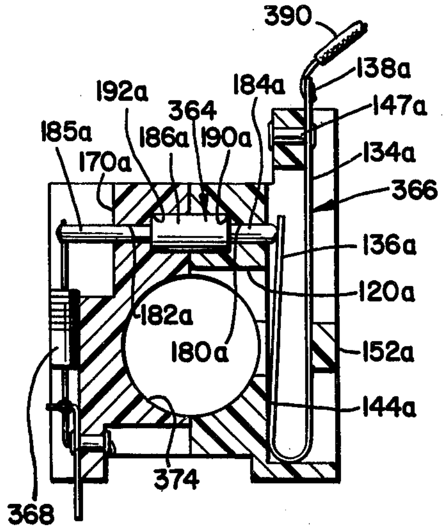
FIG. 32 is a section taken substantially along lines 32—32 of FIG. 31.

As shown in FIGS. 29 and 32, an elongated generally rectangular aperture **120*a* is formed through the side wall of shell 370 and corresponds to aperture 120. Shell 370 is integrally formed with a series of exterior, straight parallel spaced apart spacer ribs 124*a* which correspond to ribs 124, which bridge aperture 120*a*, and which extend between the top and bottom walls of shell 370. Contact springs 366 are spaced apart and electrically insulated from each other by ribs 124*a* in the same manner as previously described for the spacing and insulation of contact springs 76**.

Figure 33:
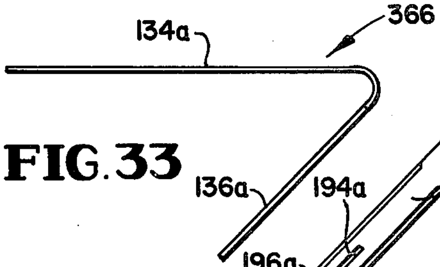
FIG. 33 is a side elevation of one of the contact spring shown in FIG. 32.
Figure 34:
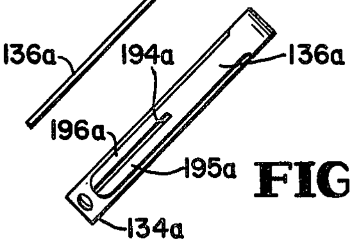
FIG. 34 is a front view of the contact spring shown in FIG. 33.

Except for dimensions, springs 366 are of the same construction as springs 76. Accordingly, like reference numerals suffixed by the letter "a" have been applied to designate like portions of springs 366 as shown in FIGS. 33 and 34.

Similar to ribs 124, ribs **124*a* define a series of straight, parallel, outwardly opening spaced apart grooves 142*a* (see FIG. 27). Springs 366 are seated one in each of the grooves 142*a* in the same manner in which springs 76 are seated in grooves 142**.

Like tail portions 136, tail portions **136*a*, which are disposed inwardly of their associated straight portions 134*a*, are positioned in an outwardly opening recessed region in the side wall of shell 370 and seat against a recessed, flat side wall surface 144*a* of shell 370. Like aperture 120, aperture 120*a* is formed through the side wall surface 144*a* which is recessed in the same manner as previously described for side wall surface 144**.

Each tail portion **136*a* is disposed and confined between adjacent ribs 124*a* and crosses aperture 120*a*** so that it is engageable by one of the patch plug contact pins 58 when one of the patch plugs 55 is positioned in socket 376. Each of the springs 366 is secured to shell 370 only by a single suitable fastening element such as a rivet 147*a* which extends through portion 134 adjacent to terminal 138*a*.

As shown in FIGS. 27 and 32, shell 370 is integrally formed on the exterior of its side wall with a spring retainer rib portion 152*a* which extends parallel to the longitudinal axis of cavity 374 and which perpendicularly intersects ribs 124*a* similar to the arrangement and configuration of rib 152. Rib portion 152*a* bridges the recessed side wall region of shell 370 and is spaced outwardly from the side wall surface 144*a* by a pre-selected distance. Regions of springs 366 lie between surface 144*a* so that each tail portion 136*a* is flexed or deflected towards its associated straight spring portion 134*a* in the same manner as described for spring 76.

From this construction it will be appreciated that spring 366 is confined between rib portion 152*a* and surface 144*a* in the same manner as previously described for springs 76. Similar to springs 76, the upper ends of springs 366, as viewed from FIG. 32, are anchored by rivets 147*a* to shell 370.

As best shown in FIG. 32, each of the contact pins 364 is of the same construction as pins 74 except that one end portion of each pin 364 is slotted to provide a bifurcated end for receiving a resistor lead. To the extent that pins 364 and 74 are alike, like reference numerals suffixed by the letter "a" have been applied to designate like portions of pins 364. The slotted end of each pin 364 indicated at 384 in FIG. 28.

For receiving contact pins 364, shell 370 is formed with a series of bores 180*a*, and shell 372 is formed with a corresponding series of bores 182*a*. Bores 180*a* and 182*a* respectively correspond to bores 180 and 182. Like bores 180 and 182, bores 180*a* and 182*a* are arranged in pairs with the two bores of each pair being in axial alignment with each other. The axes of bores 180*a* and 182*a* are parallel and are contained in a common plane which is parallel to the longitudinal axis of barrel section 382 and which normally intersects surface 144*a*.

Bores 180*a* extend from surface 144*a* to the inwardly facing shell surface which seats against the opposing inner flat face of shell 372. Similarly, bores 182*a* extend from inner shell surface which seats against the opposing inner surface of shell 370 to a recessed flat side wall region 170*a* on shell 372.

One contact pin 364 is coaxially received in each pair of aligned bores 180*a* and 182*a* in a manner corresponding to the mounting of pins 74 in bores 180 and 182. The oppositely facing axially directed end faces of pin section 186*a* are abuttable with shoulders 190*a* and 192*a* so that each pin 364 is confined against axial displacement relative to shells 370 and 372 in the same manner as previously described for pins 74. Thus, each of the contact pins 364 is trapped between shells 370 and 372 and is confined against axial displacement in its associated pair of bores 180*a* and 182*a* only by seating surface engagement with interior surfaces of shells 370 and 372. Thus no separate fasteners of any kind are required to mount pins 364 in place in housing shells 370 and 372. The interface between shells 370 and 372 lies in a plane which substantially perpendicularly and medially intersects pins 364.

Like the construction described for jack assemblies 44, the end section 184*a* of each contact pin is sufficiently long to extend by a short distance axially beyond its associated bore 180 to positively contact and slightly flex or deflect the bifurcated end of its associated tail portion 136*a* as shown in FIG. 32. Similarly, the end section 185*a* of each contact pin is sufficiently long to extend by a short distance axially beyond its associated bore 182. The outer end of section 185*a* is formed with slot 384.

Figure 28:
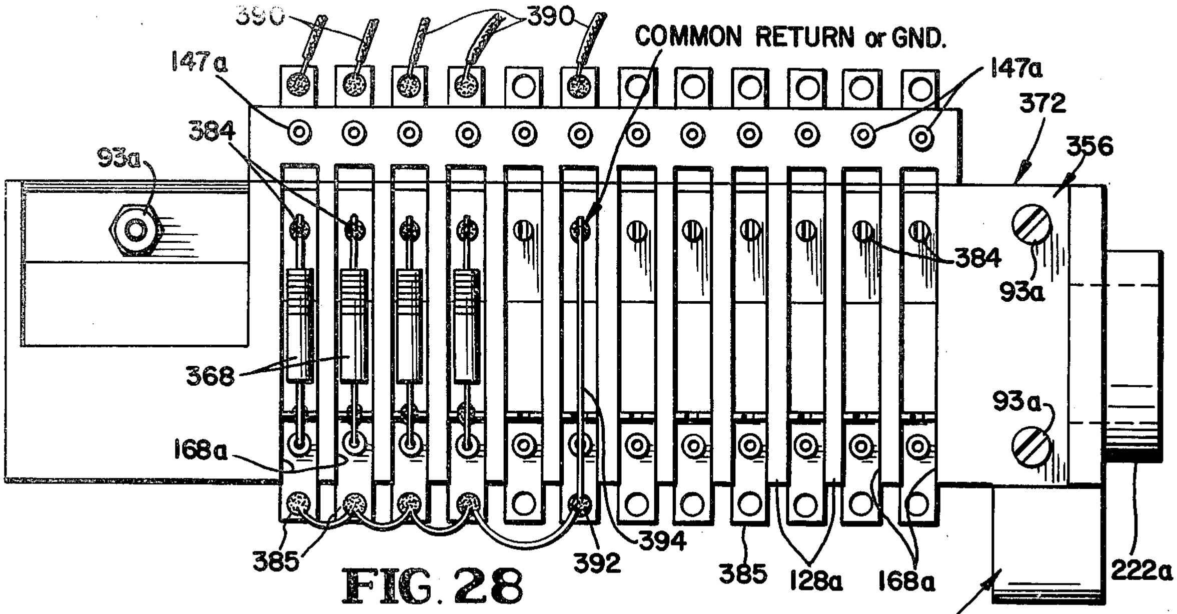
FIG. 28 is a right-hand side elevation of the jack assembly shown in FIG. 26.

As shown in FIGS. 28 and 32, shell 372 is integrally formed with a series of straight, parallel, spaced apart spacer ribs 128*a* which correspond generally to ribs 128 and which define straight, parallel outwardly opening spaced apart grooves 168*a*. Resistors 368, of which there are a selected number, are seated in separate ones of grooves 168*a* and are spaced from and electrically insulated from each other by ribs 128*a*.

Each of the resistors 368 has the usual pair of terminal leads, one of which is received and soldered in the slot 384 of an associated one of the contact pins 364, and the other of which is soldered to a terminal tab 385. Tabs 385 are seated in grooves 168*a* and are fixed to shell 372.

Figure 30:
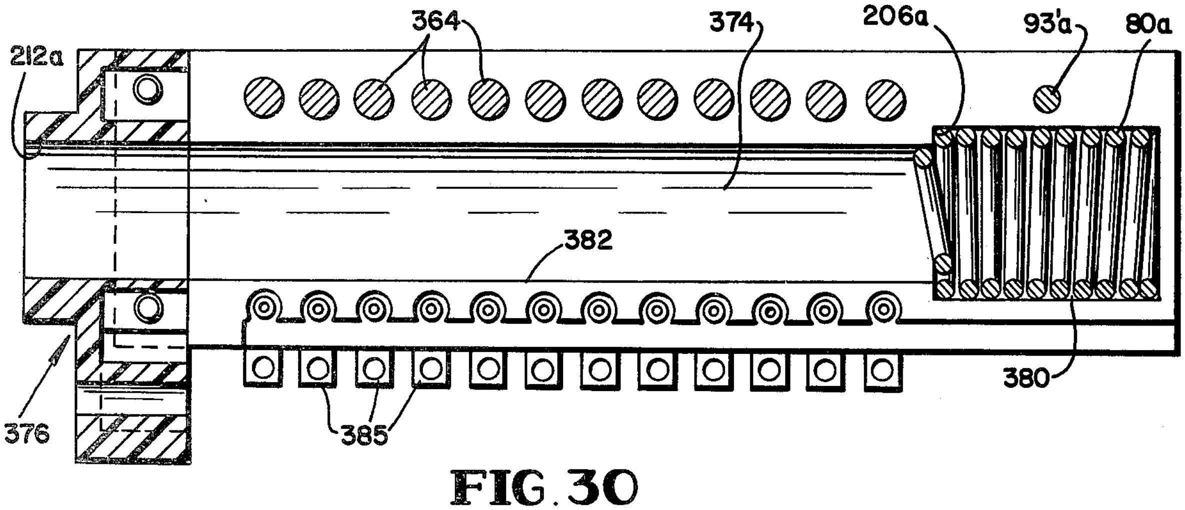
Figure 31:
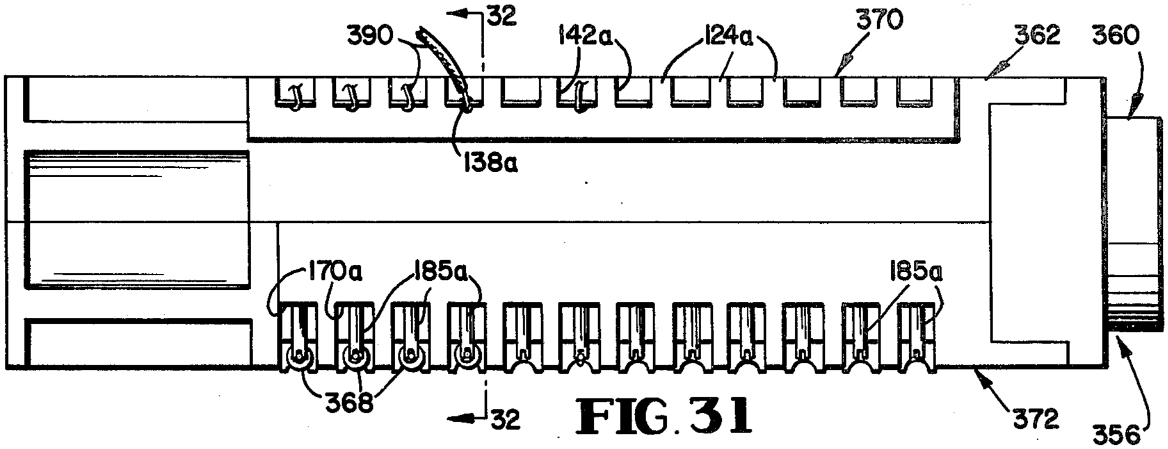
FIG. 31 is a top plan view of the jack assembly shown in FIG. 26.

As shown in FIGS. 29 and 30, spring 80*a* is seated in cavity section 380 and is axially compressed between shoulder 206*a* and the rear wall of housing 362 in the same manner as previously described for the assembly of spring 80 in jack assembly 44.

Mounting block 360 is the same as the portion of mounting block 70 which extends from the lower end of block (as viewed from FIG. 4) to a region between collars 221 and 222. Accordingly, like reference numerals suffixed by the letter "a" have been applied to designate the corresponding portions of mounting block 360. Like block 70, mounting block 360 is advantageously molded as one piece from a suitable electrically non-conductive plastic material. The diameter of bore 212*a*, which is formed through mounting block 360 and which axially align with cavity 374, is the same as the diameter of cavity section 382. Barrel section 382 and bore 212*a* define socket 376.

A locking plate and locking groove structure for releasably rotatably locking one of the patch cord plugs 55 in a pre-selected angularly oriented position are associated with socket 376 and are the same as locking plate 294" and locking groove 296". Accordingly, like reference numerals suffixed by the letter "a" have been applied to designate like parts of the locking plate and locking groove structure associated with socket 376.

Referring to FIGS. 1 and 27, contact springs 366 are connected by separate electrically insulated conductors 390 to the terminals of the associated stand-by circuit. In the example shown in FIG. 1, the contact springs 366 of the left-hand terminating jack is connected to the terminals of the stand-by signal supply circuit 352, and the contact springs 366 in the right-hand impedance terminating jack are connected by corresponding conductors 390 to the stand-by signal utilization circuit 354.

To complete normal through circuits through the terminating resistors 368 in the patch field, terminal tabs 385 may be connected to a common return or common ground terminal as indicated at 392 in FIG. 28 if a common return or common ground is utilized for the circuits to be interconnected by the patch field. Considering the example of a common return or common ground, terminal 392 will then be connected directly by a conductor 394 to one of the contact pins 364 which is marked common return or ground. The resultant normal through terminating circuits provided by each terminating jack assembly 356 is illustrated in FIG. 33. It will be appreciated that circuit arrangements other than that shown in FIG. 33 may be utilized. Furthermore, it will be appreciated that only selected ports of the stand-by circuit (350, 352) may be terminated in pre-selected impedances or resistances.

When no patch cord plug is inserted into socket 376 it will be appreciated that contact springs 366 electrically contact their associated contact pins 364. As a result, a pre-selected number of normal through impedance terminating circuits are established through resistors 368. Anyone of these normal through impedance terminating circuits may be traced from a terminal at the stand-by circuit (such as circuit 352), through one of the conductors 390, through one of the contact springs 366, through one of the contact pins 364, through one of the resistors 368, and back through the common return or ground leg which comprises another one of the contact pins 364, another contact spring 366 and another conductor 390.

When one of the patch cord plugs 55 is inserted into socket 376 and is rotated to its position where contact pins 58 engage and flex the tail portions 136*a* of springs 366 as shown in FIG. 34, tail portions 136*a* will be deflected out of contact with contact pins 364 to thereby open the normal through impedance terminating circuits. Contact springs 366 will now be in electrical contact with the contact pins 58 on plug 55 instead of being in contact with the contact pins 364 in jack assembly 356. Thus by utilizing one of the patch cords 42, any one of the stand-by circuits (352, 354) may selectively be patched into any of the signal supply or signal utilization circuits shown in FIG. 1.

For example, assume that it is desired to patch circuit 352 into circuit 38*c* in place of circuit 36*c*. To accomplish this the plugs 55 of one of the patch cords 42, which is indicated at PC-5 in FIG. 1, are respectively positioned in socket 67 of jack #3 and socket 376 of the left-hand impedance terminating jack 356. By plugging one of the plugs 55 into socket 356 the normal through impedance terminating circuits in the left-hand jack assembly 356 are opened as previously described, and by plugging the other plug 55 of patch cord PC-5 into socket 67 of jack #3, the normal through circuits interconnecting circuits 36*c* and 38*c* will be opened. With patch cord PC-5 arranged in this manner, the terminals of circuit 352 will now be connected through the left-hand terminating jack 356 and through jack #3 to the terminals of circuit 38*c*.

The patch field circuit which is established between one terminal of stand-by circuit 352 and a corresponding terminal of circuit 38*c* by patch cord PC-5 may be traced from the terminal at circuit 352, through one of the conductors 390, through one of the contact springs 366, through one of the contact pins 58 on one of the plugs 355 of patch cord PC-3, through one of the conductors in the cable of patch cord PC-3, through one of the contact pins 58 in the other patch cord plug of patch cord PC-3, through one of the contact springs 78 of jack #3, through one of the conductors 166, through one of the terminals of the associated connector 46 and through a corresponding terminal and conductor in the associated cable and conductor assembly 60*a* to the terminal at circuit 38*c*.

In a similar manner, the stand-by signal utilization circuit 354 may be patched into any selected signal supply circuit shown in FIG. 1 by utilizing one of the patch cords 42. For example, if it is desired to patch (i.e., electrically connect) the terminals of circuit 354 to the terminals of circuit 36*d* in place of the connection between the terminals of circuit 36*d* and 38*d*, it is only necessary to plug one of the patch cord plugs 55 into the socket 376 of the right hand jack assembly 356 and to plug the other plug 55 of the patch cord into the socket 68 of jack #4.

The construction of jack assembly 322 advantageously is the same as that just described for jack assembly 356 except that contact pins 364 and resistors 368 are eliminated in the construction of jack assembly 322.

It also will be appreciated that the previously described triple socket jack assembly 44 may be modified to provide a dual socket, normal through jack assembly (not shown) by eliminating contact springs 77 and socket 69.

Figure 35:
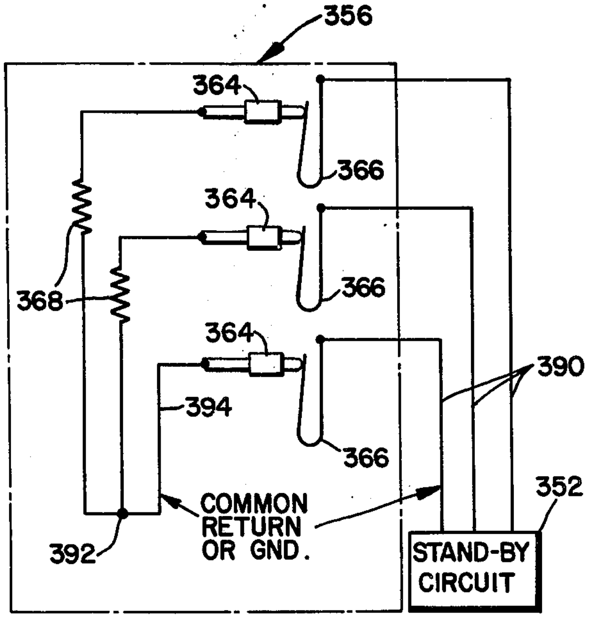
FIG. 35 is a schematic circuit diagram showing the impedance-terminating circuit for one of the impedance-terminating jack assemblies illustrated in FIG. 1.
Figure 36:
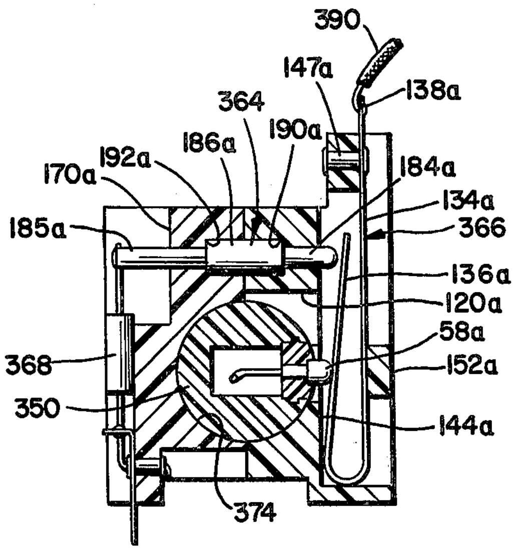
FIG. 36 is a section similar to FIG. 32, but illustrating a patch cord plug plugged into the socket of the terminating jack assembly.

Referring to FIG. 35, terminating plug 350 advantageously is of the same construction as plug 55 with two exceptions. First, terminating impedances or resistor 400 have been added to plug 350. Second, bore 261 may be plugged since no cable is connected to plug 350. Alternatively, the body of plug 350 may be formed with a rear wall to close the interior bore and cavity space in the plug. To the extent that plugs 55 and 350 are alike, like reference numerals suffixed by the letter "a" have been applied to designate like parts of plug 350.

Figure 37:
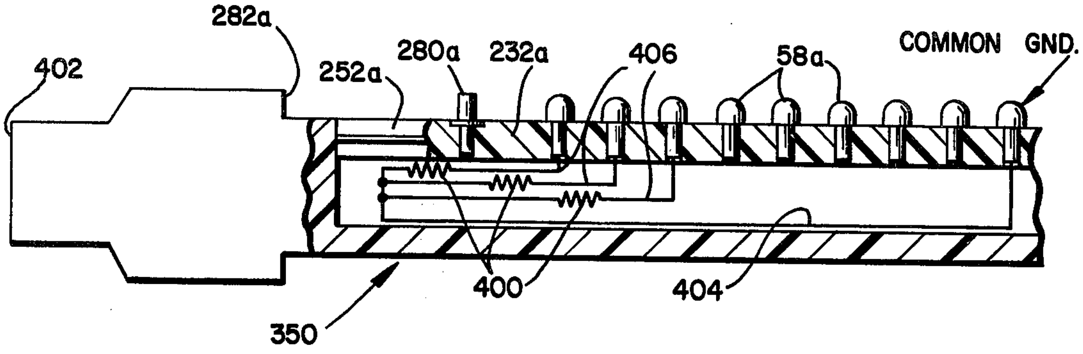
FIG. 37 is a side elevation of a terminating plug with a portion of the plug body broken away to illustrate interior details.

If a common return or ground is used for the signal supply and utilization circuits to be connected to the patch facility of this invention, corresponding terminals of resistors 400 may be connected by an insulated conductor 404 to a preselected pin 58*a* which is marked common ground in FIG. 37. The other terminals of resistors 400 are connected by separate insulated conductors 406 to separate, pre-selected pins 58*a* other than the common ground contact pin.

If, for example, it is desired to disconnect circuit 38*a* from circuit 38*a* and to terminate circuit 36*a* in pre-selected resistances, plug 350 is simply positioned in socket 68 of jack #1. As a result, contact pins 58*a* will contact and deflect contact springs 76 out of contact with contact pins 74 to open the normal through circuits in jack #1 and to complete circuits from springs 76 through the terminating resistors 400 in plug 350. If it is also desired to terminate circuit 38*a* in pre-selected resistance, another plug 350 is plugged into and properly positioned in socket 67 of jack #1 in the manner just described.

Figure 38A:
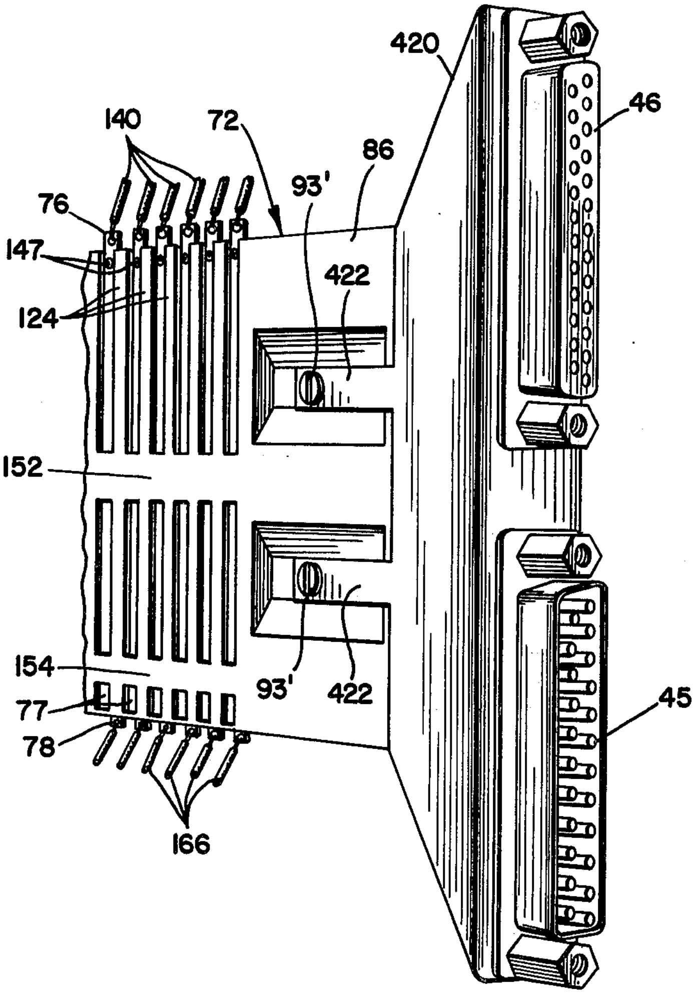
FIG. 38*a* is a perspective view of a jack and dual connector assembly in which the connectors are mounted on the jack body.
Figure 38:
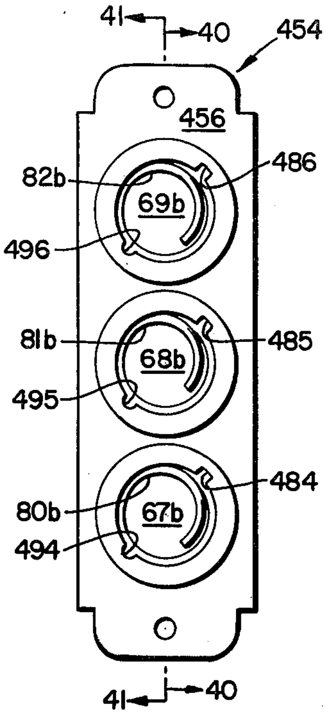
FIG. 38 is a front elevation of a further embodiment of a triple-socket jack which is constructed to accomodate a patch cord plug with circumferentially spaced apart rows of contact elements.

According to another feature of this invention chassis 54 may be eliminated if desired, and connectors 45 and 46 may advantageously be mounted on jack body 72 as shown in FIG. 38. In this embodiment connectors 45 and 46 are fixedly mounted on a suitable structural bracket or auxiliary housing 420 at the rear of jack body 72. Bracket 420 has arms 422 which extend along both sides of body 72 and which are rigidly fixed to the body halves 86 and 88 by the previously mentioned bolt and nut assemblies 93'.

Thus, connectors 45 and 46 are rigidly mounted on body 72 by bracket 420. Conductors 166 and 140 extend through openings in bracket 420. This construction simplifies the assembly and disassembly of connectors 45 and 46 with jacks 44. It will be appreciated that connectors 45 and 46 may also be mounted in the same manner on the jack body of the previously described dualsocket jack.

It will be appreciated that suitable patch cord plugs which do not include the novel features of this invention may be used with the various electrical jack assemblies described herein. In fact, the jacks of this invention may be used with any suitable type of plug which has contacts projecting preferably radially from the plug periphery and disposed in longitudinally spaced relation along the plug periphery. Furthermore, it will be appreciated that plugs incorporating novel features of this invention may be used with various jacks which are not constructed in accordance with this invention.

It also will be appreciated that various novel jack features of this invention may be utilized independently of other novel jack features which have been described herein. For example, the signal monitoring function of the novel triple socket jack of this invention may be incorporated into triple socket jacks which have different arrangements and constructions of contact elements or springs or a different jack body construction. So far as the signal monitoring function is concerned, important features broadly include the provision of the third plug-receiving socket 69 and the circuit extensions from one set of jack terminals to establish circuit connections between the plug contact pins 58 and the set of jack terminals without opening the normal through circuits in the jack. However, it will be appreciated that the particular arrangement of contact springs and contact elements in the triple socket jack of this invention is especially advantageous for reasons mentioned in the summary of the invention.

In place of each pair of contact springs 76 and 77, a single contact spring (not shown), which terminates in the terminal and tail portions 138 and 150, could be used, and a deflectible contact element (not shown), which corresponds to tail portion 136, could be soldered or otherwise fixed to the above-mentioned single contact spring.

It also will be appreciated from the foregoing description that various novel features, such as the construction of the jack body, the plug locking and positioning structure, and the novel contact spring construction, may be utilized in various jack constructions having one or more plug-receiving sockets.

In the preceding jack and patch cord plug embodiments, the number of circuits or circuit paths which can be furnished is limited by the number of contact pins 58 which can be arranged in a single row on the patch cord plug for a given jack and patch cord plug length. The following jack and plug embodiment shown in FIGS. 38–56 effectively doubles the circuit or circuit path capacity without significantly increasing the lengths of the jack and the patch cord plug. This is accomplished by providing two circumferentially spaced apart rows of contact pins 450 and 452 on the periphery of a patch cord plug 453 in the manner shown in FIG. 50, and by providing a special array of contact springs in the jack to double the circuit path capacity.

As shown in FIGS. 38–45, the triple socket jacket incorporating the special array of contact springs mentioned above is indicated at 454. In certain respects, jack 454 is of the same construction as jack 44. To the extent that jacks 454 and 44 are alike, like reference have been applied like components and structure, with the reference numeral designations for jack 454 being suffixed by the letter "b" to distinguish them from the reference numeral designation for jack 44. Jack 454 performs the same functions as jack 44.

Referring to FIGS. 38–45 jack 454 comprises a one-piece front mounting block 456, an insulator body or housing 458, six sets of contact springs 460, 461, 462, 463, 464 and 465 and three coiled compression springs *80b*, *81b* and *82b*. The jack body 458 is similar to jack body 72 and is longitudinally divided into a pair of separately formed complementary shells 466 and 468. Shells 466 and 468 are advantageously separately molded from a suitable electrically non-conductive plastics material.

Shells 466 and 468 are similar to shells 86 and 88 and define complementary portions of cavities or socket barrel portions *90b*, *91b* and *92b*. Barrel portions *90b*, *91b* and *92b* are respectively axially aligned with bores *210b*, *211b* and *212b* which are formed through the front mounting block 456. Barrel portions *90b*, *91b* and *92b* thus cooperate with bores *210b*, *211b* and *212b* to define the plug-receiving sockets *67b*, *68b* and *69b* which respectively correspond to sockets 67, 68 and 69 in the previous triple socket jack embodiment. Barrel portions *90b*, *91b* and *92b* define the major portions of the sockets *67b*, *68b* and *69b* as shown.

Shells 466 and 468 are formed with flat opposing faces 470 and 472 which interfittingly seat against each other in the assembled relation of the shells. The interface between shells 466 and 468 lies in a plane which contains the longitudinal axes of sockets *67b*, *68b* and *69b*. These axes of sockets *67b*, *68b* and *69b* are in parallel spaced apart relation. Sockets *67b*, *68b* and *69b* open at corresponding ends and are closed at their other ends by the back wall of jack body 458.

Shells 466 and 468 are rigidly and detachably secured to each other and to the front mounting block 456 in the same manner as previously described for the triple socket jack embodiment shown in FIGS. 4–9. Springs *80b*, *81b* and *82b* are arranged in the jack body cavities *90b*, *91b* and *92b* in the same manner as described for the previous triple socket jack embodiment of FIGS. 4–9.

As shown, the barrel portions *90b*, *91b* and *92b* are defined by cylindrically smooth, uniformly diametered surfaces of shells 466 and 468.

Figure 45:
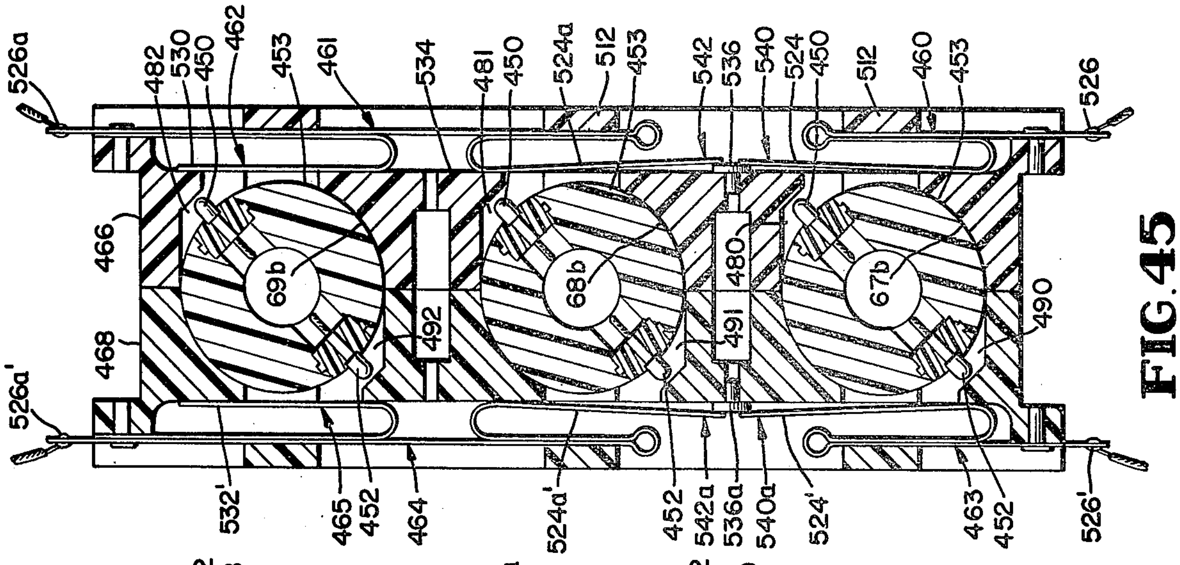
FIG. 45 is a section similar to FIG. 44, but showing the positions of the patch cord plugs before they are rotated to the positions mentioned above.
Figure 44:
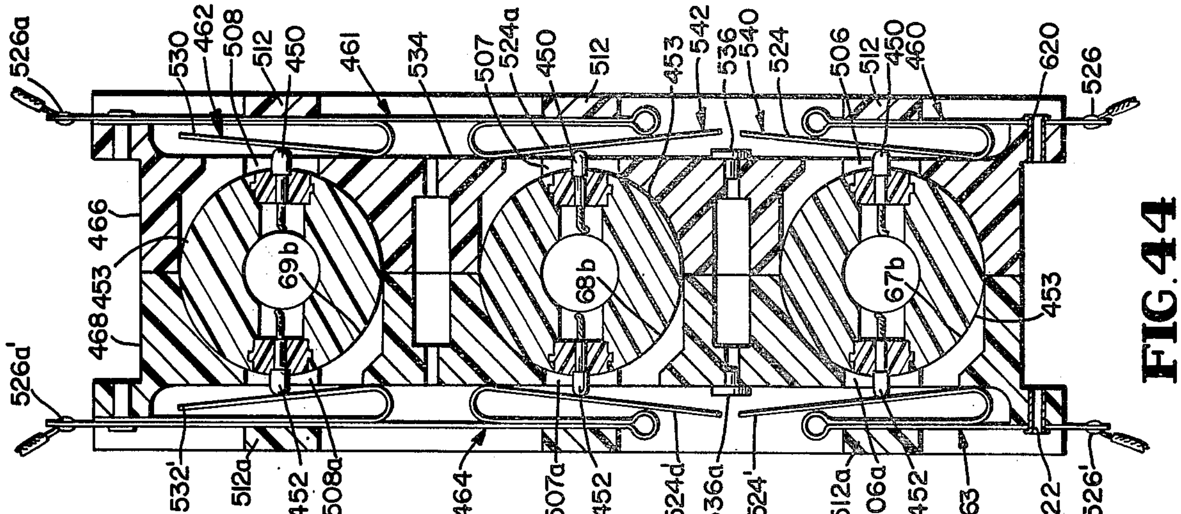
FIG. 44 is a section similar to FIG. 43, but showing patch cord plugs inserted into each of the three sockets of the jack and rotated to their positions where the contact pins of the plug contact and deflect the contact springs in the jack assembly.
Figure 43:
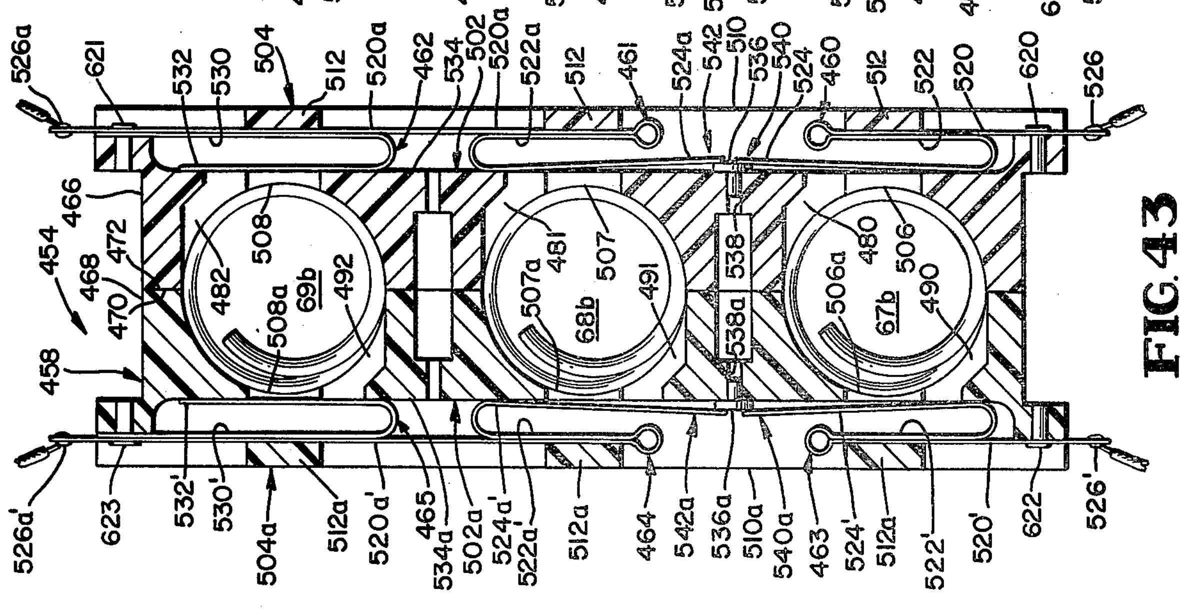
FIG. 43 is a section taken substantially along lines 43—43 of FIG. 42.

As best shown in FIGS. 43–45, regions of shell 466 defining sockets *67b*–*69b* are recessed to define shallow, longitudinally extending grooves or recessed regions 480, 481 and 482. Grooves 480–482 open radially inwardly into sockets *67b*–*69b* respectively for receiving the row of patch cord plug contact pins 450 upon insertion of plug 453.

Grooves 480–482 respectively align with three additional grooves 484, 485 and 486 (see FIG. 38) which are formed through the front mounting block 456. Grooves 484–486 open into bores *210b*–*212b* respectively and form continuations of grooves 480–482 as shown for receiving contact pins 450 as plug 453 is inserted into the jack.

Similar to shell 466, shell 468 is also formed shallow, longitudinally extending grooves or recessed regions 490, 491 and 492. Grooves 490–492 open radially inwardly into socket *67b*–*69b* respectively for receiving the row of patch cord plug contact pins 452. In this embodiment grooves 490–492 are diametrically opposite grooves 480–482 respectively to accomodate the row of contact pins 452 where is circumferentially spaced from the row of pins 450 by an angle of 180 degrees.

Grooves 490–492 respectively align with grooves 494, 495 and 496 (see FIG. 38) which are formed in mounting block 456. Grooves 494–496 open into bores *210b*–*212b* and form continuations of grooves 490–492 respectively to receive contact pins 452 as plug 453 is axially inserted into the jack.

The depth and width of grooves 484–486 are such that they each smoothly receive and freely pass an orienting pin 498 (see FIG. 50) which is mounted on plug 453. Pin 493 is positioned adjacent to the forward end of plug 453 ahead of and in axial alignment with the row of contact pins 450. Pin 498 extends radially from the periphery of the plug as shown.

The width and/or depth of each grove 494–496 is made sufficiently smaller than that of grooves 484–486 to block passage of pin 498. Thus plug 453 can only be inserted into each of the sockets 67*b*–69*b* by orienting the plug to align pin 498 with a selected one of the grooves 484–486. Plug 453 can only be inserted into each socket in one angular position to assure than the proper connections are made with pins 450 and 452 in the jack.

As shown in FIGS. 39 and 43–45, shell 466 is integrally formed with a recessed side wall 502 and a lattice-like rib network 504 on the exterior face of wall 502. Similar to the previous triple-socket jack embodiment, three parallel spaced apertures 506, 507 and 508 are formed through side wall 502 and open into sockets 67*b*–69*b* respectively. As shown, the inner ends of apertures 506–508 open into grooves 480–482 respectively to provide a passage for pins 450 upon rotation of plug 453 after its insertion into the jack.

The lattice-like network 504 is defined by a multiplicity of parallel, uniformly spaced apart spacer ribs 510 and three parallel spaced apart cross ribs 512. Ribs 512 extend longitudinally with respect to sockets 67*b*–69*b* and perpendicularly intersect ribs 510. Ribs 510 are spaced longitudinally apart with respect to the longitudinal axes of sockets 67*b*–69*b* and intersect and bridge apertures 506–508 to divide the apertures into a multiplicity of through ports or openings 516 for receiving the patchcord plug pins 450.

Figure 39:
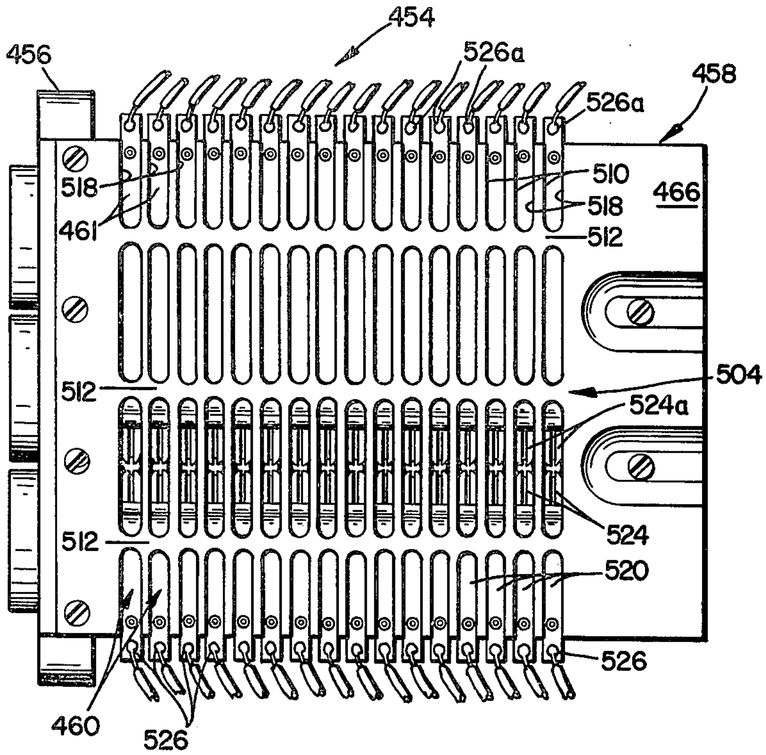
FIG. 39 is a right-hand side elevation of the jack shown in FIG. 38.
Figure 40:
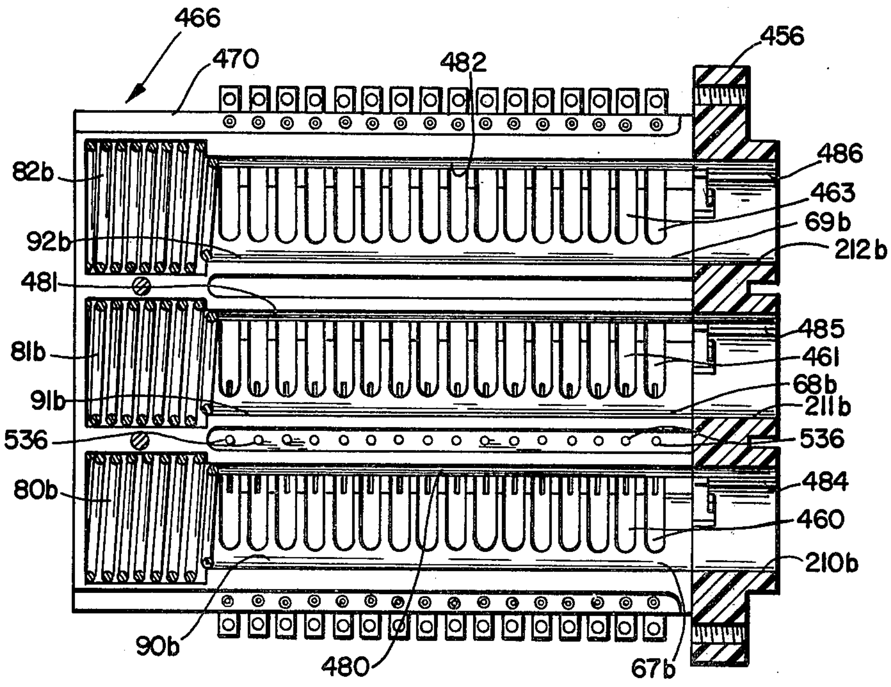
FIG. 40 is a section taken substantially along lines 40—40 of FIG. 38.
Figure 41:
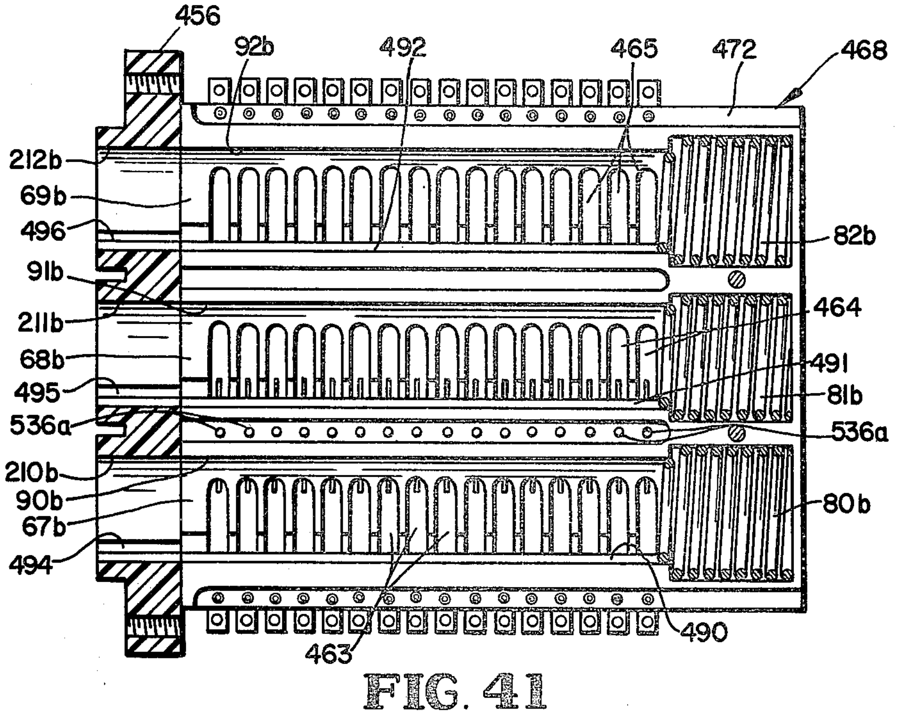
FIG. 41 is a section taken substantially along lines 41—14 of FIG. 38.
Figure 42:
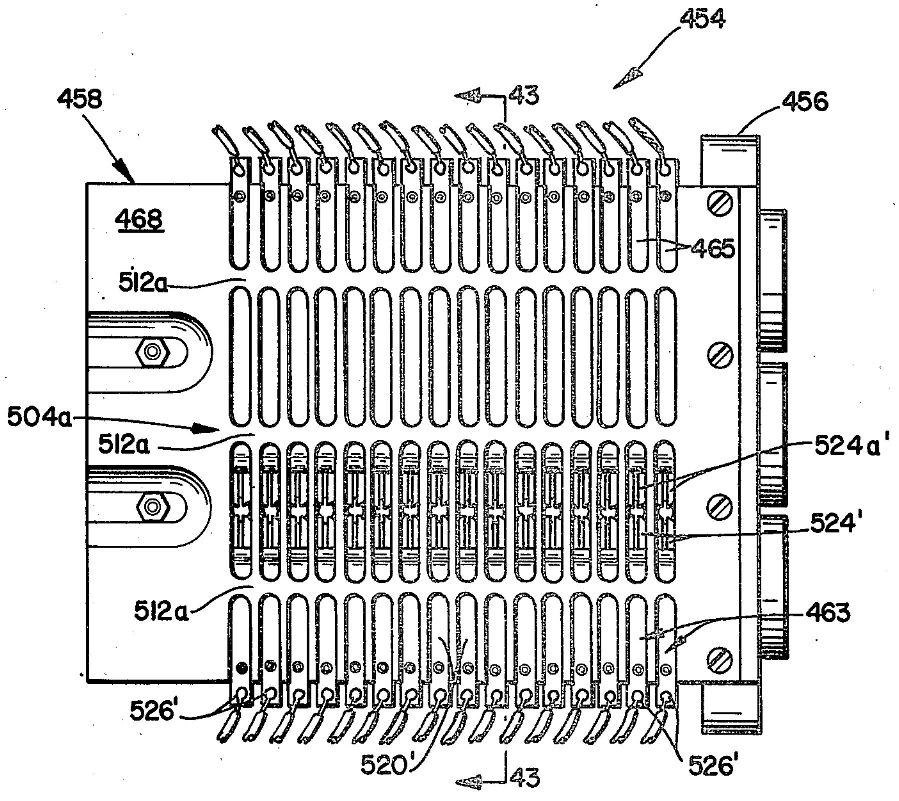
FIG. 42 is a left-hand side elevation of the jack shown in FIG. 38.

As shown in FIG. 39, ribs 510 define a multiplicity of straight, parallel, outwardly opening uniformly spaced apart grooves 518 on one side of the jack 454.

Springs 460–462 are seated in grooves 518 and are arranged in groups or sets of three in grooves 518 such that in each groove, there is one spring 460, one spring 461 and one spring 462. Ribs 510 space and electrically insulate each of these three-spring sets or groups from one another. Springs 460–465 are flat-sided and are made of electrically conductive spring metal.

As shown in FIG. 46, each spring 460 has a straight portion 520, and intermediate portion 522 which is bent backwardly through an angle of 180 degrees to lie flat against the inner face of portion 520, and a bifurcated tail portion 524 which is bent backwardly through just an acute angle to overlie, but not contact portion 524 in its relaxed, undeflected condition. Portion 520 terminates at its free end in a terminal 526 which may be connected by an insulated conductor to a selected terminal in connector 45 or to a terminal in an external circuit which is to be connected into the patch field by the jack and patch cord plug assembly. Portions 520 and 522 are integrally joined together by a bight 528 as shown. From this description it will be appreciated that spring 460 is provided with two reverse bends so that portions 520 and 524 extend in opposite directions.

The configuration of spring 461 (see FIG. 47) is the same as spring 460 except that its straight, terminal-defining portion, which corresponds to portion 520, is longer than portion 520. Accordingly, like reference numbers suffixed by the letter "a" have been applied to designate the portions of spring 461 which correspond to those of spring 460. The terminal 526*a* of spring 461 is connected by an insulated conducotr to a selected terminal of connector 45 or to a terminal in an external circuit similar to terminal 526.

The configuration of spring 462 corresponds to that of springs 77, and, as shown in FIG. 48, each spring 462 has a straight portion 530 and a tail portion 532 which is bent backwardly to overlie but not contact portion 530 in its relaxed, undeflected condition.

As shown in FIGS. 43–45, springs 460 are mounted on shell 466 and are arranged, one in each of the grooves 518 adjacent to socket 67*b*. Each of the springs 460 is confined between the flat outer surface 534 of side wall 502 and lowermost rib 512 such that the outer side face of portion 520 seats against the inwardly facing flat side surface of the lowermost rib 512 and the tail portion 524 bridges aperture 506 and lies nearest to side wall surface 534. As shown, all of the ribs 512 are spaced outwardly from the outer surface 534 of wall 502 to provide the space for receiving springs 460–462.

Still referring to FIGS. 43–45, each of the springs 461 is confined between surface 534 and the intermediate one of ribs 512 such that the outer side surface of portion 520*a* seat against the inwardly facing flat surface of the intermediate rib 512 and the tail portion 524*a* bridges aperture 507 and lies nearest to surface 534.

As shown the spring tail portions 524 and 524*a* lying in each groove 518 extend toward each other and terminate at adjacent side wall regions so as not to contact each other.

Separate normal through circuit connections electrically interconnecting the paired-off springs 460 and 461 in grooves 518 are established by flat-head contact pins 536 which are mounted on shell 466. Pins 536 are seated in separate, parallel, uniformly spaced apart bores 538 which are formed in shell 266. The axes of bores 538 are normal to a plane containing the axes of sockets 67*b*–69*b*. Pins 536 are thus arranged in a straight row along a region of side wall 502 which extends between sockets 67*b* and 68*b*.

As shown, the flat heads of pins 536 are disposed outwardly of bores 538 and lie one in each groove 518. There is normally one pin 536 for each pair of springs 460 and 461 lying in each groove 518.

In each of the grooves 518, the free, spaced apart end portions of the tail portions 524 and 524*a* normally seat against the protruding flat-head of the particular pin 536 extending into the groove to establish breakable electrical connections between the pair of springs 460 and 461 in each of the grooves 518. Tail portions 524 and 524*a* are flexed or deflected by engagement with pins 536 outwardly toward spring portions 522 and 522*a* respectively.

Still referring to FIGS. 43–45, the terminal-defining straight portions 520*a* of springs 461 extend beyond shell 466 for connection to an external circuit. Each spring 462 is confined between wall surface 534 and the portion 520*a* of its associated spring 461.

As shown, the portion 530 of the spring 462 in each groove 518 seats against portion 520*a* of the corresponding spring 461 in the same groove. The tail portion 532 of each spring 462 bridges aperture 508 and seats against wall surface 534. Tail portions 532 are flexed or deflected somewhat by seating engagement with surface 534.

From the arrangement of springs 460–462 described above, it will be appreciated that when springs 460 and 461 are in contact with contact pins 536, a normal through circuit is established by each pair of springs 460 and 461. This normal through circuit may be traced from terminal 526a, through spring 461, through one of the contact pins 536 and through spring 460 to its terminal 526. Thus, the paired springs 460 and 461 provide a multiplicity of separate normal through circuits which are electrically insulated by shell 466 from one another.

Shell 468 is the mirror image of shell 466 and is of the same construction as shell 466. Accordingly, like reference numerals suffixed by the letter "a" have been applied to designate like portions of shell 468. The spring-receiving grooves formed by the ribs 510a on shell 468 are indicated at 518a. Ribs 510a intersect and bridge the apertures 106a, 507a and 508a in the same manner as described for ribs 510. Apertures 506a, 507a and 508a are formed through the side wall 502a of shell 568 and respectively open into sockets 67b, 68b and 69b.

Springs 463 are the same as springs 460. Accordingly, like reference numerals have been applied to designate like portions of springs 463 and have been primed to distinguish them from the reference numerals applied to springs 460. Springs 464 are the same as springs 461. Therefore, like reference characters have been applied to designate corresponding portions of springs 464 and have been primed to distinguish them from the reference characters applied to springs 461. Also, springs 465 are the same as springs 462. Like reference numerals, therefore, have been applied to designate like portions of springs 465 and have been primed to distinguish them from the reference numerals applied to spring 462.

Springs 463–465 are arranged and confined in the exterior of shell 468 in the same manner just described for the arrangement and confinement of springs 460–462 on shell 466. Accordingly, there is a set or group of three springs in each of the grooves 518a in which each set or group consists of one spring 463, one spring 464 and one spring 465. More specifically, springs 463, 464 and 465 are positioned in mirror image relation with springs 460, 461 and 462 respectively. Springs 463–465 are mounted on one side of the jack body 458 and springs 460–462 are mounted on the oppositely facing side of the jack body.

In this embodiment, therefore, the tail portions 524' of springs 463 bridge aperture 506a, the tail portions 524a' of springs 464 bridge aperture 507a, and the tail portions 532' of springs 465 bridge aperture 508a.

To establish normal through circuit connections between the springs 463 and 464 in each groove 518a, a multiplicity of flat-headed parallel, spaced apart contact pins 536a are mounted on shell 468 and are arranged in the same manner as contact pins 536. Pins 536a are of the same construction as pins 536 and are mounted one in each of a multiplicity of parallel uniformly spaced apart bores 538b which are formed in shell 468. Each bore 538b is axially aligned with one of the bores 538. Pins 536a are thus arranged in a straight row on a region of side wall 502a that extends between sockets 67b and 68b.

The tail portions 524' and 524a' of the springs 463 and 464 in each groove 518a are spaced apart and seat against one of the pins 536a as shown in FIG. 43. Accordingly, when springs 463 and 464 are in contact with pins 536a, they define a multiplicity of separate normal through circuits which are electrically insulated from each other by shell 468. The normal through circuit for each pair of springs 463 and 464 may be traced from terminal 526a', through spring 464, through one of the pins 536a, and through spring 463 to its terminal 526'.

When plug 453 is axially inserted into socket 67b, the two rows of pins 450 and 452 are first received in grooves 480 and 490 respectively and hence are out of contact with springs 460 and 463 as shown in FIG. 45. After full insertion, plug 453 is then rotated (clockwise as viewed from FIG. 45) to shift pins 450 into registry with aperture 506 and pins 452 into registry with aperture 506a as shown in FIG. 44. In this rotated plug position, pins 450 project through aperture 506 and into separate grooves 518 to engage and outwardly deflect the tail portions 524 of separate springs 460. This deflection moves tail portions 524 out of contact with pins 536 to thereby electrically disconnect springs 460 from springs 461.

Upon rotating plug 453 to the position shown in FIG. 44, pins 452 will project through aperture 506a and into separate grooves 518a to engage and outwardly deflect the tail portions 524' of separate springs 463. This deflection of tail portions 524' moves them out of contact with pins 536a to electrically disconnect springs 463 from springs 464.

Thus axial insertion and rotation of plug 453 in socket 67b opens the normal through circuits between the pairs of terminals 526 and 526a and the normal through circuits between the pairs of terminals 526' and 526a'. In addition, insertion and rotation of plug 453 to the position shown in FIG. 44 completes a circuit between each pin 450 and a different one of springs 460 as well as completing a circuit between each pin 452 and a different of one springs 463.

When plug 453 is axially inserted into socket 68b, the two rows of pins 450 and 452 are first received in grooves 481 and 491 respectively and hence are out of contact with springs 461 and 464 as shown in FIG. 45. Plug 453 is then rotated clockwise to shift pins 450 into registry with aperture 507 and to shift pins 452 into registry with aperture 507a. In this rotated position, which is shown in FIG. 44, pins 450 project through aperture 507 and into separate grooves 518 to engage and outwardly deflect the tail portions 524a of springs 461. This deflection of tail portions 524a by engagement of pins 450 moves the tail portions out of contact with pins 536 to open the normal through circuits between terminals 526a and 526. Additionally, the rotation of plug 453 in socket 68b causes pins 452 to project through aperture 507a and into separate grooves 518a where they engage and outwardly deflect the tail portions 524a' of springs 464. Tail portions 524a' are thus moved out of contact with pins 536a to open the normal through circuits between terminals 526a' and 526'.

In addition to opening the normal through circuits between terminals 526a and 526 and the normal through circuits between terminals 526a' and 526', the positioning of plug 453 in socket 68b establishes circuit connections between contacts 450 and springs 461 and between contacts 452 and springs 464.

From the operation thus far described, it will be appreciated that the contact pin 536 and the pair of springs 460 and 461 in each of the grooves 518 cooperate to define two normally closed sets of plug-actuatable contacts (indicated at 540 and 542 in FIGS. 43–45) which are electrically connected in series between terminals 526 and 526a and which have a common stationary contact element in the form of pin 536. The tail portions 524 and 524a constitute the movable contact elements of contact sets 540 and 542 respectively.

Likewise, the contact pin 536a and the pair of springs 463 and 464 in each of the grooves 518a cooperate to define two normally-closed sets of plug-actuatable contacts 540a and 542a which are electrically connected in series between terminals 526' and 526a' and which have a common stationary contact element in the form of contact pin 536a. The tail portions 524' and 524a' constitute the movable contact elements of contact sets 540a and 542a respectively.

Thus, upon axially inserting and rotatively positioning plug 453 in socket 67b, contacts 540 and 540a are opened by pins 450 and 452 respectively to open the normal through circuits between terminals 526 and 526a and between terminals 526' and 526a'. Additionally, separate patch field circuit connections are completed between the individual contact pins 450 and separate ones of terminals 526 and between the individual contact pins 452 and separate ones of terminals 526'.

Plug 453 forms a part of a complete patch cord 544 (see FIG. 48A) having an additional patch cord plug 546 and a flexible, multiconductor cable 548 separately interconnecting the contact pins on plug 453 with corresponding contact pins on plug 546. Plug 546 is advantageously of the same construction as plug 453.

To complete selected patch field circuits, plug 546 may be insertable into a selected socket in another jack 550 (FIG. 48A). Jack 550 may be of the same construction as jack 454. Like reference characters prefixed by the letter "N" have been applied to designate the parts of jack 550 corresponding to jack 454.

As shown in FIG. 48A, the terminals 526a and 526a' of jack 454 may be connected to terminals of one external source circuit 552, and the terminals N-526a and N-526a' of jack 550 may be connected to terminals of another external source circuit 554. Similarly, the terminals 526 and 526' of jack 454 may be connected to terminals of an external load circuit 556, and the terminals N-526 and N-526' of jack 550 may be connected to terminals of another external load circuit 558.

In this example, circuits 552 and 556 are normally electrically interconnected through the normal through circuits in jack 454, and circuits 554 and 558 are normally interconnected through the normal through circuits of jack 550. These circuits connections may selectively be changed, for example, by inserting plugs 453 and 546 into sockets 68b and N67b respectively. Now, circuits 552 and 554 will be electrically disconnected from circuits 556 and 558 respectively, and circuits 556 and 554 will be electrically connected to each other by way of patch cord 554.

Referring back to FIGS. 43–45, when plug 453 is axially inserted into socket 69b, contact pins 450 and 452 are first received in grooves 482 and 492 respectively where they are spaced from and, hence, out of contact with springs 462 and 465 as shown in FIG. 45. Plug 453 is then rotated in a clockwise direction in socket 69b (see FIG. 45) to shift contact pins 450 and 452 into registry with apertures 508 and 508a respectively. In this rotated position of the plug, contact pins 450 project through aperture 508 and into grooves 518 to contact and deflect the tail portions 532 of springs 462 as shown in FIG. 44. Additionally, pins 452 will project through aperture 508a and into grooves 518a to contact and deflect the tail portions 532a of springs 465 as also shown in FIG. 44. Since springs 462 and 465 lie in contact with and, hence, are electrically connected to springs 461 and 464 respectively, insertion of plug 453 into socket 69b and rotation of the plug to the position shown in FIG. 44 establishes electrical connections between terminals 526a and pins 450 and also between terminals 526a' and pins 452.

It will be appreciated that positioning of plug 453 in socket 69b to establish the electrical connections described above does not result in the opening of any of the sets of contacts 540, 542, 540a or 542a in the jack's normal through circuits. Thus, plug 453 is positionable in socket 69b to complete the circuit connections between contact pins 450 and 452 and terminals 526a and 526a' without opening the normal through circuits in jack 450. Thus, external circuits, such as circuits 552 and 556, remain interconnected when plug 453 is inserted into socket 69b and positioned to establish the electrical connections with terminals 526a and 526a'.

To complete monitoring circuit connections by using socket 69b, two of the plugs 453 are incorporated into a patch cord 560 and are indicated at 453' and 453'' in FIG. 48A. One of the plugs 453' is positioned in socket 69b, and the other plug 453'' is positioned in the socket of what may be a single socket jack 562 as shown in FIG. 48A. Jack 562 may be located at a monitoring station corresponding to the one shown in FIG. 2. Jack 562 may be a sub-assembly of jack 450 to include the socket-defining jack body and springs corresponding to and arranged in the same manner as springs 462 and 465. Alternatively, plug 453'' and jack 562 may be of the same construction as the embodiment of FIG. 2.

The spring-defining terminals of jack 562 may be electrically connected to a monitoring or testing circuit corresponding to circuit 342 as shown. Thus, by inserting plug 453' into socket 69b and plug 453'' into jack 562, circuit 552 will be electrically connected to circuit 342 without interfering with the circuit connections to circuit 556. Additionally, the patch cord connections of circuit 552 to circuit 342 is established without interferring with any patch field connections that are established by positioning a patch cord plug in socket 67b, socket 68b, or both. Various other patch field connections may be made with jack 454 and plug 453 as described, for example, in connection with the embodiment in FIGS. 1 and 2.

It also will be appreciated that when plug 453 is inserted into socket 68b and rotated to the position shown in FIG. 44, it will open contacts 542 and 542a to thereby open all of the normal through circuits in the jack.

It will be appreciated that the spacing between springs 460, the spacing between springs 461 and the spacing between springs 462 is the same as the spacing between contact pins 450 so that each contact pin 450 contacts (a) a different one of springs 460 when plug 453 is in sockets 67b, (b) a different one of springs 461 when plug 453 is in socket 68b, and (c) a different one of springs 462 when plug 453 is in socket 69b. The same holds true for the arrangement of springs 463–465 and contact pins 452.

As shown, plug 453 is advantageously provided with a locking pin 280a which cooperates with locking grooves in jack body 458 in the same manner described for the jack and plug embodiment of FIGS. 4–17. Springs 80b–82b perform the same functions as springs 80–82 in the embodiment of FIGS. 3–17. Thus, when plug 453 is axially inserted into socket 67b, for example, it compresses spring 80b so that upon full clockwise rotation of plug 453 (as viewed from FIGS. 43–45), plug 453 will be releasabliy locked in place by engagement of pin 280a in a locking groove under the bias exerted by spring 80b.

Figure 49:
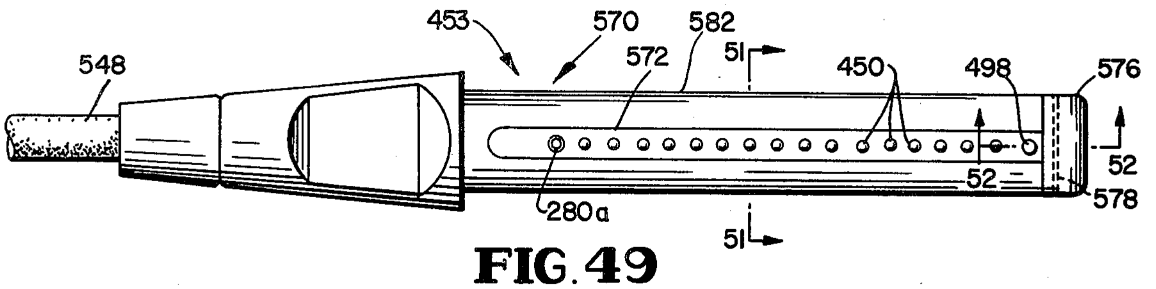
FIG. 49 is a top plan view of the patch cord plug shown in FIGS. 44 and 45.
Figure 50:
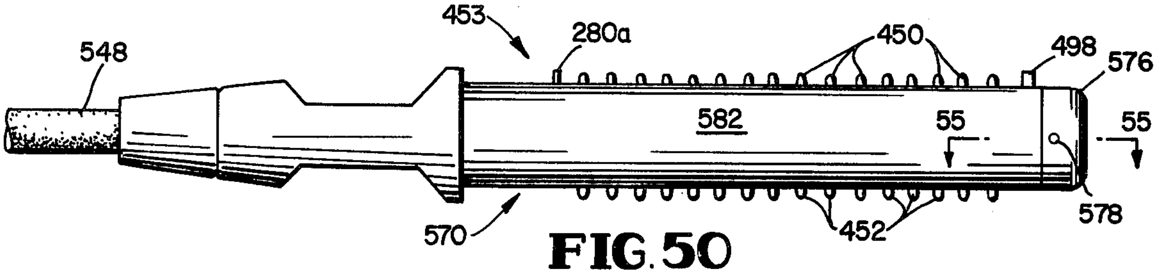
FIG. 50 is a side elevation of the patch cord plug shown in FIG. 49.
Figure 51:
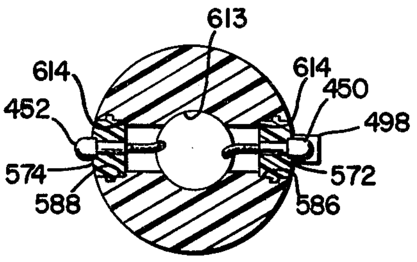
FIG. 51 is a section taken substantially along lines 51—51 of FIG. 49.

As shown in FIGS. 49–51, contact pins 450 and 452 are of the same construction as contact pins 58. The two rows of contact pins 450 and 452 are straight and extend longitudinally with respect to the axis of the plug.

In addition to contact pins 450 and 452, plug 453, in this embodiment, additionally includes a one-piece body 570, a pair of one-piece contact mounting strips or inserts 572 and 574, a cap 576 and a retaining pin 578. Body 570, inserts 572 and 574 and cap 576 are each advantageously molded from a suitable electrically non-conductive plastics material.

As shown in FIGS. 49 and 50 the plug's body 570 is formed with an elongated barrel portion 580 and a cable-receiving end portion 582. End portion 582 may be of the same construction as that shown in FIGS. 16 and 17. Barrel portion 582 mounts inserts 572 and 574 and is receivable in each of the jack sockets *67b–69b*.

Insert 572 mounts contact pins 450 and electrically insulates contact pins 450 from one another in same manner described for contact pins 58 and insert 232 in the embodiment of FIGS. 16–18. Insert 574 mounts contact pins 452 and electrically insulates pins 450 from one another in the same manner just described form the mounting of pins 450 on insert 572. Each of the inserts 572 and 574 may be of the same construction as insert 232.

Figure 52:
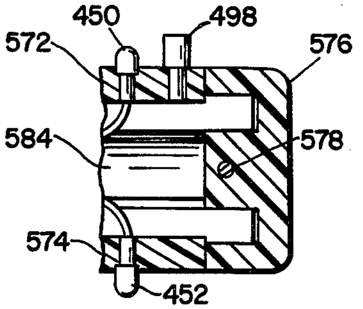
FIG. 52 is a section taken substantially along lines 52—52 of FIG. 49.
Figure 54:
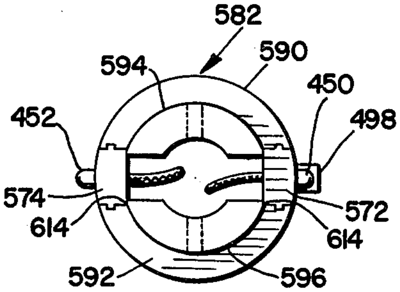
FIG. 54 is an end view of the plug shown in FIG. 49, but with the end cap of the plug removed.
Figure 53:
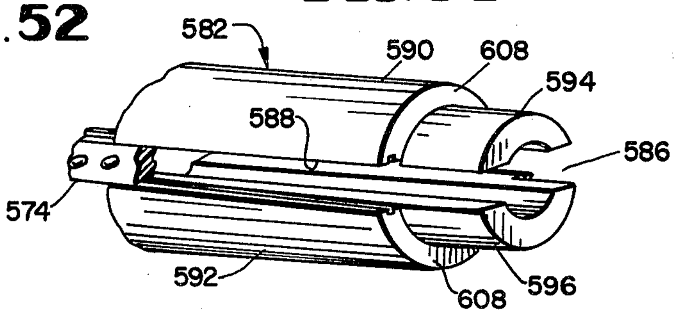
FIG. 53 is a fragmentary perspective view of the barrel portion of the plug shown in FIG. 49.

Barrel portion 582 has a uniformly diametered cylindrically contoured outer periphery and has a hollowed out interior to cooperate with cap 576 for defining a conductor-receiving cavity 584. The construction of barrel portion 582 is generally the same as that of plug 55 with the exceptions that barrel portion 582 has no solid end wall like plug 55 and is additionally slit in two places at diametrically opposed regions to form a pair of insert-receiving slots or slits 586 and 588 as shown in FIGS. 51–53.

Slots 586 and 588 open into cavity 584 and also open at corresponding ends at the cap-receiving end of barrel portion 582. Slots 586 and 588 thus partially divide barrel portion 582 to provide the barrel with a pair of longitudinally extending leg-like sections 590 and 592. The leg sections 590 and 592 are integrally joined together adjacent to the cable-receiving end portion 580 and have free, reduced diametered end portions 594 and 596 for receiving cap 576.

Slots 586 and 588 receive inserts 572 and 574 respectively. The interior side wall regions of each of the slots 586 and 588 may be formed in the same manner as shown in FIG. 18 to support and confine inserts 572 and 574 on the plug body.

As shown in FIGS. 49, 50, 52 and 55, cap 576 receives the free end portions 594 and 596 of the barrel and is formed with a cylindrically contoured, uniformly diametered skirt 600 which tightly and interfittingly fits over end portions 594 and 596 to keep the leg portions 590 and 592 from spreading apart. Cap 576 is formed with and end wall 602 and closes the open forward end of barrel 582 in the manner shown.

Figure 55:
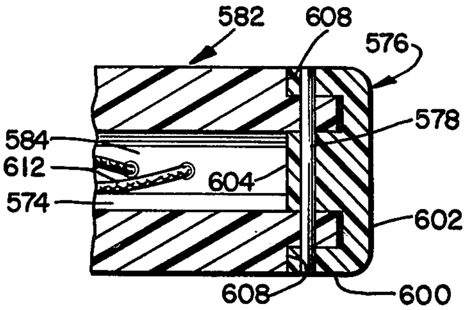
FIG. 55 is a fragmentary partially sectioned view of the plug of FIG. 49 and illustrating the end cap in cross-section.
Figure 56:
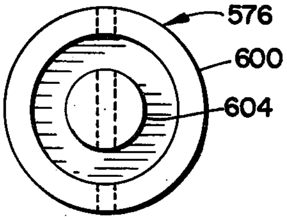
FIG. 56 is an end view of the plug's cap.

As best shown in FIGS. 52 and 56, cap 576 is additionally formed with an axially extending, cylindrical post 604 which is joined at its base to end wall 602. Skirt 600 peripheral surrounds post 604 to define an annular outwardly opening recess 606. The end portions 594 and 596 are interfittingly received in recess 606 as best shown in FIGS. 52 and 55.

Cap 576 seats against exterior shoulders 608 and 610 on leg portions 590 and 592 and is detachably fixed to leg portions 590 and 592 by pin 578. The end portions 594 and 596 of the barrel interfittingly seats on post 604 and are thereby kept from bending or collapsing inwardly. Cap 576 keeps leg portions 590 and 592 from spreading apart. Confinement of leg portions 590 and 592 in this manner retains inserts 572 and 574 in place. Slots 586 and 588 open radially outwardly and axially at the forward end of the barrel portion. Slots 586 and 588 are circumferentially spaced apart of 180°.

To assemble the parts of plug 453, the conductors 612 of the patch cord cable 544 may be drawn through the bore 613 in end portion 580 and then soldered or otherwise fixed to contact pins 450 and 452 after the pins are mounted on their respective inserts 572 and 574. Thereafter, inserts 572 and 574 are longitudinally, slidably inserted into slots 586 and 588, respectively, from the open, forward ends of the slots to seat and position them on barrel portion 582. Finally, cap 576 is positioned on the end portions 594 and 596 of the barrel, and retainer pin 578 is inserted to secure cap 576 to end portions 594 and 596.

In the final assembly of plug 453, inserts 572 and 574 seat on and are supported by flat ledges 614 which are integral with barrel portion 582.

Like reference numerals suffixed by the letter "a" have been applied to designate the parts or portions of plug 453 which are the same as plug 55.

From the foregoing description it will be appreciated that plug 453 is of simplified construction and is easy to assemble and also disassemble.

It also is clear that as many as three patch cord plugs may be inserted, one into each socket *67b–69b*, at the same time as shown in FIG. 44.

When plug 453 is in any one of the sockets *67b–69b*, locking pin *280a* seats against an interior surface to prevent counter clockwise rotation of the plug from the position shown in FIG. 45. Clockwise rotation of plug 453 is limited to the positions shown in FIG. 44 by abutment of pin *280a* with interior surfaces.

Each of the springs 160 is individually secured to shell 466 by a single rivet 620 as shown, for example, in FIG. 44. Each pair of springs 161 and 162 in each groove 518 is secured to shell 466 by a single rivet 621. Similarly, each spring 463 is individually secured to shell 468 by a single rivet 622. Each pair of springs 464 and 465 in each groove *518a* is secured to shell 468 by a single rivet 623.

Inserts 572 and 574 are of the same construction and may be interchangeable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with at least one patch cord plug having a set of contact elements, a jack assembly comprising (a) first and second sets of terminals which are adapted for electrical connection to electrical circuits externally of said jack assembly, and (b) means providing normal through circuit connections for electrically connecting the terminals of said first set to terminals of said second set and positioned to be conditioned by said plug for selectively effecting any of the following circuit conditions: (a) the breaking of said normal through circuit connections and the electrical connection of the terminals of said first set to said contact elements (b) the breaking of said normal through circuit connections and the electrical connection of the terminals of said second set to said contact elements, and (c) the electrical connection of the terminals of a pre-selected one of said first and second sets to said contact elements without breaking the normal through circuit connections between said first and second sets of terminals.

2. An electrical jack assembly for use with at least one patch cord plug having a plurality of contact elements which project from a cylindrical periphery of said plug and which are disposed in longitudinally spaced apart relation along the cylindrical periphery, said electrical jack assembly comprising first, second and third patch cord plug-receiving sockets each adapted to slidably receive said plug, and means providing at least two switching circuits, each of said switching circuits having first and second terminals and first and second sets of plug-actuatable contacts which are serially arranged between said first and second terminals and which are normally closed to complete a circuit between said terminals, said first set of contacts of each switching circuit having a movable component which is positioned in the region of said first socket for engagement with and displacement by one of said plug contact elements upon positioning said plug in said first socket to open the circuit between said first and second terminals and to provide a circuit connection between said first terminal and the plug contact element, said second set of contacts of each switching circuit having a movable component which is positioned in the region of said second socket for engagement with and displacement by one of the plug contact elements upon positioning said plug in said second socket to open the circuit between said first and second terminals and to provide a circuit connection between said second terminal and the plug contact element, said jack assembly further comprising electrical conductors electrically connected to separate ones of said first terminals and positioned for engagement by the plug contact elements upon positioning said plug in said third socket to provide electrical connections for connecting the plug contact elements to the first terminals of said switching circuits without breaking the circuit connections between said first and second terminals.

3. The electrical jack assembly defined in claim 2 wherein the movable component of the first set of contacts of each switching circuit is a first contact spring which defines said first terminal, wherein the movable component of the second set of contacts of each switching circuit is a second contact spring which defines said second terminal, wherein said first and second sets of contacts of each switching circuit are further defined by portions of an electrically conductive part, said portions of said electrically conductive part being normally engaged with said first and second contact springs, and said electrical conductors being in electrical contact with the first contact springs of said switching circuits.

4. An electrical jack assembly for at least one patch cord plug having a multiplicity of contact pins which project from a cylindrical periphery of the plug and which are disposed in longitudinally spaced relation along the cylindrical periphery, said electrical jack assembly comprising a body formed from electrically non-conducting material and defining at least first and second plug-receiving sockets which have parallel spaced apart longitudinal axes and which open at corresponding ends such that each socket is adapted to receive said plug through its open end, and a multiplicity of spaced apart switching circuits each defined by a contact element and first and second contact springs which have deflectible portions that normally contact portions of said contact element to provide two serially connected sets of normally closed contacts, said first and second springs of each of said switching circuits being supported by said body respectively on opposite sides of a plane which contains the longitudinal axes of said sockets, and each contact element being mounted on said body in a position where it is transversely intersected by said plane, the deflectible portions of the first springs in said switching circuits being positioned in the region of said first socket such that they are adapted to be engaged and deflected by said contact pins to positions where they are out of contact with said contact elements upon positioning said plug in said first socket, and the deflectible portions of the second springs of said switching circuits being positioned in the region of said second socket such that they are adapted to be engaged and deflected by said contact elements upon positioning said plug in said second socket.

5. The electrical jack assembly defined in claim 4 wherein each of said first and second springs has a terminal-defining portion which is adapted to be connected to an electrical circuit, and wherein said deflectible portion of each spring is an end portion which is bent backwardly toward said terminal-defining portion and lies between said terminal-defining portion and an exterior surface of said body.

6. The electrical jack assembly defined in claim 4 wherein said body is longitudinally divided along said plane into first and second separately formed parts, each part delimiting a portion of each of said sockets, and means securing said parts together, the first springs of said switching circuits being exteriorly mounted only on said first part, and the second springs of said switching circuits being exteriorly mounted only on said second part.

7. The electrical jack assembly defined in claim 4 wherein said body is longitudinally divided along said plane into separately formed first and second mating parts which respectively mount said first and second springs of each of said switching circuits, wherein means are provided for securing said parts together, and wherein said contact elements are trapped between opposing surfaces of said parts and are confined in place only by seating engagement with interior surfaces of said parts.

8. The electrical jack assembly defined in claim 5 wherein the backwardly bent end portions of said first springs bridge an aperture which is formed in said body and which opens into said first socket, and wherein the backwardly bent end portions of said second springs bridge a further aperture which is formed in said body and which opens into said second socket.

9. The electrical jack assembly defined in claim 8 wherein the oppositely facing sides of said body are exteriorly formed with a plurality of parallel spaced apart ribs which define outwardly opening grooves, wherein said first springs are seated in the grooves on one of the sides of said body and are separated from each other by said ribs, and wherein said second springs are seated in the grooves on the other of the sides of said body and are separated from each other by said ribs.

10. An electrical jack assembly for use with a patch cord plug having a at least three contact elements which project from a cylindrical periphery of the plug and which are disposed in longitudinally spaced relation along the cylindrical periphery, said jack assembly comprising a body formed from electrical nonconductive material and defining at least first and second plug-receiving sockets which open at corresponding ends, which are each adapted to slidably receive said plug and which have parallel longitudinal axes that are contained in a common plane, at least three separate switching circuits each defined by a contact member and first and second contact springs which have deflectible portions that normally contact portions of said contact member, the deflectible portions of the first contact springs of said switching circuits being disposed in the region of said first socket to be engaged and deflected by said contact elements to positions where they are out of contact with the contact members of said switching circuits upon positioning said plug in said first socket, the deflectible portions of the second contact springs of said switching circuits being disposed in the region of said second socket to be engaged and deflected by said contact elements to positions where they are out of contact with said contact members upon positioning said plug in said second socket, said body being longitudinally divided along said plane into at least a pair of separately formed mating parts, and means securing said parts together, said first springs being mounted on the exterior of one of said parts, and said second springs being mounted on the exterior of the other of said parts.

11. An electrical patch jack assembly for a cord plug having a plurality of contact pins which project from the plug periphery and which are disposed in longitudinally spaced relation along the plug periphery, said jack assembly comprising (a) a body which is formed from electrically non-conductive material and which defines at least one socket adapted to slidably receive said plug and (b) a plurality of sets of normally closed contacts carried by said body, each set of normally closed contacts being defined by a contact element and a contact spring which has a terminal-defining portion and a deflectible end portion, said deflectible end portion normally contacting said contact element and being bent backwardly toward said terminal-defining portion to lie between said terminal defining portion and an exterior surface of said body, the deflectible end portions of the contact springs being arranged in the region of said socket to be engaged and deflected by said contact pins to positions where they are out of contact with the contact elements of said sets of contacts upon positioning said plug in said socket.

12. The electrical jack assembly defined in claim 11 wherein said body is exteriorly formed with a plurality of spaced apart ribs which define a plurality of outwardly opening grooves, the contact springs of said sets of contacts being seated in said grooves and being spaced from each other by said ribs.

13. The electrical jack assembly defined in claim 11 wherein the terminal defining portion of each contact spring is anchored to said body at a region which is spaced from the bent region of the contact spring and wherein a region of said end portion of the contact spring and the adjacent region of said terminal portion lie between the exterior surface of said body and a rib which is integral with said body, which is spaced from said exterior surface, and which extends transversely of said contact springs.

14. In combination with at least one patch cord plug having a series of contact pins which project from the plug periphery and which are disposed in longitudinally spaced relation along the plug periphery, first and second multiple terminal electrical connectors, and a jack assembly, said jack assembly comprising (a) a body which defines at least two plug receiving sockets and (b) a series of separate circuits which are carried by said body, each circuit defining first and second terminals and first and second sets of normally closed contacts connected in series between said first and second terminals, said first and second electrical connectors being mounted on and supported by said body and each having a series of terminal pins, first electrical conductors connecting the first terminals of said circuits to the terminal pins of said first connector, second electrical conductors connecting the second terminals of said circuits to the terminal pins of said second connector, said plug being positionable in one of said sockets to open the first sets of contacts of said circuits and to electrically connect said contact pins to said first terminals, and said plug being positionable in the other of said sockets to open the second sets of contacts of said circuits and to electrically connect said contact pins to said second terminals.

15. In combination with a patch cord plug having a cylindrical periphery and a multiplicity of contact elements projecting from said cylindrical periphery and arranged in predetermined spaced apart relation in a row extending longitudinally of said cylindrical periphery, an electrical jack comprising a body formed from electrical insulating material and defining at least one socket which is adapted to slidably receive said plug, said body having a through aperture which opens into said socket and which is elongated in the direction of the longitudinal axis of said socket, and said body being integrally formed on its exterior with a multiplicity of parallel spaced apart side-by-side ribs extending transversely of an bridging said aperture to define a multiplicity of spaced apart outwardly opening recessed regions which are bounded along their sides by said ribs, a multiplicity of electrically conductive contact spring members secured to said body and positioned one in each of said regions on the exterior of said body, said spring members being spaced from and electrically insulated from each other by said ribs by distances corresponding to the spacing of said contact elements in said row, a multiplicity of stationary electrically conductive contact members carried by said body, and each spring member having a deflectible portion which bridges said aperture and normally contacts a different one of said stationary contact members, said plug and said socket having coacting formations such that said plug is selectively insertable into said socket and is selectively rotatable in said socket to a pre-selected position where said contact elements register with and extend through said aperture to contact and deflect the deflectible portions of said spring members to positions where they are out of contact with the stationary contact members to thereby electrically disconnect the spring contact members from the stationary contact members.

16. In combination with a patch cord plug, a jack comprising a body formed from electrically non-conductive material and defining at least first and second plug-receiving sockets each adapted to slidably and rotatably receive said plug, first means defining a multiplicity of first normal through circuits, each of said first normal through circuits terminating in first and second terminals and having first and second normally closed sets of contacts arranged in series between said first and second terminals, second means defining a multiplicity of second normal through circuits, each of said second normal through circuits terminating in third and fourth terminals and having third and fourth normally closed sets of contacts arranged in series between said third and fourth terminals, said plug being adapted to selectively be positioned and rotated in either of said sockets, said plug having first and second longitudinally extending, circumferentially spaced apart rows of contact elements which protrude from the plug periphery (a) for respectively engaging and opening said first and third sets of contacts when said plug is positioned and rotated in said first socket and (b) further for respectively engaging and opening said second and fourth sets of contacts when said plug is positioned and rotated in said second socket.

17. In combination with patch cord plug having a multiplicity of electrically conductive contact elements arranged in first and second longitudinally extending, circumferentially spaced apart rows along the periphery of the plug, a jack comprising a body formed from electrically non-conductive material and defining at least first and second plug-receiving sockets each adapted to slidably and rotatably receive said plug, first means defining a multiplicity of first normal through circuits, each of said first normal through circuits terminating in first and second terminals and having first and second normally closed sets of contacts arranged in series between said first and second terminals, second means defining a multiplicity of second normal through circuits, each of said second normal through circuits terminating in third and fourth terminals and having third and fourth normally closed sets of contacts arranged in series between said third and fourth terminals, said plug being adapted to selectively be positioned and rotated in said first socket to displace said first and second rows of contact elements respectively along first and second paths, and said plug further being adapted to be selectively positioned and rotated in said second socket to displace said first and second rows of contact elements respectively along third and fourth paths, each of said first, second, third and fourth sets of contacts comprising a member having a portion which is displaceable from a circuit-completing position to a circuit-opening position, the displaceable portions of said first sets of contacts being located along said first path, the displaceable portions of said third sets of contacts being located along said second path, the displaceable portions of said second sets of contacts being located along said third path, and the displaceable portions of said fourth sets of contacts being located along said fourth path, the contact elements in said first row protruding from the periphery of said plug (a) to engage and displace said portions of said first sets of contacts to their circuit-opening positions when said plug is positioned and rotated in said first socket and (b) further to engage and displace said portions of said second sets of contacts to their circuit-opening positions when said plug is positioned and rotated in said second socket, and the contact elements in said second row protruding from the periphery of said plug (a) to engage and displace said portions of said third sets of contacts to their circuit-opening positions when said plug is positioned and rotated in said first socket, and (b) further to engage and displace said portions of said fourth sets of contacts to their circuit-opening positions when said plug is positioned and rotated in said second socket.

18. An electrical jack assembly for use with at least one patch cord plug having at least three spaced apart contact elements arranged along a surface of the plug, said electrical jack assembly comprising: at least three separate switching circuits each have (a) first and second terminal portions and (b) first and second plug-actuatable switching means which are connected in series between said first and second terminal portions and which are normally closed to establish a current-conducting circuit connection between said first and second terminal portions, each of the first and second switching means in said switching circuits being actuatable to electrically disconnect the first terminal portions of said switching circuits from the second terminal portions of said switching circuits, a plurality of electrical conductors each permanently connected to a different one of the first terminal portions of said switching circuits, and means defining (a) a first socket for receiving said plug and positioned in the region of the first switching means of said switching circuits for enabling said first switching means to be actuated by said plug for electrically disconnecting said first terminal portions from said second terminal portions and for establishing the electrical connection of said first terminal portions to different ones of said contact elements, (b) a second socket for receiving said plug and positioned in the region of said second switching means for enabling said second switching means to be actuated by said plug for electrically disconnecting said first terminal portions from said second terminal portions and for establishing the electrical connection of said second terminal portions to different ones of said contact elements and (c) a third socket for receiving said plug and positioned in the region of said electrical conductors for enabling the electrical contact of said conductors with different ones of said contact elements without electrically disconnecting said first terminal portions from said second terminal portions.

19. An electrical jack for use with a patch cord plug having at least three electrically conductive contact elements, said electrical jack comprising at least three electrically conductive switching circuits each having (a) first and second terminal portions and (b) first and second normally closed switching means connected in series between said first and second terminal portions for electrically interconnecting said first and second terminal portions, means defining first, second and third spaced apart sockets each adapted to receive said plug, said first switching means of each switching circuit being adapted to cooperate with said plug only upon reception of said plug in said first socket for electrically disconnecting the first terminal portions of said switching circuits from the second terminal portions of said switching circuit and for electrically connecting said first terminal portions to different ones of said contact elements, said second switching means being adapted to cooperate with said plug only upon reception of said plug in said second socket for electrically disconnecting said first terminal portions of said switching circuits from said second terminal portions of said switching circuits and for electrically connecting said second terminal portions to different ones of said contact elements, and means adapted to cooperate with said plug upon reception of said plug in said third socket for electrically connecting said first terminal portions of said switching circuits to different ones of said contact elements without electrically disconnecting said first terminal portions from said second terminal portions.

20. The electrical jack defined in claim 19 wherein said means defining said first, second and third sockets comprises a body made of electrical insulating material, and wherein said first, second and third sockets are formed along parallel spaced apart longitudinal axes and are open at corresponding ends to receive said plug.

21. An electrical jack for use with at least one patch cord plug having at least three spaced apart electrically conductive contact elements projecting from a cylindrical periphery of the plug and arranged in spaced apart relation in a row extending longitudinally of said cylindrical periphery, said electrical jack comprising: at least three separate electrically conductive switching circuits each having (a) stationary contact means and (b) first and second flexible contact members having deflectable portions normally contacting said stationary contact means for establishing two serially connected sets of normally closed contacts, a plurality of electrical conductors each electrically connected to a different one of the first flexible contact members independently of said stationary contact means, and means defining first, second and third spaced apart sockets each formed to slidably receive said plug, the deflectable portions of said first flexible contact members being positioned in the region of said first socket to be contacted and deflected by said contact elements of said plug to positions where they are out of contact with said stationary contact means only upon positioning said plug in said first socket, the deflectable portions of said second flexible contact members being positioned in the region of said second socket to be contacted and deflected by said contact elements to positions where they are out of contact with said stationary contact means only upon positioning said plug in said second socket, and said electrical conductors being positioned in the region of said third socket to be contacted by said contact elements to establish electrical connections between said contact elements and said first flexible contact members upon positioning said plug in said third socket, and the deflectable portions of said first and second flexible contact members being spaced from said third socket at locations where they remain out of contact with and undeflected by said contact elements upon reception of said plug in said third socket, whereby said plug is positionable in said third socket to establish electrical connections between said contact elements and said first contact members without opening said sets of normally closed contacts.

22. The electrical jack defined in claim 21 wherein the longitudinal axes of said first, second and third sockets are in parallel spaced apart relation and are contained in a common plane.

23. The electrical jack defined in claim 21 wherein said means defining said first, second and third sockets comprises a body formed from electrical insulating material, and wherein the first and second contact members of each switching circuit respectively terminate in first and second terminal portions.

24. The electrical jack defined in claim 21 wherein said means defining said first, second and third sockets comprises a body of electrical insulating material, the longitudinal axes of said first, second and third sockets being in parallel spaced apart relation and contained in a common plane, said first, second and third sockets opening at corresponding ends for receiving said plug, said body mounting said switching circuits.

25. The electrical jack defined in claim 24 wherein said body is divided along said plane into two separately formed mating parts, and wherein means are provided for securing said parts together.

26. The electrical jack defined in claim 24 wherein said stationary contact means are mounted by said body in a region lying between said first and second sockets.

27. An electrical jack for use with a patch cord plug having at least three electrically conductive contact elements, said electrical jack comprising at least three electrically conductive switching circuits each having first and second normally interconnected terminal portions, means defining first and second spaced apart sockets each adapted to receive said plug, means forming a part of said switching circuits and adapted to cooperate with said plug upon reception of said plug in said first socket for electrically connecting the first terminal portions of said switching circuits to different ones of said contact elements and for electrically disconnecting the first terminal portions of said switching circuits from the second terminal portions of said switching circuits, and means adapted to cooperate with said plug upon reception of said plug in said second socket for establishing the electrical connection of said first terminal portions in said switching circuits to said contact elements without disconnecting said first terminal portions from said second terminal portions.

28. An electrical jack for terminating an electrical circuit in an impedance and adapted to be operated by a patch cord plug for electrically disconnecting said electrical circuit from said impedance and electrically connecting said electrical circuit to contact elements forming a part of said plug, said electrical jack comprising at least one current-conducting switching circuit having switching means and terminating in first and second terminal portions which are adapted to be connected to separate terminals of said electrical circuit, said impedance forming a part of said current-conducting circuit and being connected intermediate said first and second terminal portions, said switching means being electrically connected between said terminal portions in series with said impedance and said terminal portions and being normally closed to provide for the electrical connection of said impedance across said terminal portions, and socket means for receiving said plug and positioned in the region of said switching means for enabling actuation of said switching means by said plug to effect (a) the disconnection of said impedance from at least one of said terminal portions and (b) the electrical connection of said first and second terminal portions to different ones of said contact elements.

29. The electrically jack defined in claim 28 wherein said switching means comprises a stationary contact member and a deflectable contact portion normally contacting said stationary contact member, said first terminal portion and said deflectable contact portion each being an integral part of an electrically conductive flexible spring member, and said socket means having a formation for enabling one of said contact elements to engage and deflect said deflectable portion to a position where it is out of contact with said stationary contact member upon reception of said plug in said socket means.

30. The electrical jack defined in claim 28 wherein said socket means is formed by an electrically non-conductive body which is divided into two separately formed mating parts along a plane containing the longitudinal axis of said socket means, wherein means are provided for securing said parts together, and wherein said impedance is a component that is mounted on the exterior of one of said parts.

31. An electrical jack for use with an electrical circuit and adapted to be operated by a patch cord plug having a cylindrical portion and contact elements projecting from the periphery of said cylindrical portion and disposed in longitudinally spaced relation along said periphery, said electrical jack comprising first and second electrically conductive stationary contact members, at least one passive impedance component connected between said first and second stationary contact members, first and second electrically conductive spring members adapted to be electrically connected to terminals of said electrical circuit, a first deflectable portion forming a part of said first spring member, a second deflectable portion forming a part of said second spring member, said first and second deflectable portions normally contacting said first and second stationary contact members, respectively, to complete a circuit that connects said impedance component across said spring members, and said deflectable portions being deflectable to circuit-opening positions where they are out of contact with said stationary contact members to electrically disconnect said impedance component from said spring members, and socket means for receiving said cylindrical portion of said plug and having a formation in the region of said deflectable portions for enabling first and second ones of said contact elements to respectively contact and deflect said first and second deflectable portions to said circuit-opening positions.

32. An electrical jerk for use with a patch cord plug having at least three electrically conductive contact elements which project from a cylindrical periphery of the plug and which are disposed in a row in longitudinally spaced apart relation along said cylindrical periphery, said electrical jack comprising at least first and second sockets each adapted to slidably receive said plug, and electrical circuit means defining at least three separate current conducting paths each terminating in first and second terminal portions, said circuit means having (a) normally closed switching means in said paths and adapted to be actuated by said plug upon reception of said plug in said first socket for electrically disconnecting the first terminal portions of said paths from the second terminal portions of said paths, and (b) electrical conductor means electrically connected to said first terminal portions independently of said switching means and having members positioned at said second socket to contact said contact elements upon reception of said plug in said second socket to provide for the electrical connection of each of said contact elements to a different one of said first terminal portions without electrically disconnecting said first terminal portions from said second terminal portions.

33. An electrical jack for use with a patch cord plug having at least three electrically conductive contact elements which project from a cylindrical periphery of the plug and which are disposed in a row in longitudinally spaced apart relation along said cylindrical periphery, said electrical jack comprising a structure defining at least first and second sockets each adapted to slidably receive said plug, and electrical circuit means including (a) a set of first terminal portions, (b) a set of second terminal portions and (c) normally closed switching means normally conditioned to electrically connect each of said first terminal portions to a different one of said second terminal portions for establishing a plurality of separate current conducting paths, there being at least three of said first terminal portions and at least three of said second terminal portions, said switching means being actuatable by reception of said plug in said first socket for electrically disconnecting said first terminal portions from said second terminal portions, said circuit means having current-conducting portions for electrically connecting the terminal portions in a preselected one of said sets to said contact elements upon reception of said plug in said first socket, and said circuit means further including electrical conductor means electrically connected to said first terminal portions independently of said switching means and having members positioned at said second socket to contact said contact elements upon reception of said plug in said second socket to provide for the electrical connection of each of said contact elements to a different one of said first terminal portions without electrically disconnecting said first terminal portions from said second terminal portions.

34. The electrical jack defined in claim 33 wherein said first and second sockets open at corresponding ends to receive said plug and are coextensive, the longitudinal axes of said first and second sockets being in parallel spaced apart relation and contained in a common plane.

35. An electrical jack for use with a patch cord plug having at least three electrically conductive contact elements which are positioned on a surface of the plug and which are disposed in a row in spaced apart relation along said surface, said electrical jack comprising a structure defining first, second and third sockets each adapted to slidably receive said plug, and electrical circuit means including a set of first terminal portions and a set of second terminal portions, there being at least three of said first terminal portions and at least three of said second terminal portions, said circuit means further including normally closed switching means normally conditioned to electrically connect each of said first terminal portions to a different one of said second terminal portions, said switching means being actuatable by reception of said plug in either one of said first and second sockets for electrically disconnecting said first terminal portions from said second terminal portions, said circuit means having (a) first electrically conductive portions positioned at said first socket for electrically connecting each of said first terminal portions to different ones of said contact elements upon reception of said plug in said first socket and (b) second electrically conductive portions positioned at said second socket for electrically connecting each of said second terminal portions to a different one of said contact elements upon reception of said plug in said second socket, and said circuit means further including electrical conductor means electrically connected to said first terminal portions independently of said switching means and having members positioned at said third socket for contacting said contact elements upon reception of said plug in said third socket to provide for the electrical connection of each of said contact elements to a different one of said first terminal portions without electrically disconnecting said first terminal portions from said second terminal portions.

36. The electrical jack defined in claim 35 wherein said first, second and third sockets open at corresponding ends to receive said plug, the longitudinal axes of said first, second and third sockets being parallel with each other and lying in a common plane.

37. The electrical jack defined in claim 36 wherein said first, second and third sockets are coextensive and spaced apart from one another, said members being spaced apart in a straight row extending parallel to the longitudinal axis of said third socket to one side of said plane, said first electrically conductive portions being spaced apart in a straight row extending parallel to the longitudinal axis of said first socket to one side of said plane, and said second electrically conductive portions being spaced apart in a straight row extending parallel to the longitudinal axis of said second socket to one side of said plane.

38. The electrical jack defined in claim 36 wherein said first, second and third sockets are arranged in a straight row with said third socket being at one end of said straight row.

39. The electrical jack defined in claim 35 including first and second electrical connectors adapted to provide an interface connection between said circuit means and electrical equipment located externally of said electrical jack, said structure having oppositely facing ends, and said first and second connectors each having a set of terminal elements and being mounted on said structure adjacent to one of said ends, means electrically connecting said first terminal portions to the terminal elements of said first connector, and means electrically connecting said second terminal portions to the terminal elements of said second connector, the open ends of said first, second and third sockets being disposed at the other of said ends.

* * * * *

UNITED STATES PATENT OFFICE

CERTIFICATE OF CORRECTION

Patent No. 4,140,918 Dated February 20, 1979

Inventor(s) JESSE F. LANCASTER

It is certified that error appears in the above-identified patent and that said Letters Patent are hereby corrected as shown below:

Column 1, line 40, change "May 13, 1972" to --May 23, 1972--.

Column 1, line 68, change "and" to --the--.

Column 2, line 39, after "cord" insert --plug--.

Column 2, line 64, change "inot" to --into--.

Column 4, line 2, change "the" to --and--.

Column 7, line 63, change "37A" to --38a--; and cancel lines 66-68.

Column 8, line 10, change "14" to --41--.

Column 9, line 3, change "facilty" to --facility--.

Column 16, line 56, change "See." to --See--.

Column 18, line 60, change "alignswith" to --aligns with--

Column 19, line 5, change "axailly" to --axially--.

Column 21, line 42, change "closkwise: to --clockwise--.

Column 24, line 37, change "feature" to --features--

UNITED STATES PATENT OFFICE

CERTIFICATE OF CORRECTION

Patent No. 4,140,918 Dated February 20, 1979

Inventor(s) JESSE F. LANCASTER

It is certified that error appears in the above-identified patent and that said Letters Patent are hereby corrected as shown below:

Column 24, line 47, change "with" --without--.

Column 25, line 45, change "ptach" to --patch--.

Column 30, line 34, change "38a" to --36b--.

Column 33, line 11, change "than" to --that--.

Column 33, line 68, change "conducotr" to --conductor--

Column 39, line 55, change "and" to --an--

Column 43, line 30, claim 11, after "electrical" delete --patch--; after "a" insert --patch--.

Column 44, line 37, claim 15, change "an" to --and--

Column 49, line 31, claim 32, change "jerk" to --jack--.

Column 50, line 27, claim 35, delete "which are positioned on a surface of the plug and which are".

Column 50, line 28, claim 35, delete "in a row".

UNITED STATES PATENT OFFICE

CERTIFICATE OF CORRECTION

Patent No. 4,140,918 Dated February 20, 1979

Inventor(s) JESSE F. LANCASTER

It is certified that error appears in the above-identified patent and that said Letters Patent are hereby corrected as shown below:

Column 50, line 29, claim 35, delete "along said surface--

Column 50, line 46, claim 35, after "to" insert --a--.

Column 50, line 46, claim 35, change "ones" to --one--.

Signed and Sealed this

***Eleventh* Day of *December 1979***

[SEAL]

*Attest:*

SIDNEY A. DIAMOND

*Attesting Officer* *Commissioner of Patents and Trademarks*